(12) United States Patent
Currie et al.

(10) Patent No.: US 7,891,962 B2
(45) Date of Patent: Feb. 22, 2011

(54) TIRE BUILDING CORE MANIPULATOR APPARATUS

(75) Inventors: William Dudley Currie, Stow, OH (US); Dennis Alan Lundell, Akron, OH (US); David Alan Henthorne, Copley, OH (US); Mary Beth Dombrosky, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 501 days.

(21) Appl. No.: 11/962,242

(22) Filed: Dec. 21, 2007

(65) Prior Publication Data

US 2009/0159183 A1 Jun. 25, 2009

(51) Int. Cl.
*B29D 30/12* (2006.01)
*B29C 33/76* (2006.01)

(52) U.S. Cl. .................. 425/28.1; 156/396; 425/38; 425/54; 425/55

(58) Field of Classification Search ............... 425/28.1, 425/34.1, 38, 54, 55; 156/396
See application file for complete search history.

(56) References Cited

U.S. PATENT DOCUMENTS

| | | | |
|---|---|---|---|
| 1,179,898 A | 4/1916 | Coffey et al. | |
| 1,388,255 A | 8/1921 | Hardeman | |
| 1,682,620 A | 8/1928 | Ledwinka | |
| 2,123,586 A | 7/1938 | Heston | 154/9 |
| 3,560,302 A | 2/1971 | Missioux | 156/515 |
| 3,607,558 A | 9/1971 | Nebout | 156/415 |
| 3,684,621 A | 8/1972 | Frazier et al. | 156/401 |
| 3,767,509 A | 10/1973 | Gazuit | 146/415 |
| 3,833,445 A | 9/1974 | Mallory et al. | 156/401 |
| 3,868,203 A | 2/1975 | Turk | 425/242 |
| 4,007,080 A | 2/1977 | Klopper | 156/396 |
| 4,043,725 A | 8/1977 | Schmidt | 425/542 |
| 4,045,277 A | 8/1977 | Habert et al. | 156/417 |
| 4,075,275 A * | 2/1978 | Nishimura et al. | 264/313 |
| 4,083,672 A | 4/1978 | Vaishnav | 425/457 |
| 4,106,888 A * | 8/1978 | Calori | 425/56 |
| 4,160,007 A * | 7/1979 | Pizzorno | 425/56 |
| 4,197,068 A * | 4/1980 | Pizzorno | 425/34.1 |
| 4,211,592 A | 7/1980 | Grawey | 156/123 |
| 4,279,856 A * | 7/1981 | Vente et al. | 425/54 |
| 4,728,274 A | 3/1988 | Siegenthaler | 425/34 R |

(Continued)

FOREIGN PATENT DOCUMENTS

DE    2002294    7/1971

(Continued)

OTHER PUBLICATIONS

European Search Report completed Mar. 25, 2009.

*Primary Examiner*—James Mackey
(74) *Attorney, Agent, or Firm*—Richard B. O'Planick

(57) ABSTRACT

A tire building core manipulating apparatus for a segmented tire building core is provided, the core including a plurality of core segments extending generally radially from a central axis. The manipulating apparatus includes a support frame; a core latching mechanism mounted to the support frame for operatively engaging a mating mechanism on the core whereby suspending the tire building core in a preferred axial orientation and raises and lowers the core to engage one or more stations in a tire curing line. A transport mechanism relocates the support frame with the tire building core in the preferred axial orientation between a plurality of stations in the tire curing line.

15 Claims, 44 Drawing Sheets

U.S. PATENT DOCUMENTS

| | | | | |
|---|---|---|---|---|
| 4,877,468 | A | 10/1989 | Siegenthaler | 156/111 |
| 4,895,692 | A | 1/1990 | Laurent et al. | 264/326 |
| 5,201,975 | A | 4/1993 | Holroyd et al. | 156/124 |
| 5,384,084 | A | 1/1995 | Siegenthaler | 264/237 |
| 5,622,669 | A | 4/1997 | Dailliez et al. | 264/403 |
| 5,853,526 | A | 12/1998 | Laurent et al. | 156/398 |
| 5,908,531 | A * | 6/1999 | Laurent | 425/54 |
| 6,113,833 | A * | 9/2000 | Ogawa | 425/56 |
| 6,203,641 | B1 | 3/2001 | Laurent et al. | 156/110.1 |
| 6,234,227 | B1 | 5/2001 | Bosseaux | 156/398 |
| 6,250,356 | B1 | 6/2001 | Cordaillat et al. | 156/400 |
| 6,318,432 | B1 | 11/2001 | Caretta et al. | 152/552 |
| 6,406,576 | B1 | 6/2002 | Benedict et al. | 156/96 |
| 6,669,457 | B2 * | 12/2003 | Scarzello et al. | 425/55 |
| 6,757,955 | B2 * | 7/2004 | Marchini et al. | 425/55 |
| 7,621,308 | B2 * | 11/2009 | Lundell et al. | 156/417 |
| 7,712,504 | B2 * | 5/2010 | Cordaillat et al. | 156/396 |
| 2003/0157209 | A1 | 8/2003 | Scarzello et al. | 425/35 |

FOREIGN PATENT DOCUMENTS

| | | |
|---|---|---|
| EP | 0 468 342 A1 | 7/1991 |
| EP | 0 893 237 A2 | 1/1999 |
| EP | 893237 A2 | 1/1999 |
| EP | 0 928 679 A2 | 7/1999 |
| EP | 1 090 729 | 4/2001 |
| EP | 1792712 A1 | 6/2007 |
| EP | 1932646 A1 | 6/2008 |
| GB | 167073 | 8/1921 |
| GB | 549905 | 12/1942 |
| GB | 1524369 | 9/1978 |
| JP | 11-291363 | 10/1999 |
| JP | 11-320567 | 11/1999 |
| JP | 2001-001342 | 1/2001 |
| JP | 2001-079850 | 3/2001 |
| JP | 2002-096403 | 4/2002 |
| WO | 82/00017 | 1/1982 |
| WO | 01/62481 | 5/2001 |
| WO | 02/45942 A1 | 6/2002 |
| WO | 03/103935 | 12/2003 |
| WO | 2005/009724 | 2/2005 |

* cited by examiner

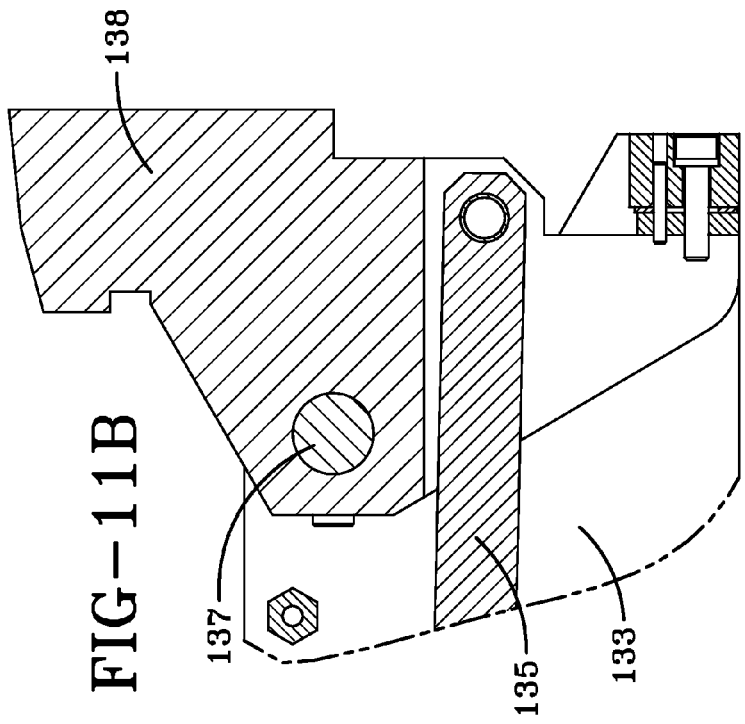
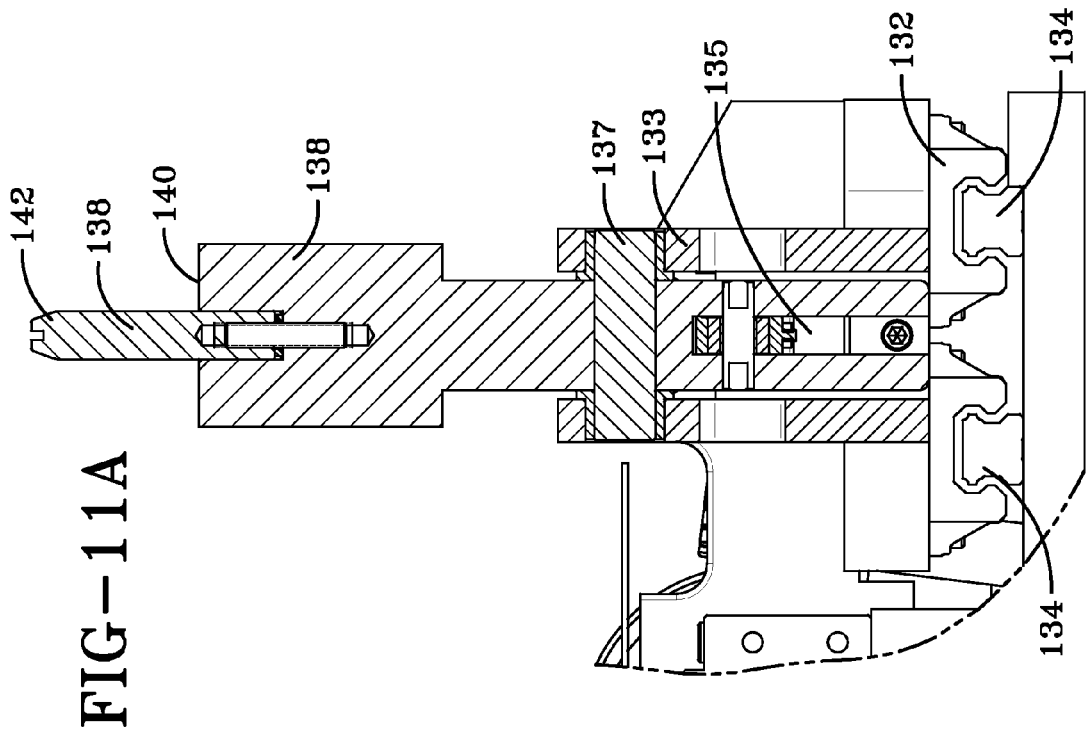

TIRE BUILDING CORE MANIPULATOR APPARATUS

FIELD OF THE INVENTION

The subject invention relates generally to automated tire manufacturing lines and more specifically to apparatus for manipulating a tire building core and tire in an integrated tire manufacturing system.

BACKGROUND OF THE INVENTION

It is known to vulcanize uncured or green tires using a mold in a tire press. A tire bladder is inserted inside the mold and the green tire and inflated to press the green tire into the sidewall and tread forming surfaces of the mold as heat and pressure are applied to the tire to cure it. After a predetermined time the mold is opened and the cured tire is removed from the press.

Because of the lack of control inherent to toroidal expansion of a tire carcass in conventional tire building processes, it has been proposed to build a tire from components applied to a segmented core dimensioned and configured close to the finished tire. U.S. patent application Ser. No. 11/292,991, entitled "TIRE BUILDING CORE LATCHING AND TRANSPORT MECHANISM", filed Dec. 2, 2005, and U.S. patent application Ser. No. 11/293,397, entitled "HEATED TIRE BUILDING CORE ASSEMBLY AND METHOD", filed Dec. 2, 2005, disclose one such segmented core. In using such a core for the construction of a tire it is necessary to manipulate the core and tire from station to station in a tire curing line. An efficient apparatus for accomplishing core and tire manipulation is, accordingly, desired.

SUMMARY OF THE INVENTION

According to an aspect of the invention, a tire building core manipulating apparatus for a segmented tire building core is provided, the core including a plurality of core segments extending generally radially from a central axis. The manipulating apparatus includes a support frame; a core latching mechanism mounted to the support frame for operatively engaging a mating mechanism on the core whereby suspending the tire building core in a preselected axial orientation; and a transport mechanism for relocating the support frame with the tire building core in the selected axial orientation between a plurality of stations in a tire curing line.

In another aspect of the invention, the transport mechanism moves the support frame and the tire building core between a core manipulating station, a core assembly and disassembly station; and a mold assembly station in the tire curing line.

A further aspect of the invention is to provide a rail assembly extending between the plurality of stations, the support frame including a bridging truss assembly operatively traversing the rail assembly between the plurality of stations. The bridging truss assembly latches to and suspends the core at a height sufficient to pass the core over at least one of the plurality of stations in the tire curing line as the bridging truss assembly traverses between the plurality of stations. The latching mechanism is capable of raising and lowering the core to selectively engage one or more station in the tire curing line.

Pursuant to an additional aspect, a method of manipulating a tire building core is provided, the core including a plurality of core segments extending generally radially from a central axis. The method includes: mounting a support frame to move between a plurality of stations in a tire curing line; latching the core to a latching mechanism mounted to the support frame; suspending the tire building core from the core latching mechanism in a substantially vertical orientation; and moving the support frame and the tire building core in the vertical orientation between the plurality of stations in the tire curing line.

BRIEF DESCRIPTION OF THE DRAWINGS

The invention will be described by way of example and with reference to the accompanying drawings in which:

FIG. 11A is a sectional view through a portion of the subassembly of FIG. 11, taken along the line 11A-11A.

FIG. 11B is a sectional view through a portion of the subassembly of FIG. 11, taken along the line 11B-11B.

DETAILED DESCRIPTION OF THE INVENTION

Figure 1:
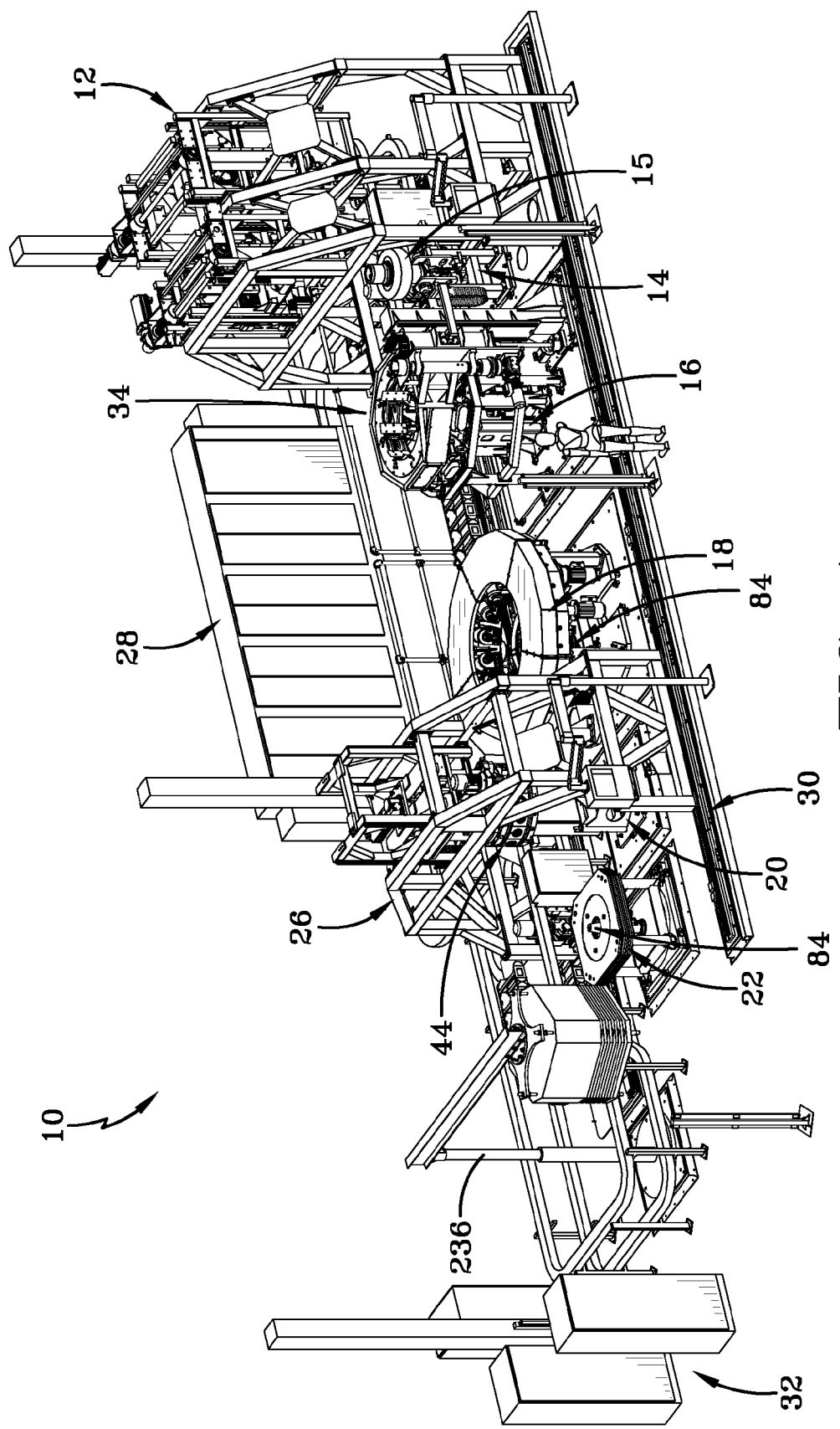
FIG. 1 is a top front perspective view of the tire curing line assembly.
Figure 2:
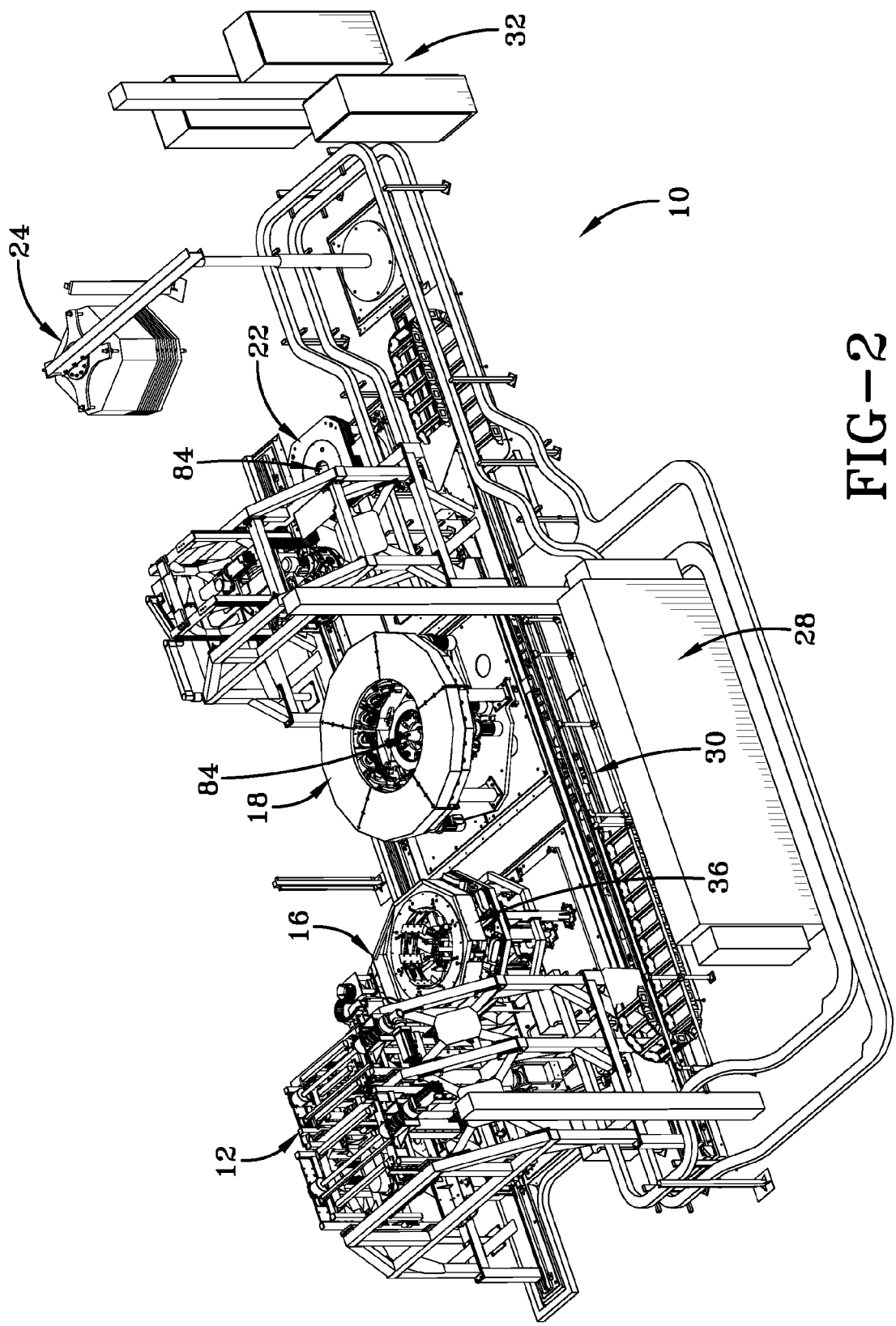
FIG. 2 is a top rear perspective view of the tire curing line assembly.

Referring initially to FIGS. 1 and 2, the subject curing line 10 is shown as part of an integrated tire manufacturing line. The curing line 10 is shown to include a plurality of stations arranged in a linear array, however, other arrangements of the work stations may be utilized if desired to accommodate the facility and/or preferences of the user. The tire manufacturing line builds a tire from components applied to a segmented core dimensioned and configured close to the finished tire. In U.S. patent application Ser. No. 10/417,849, filed Apr. 17, 2003, entitled "A METHOD FOR CURING TIRES AND A SELF-LOCKING TIRE MOLD", incorporated by reference herein, a segmented mold for molding a tire is described. The mold has a central axis; a plurality of radially movable tread forming segments; two sidewall forming plates, a top sidewall forming plate, and a bottom sidewall forming plate; a top locking ring having a plurality of circumferentially spaced means for locking the segments, each means for locking providing a predetermined angular path for radially contracting the segments upon closing the mold in a locked position. The segmented mold for molding a tire has an enlarged opening for accepting a green tire assembly. The mold can accept the green tire and its building core internally while maintaining the tire's as-built dimensions very close to the as-molded dimensions.

The mold receives a tire building core assembly, including segments combining to define an annular tire building surface and including a latching and handling mechanism. Such a core is disclosed in U.S. patent application Ser. No. 11/292,991, entitled "TIRE BUILDING CORE LATCHING AND TRANSPORT MECHANISM", filed Dec. 2, 2005, and U.S. patent application Ser. No. 11/293,397 entitled "HEATED TIRE BUILDING CORE ASSEMBLY AND METHOD", filed Dec. 2, 2005, incorporated herein by reference. The mechanism provides a positive means of attachment between the tire building core in tire manufacture and any of the building, curing or other stations involved in the manufacturing process. Attachment points are located in each end of the core useful for transporting the core the core between stations. The mechanism allows for automatic attachment/detachment of the core into two halves and provides sufficient accuracy and rigidity for the motions required for precision tire manufacture. The mechanism consists of a cone shaped interface within the core together with linkage driven latching fingers.

In order to cure the green tire, a tire curing station, such as that described in U.S. patent application Ser. No. 10/741,752, entitled "A SINGLE STATION TIRE CURING METHOD AND APPARATUS", filed Dec. 19, 2003, incorporated herein by reference, may be employed. A coil or group of coils is positioned to surround areas of the tire mold that require application of precise heat. The heating is specified through a recipe program supplied to the control unit.

The curing line 10 is intended to be integrated into the tire manufacturing line described above for curing a green tire constructed on a core assembly 15. The line 10 includes an upper core manipulator 12, upender apparatus 14, and a lower core assembly station 16 that operatively engage a tire building core assembly 15. The upper core manipulator assembly 12 is a mobile assembly that generally moves the core assembly 15 along the curing line 10 between a mold assembly station 18 and a cure station 22 having an induction heat dome assembly 24 positioned adjacent thereto. A mold manipulator assembly 26 bridges over the curing line and moves an assembled mold containing the core and tire assembly 15 under electrical control from control panel 28 along a transport rail assembly 30 between the cure station 22 and the mold assembly station 18. Induction heating control panels 32 are positioned adjacent the induction dome assembly 24 and electrically control assembly 24 throughout the heating cure cycle. Throughout the line 10, a conical docking interface 84 is used in stations 14, 16, 18, and 22 to couple with the lower half of the core and tire assembly 15, whereby locating and positioning the core and tire assembly 15 for operations conducted within such stations.

Figure 3:
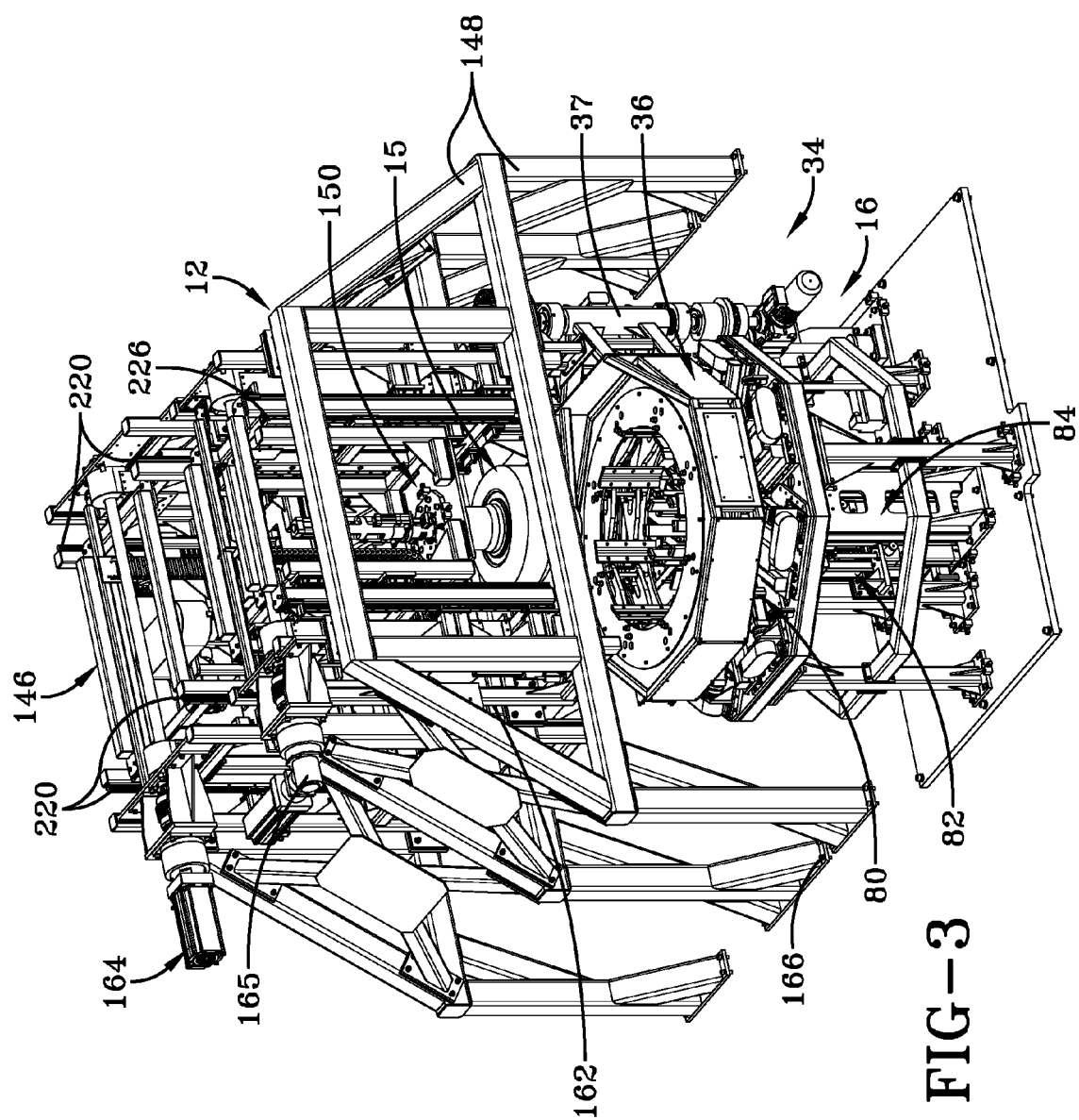
FIG. 3 is a perspective view of a core manipulator apparatus.

FIG. 3 illustrates in enlarged detail the upper core manipulator assembly 12 constructed as a bridging support frame assembly and positioned to move reciprocally along the rail assembly 30 station to station. The upper core manipulator assembly 12 spans the lower core manipulator 16 and, with the lower core manipulator 16, comprises a core assembly/disassembly station 34. The station 34 includes multiple assemblies that operatively interact with the core and tire assembly. Such assemblies include a bottom spindle clamp assembly 84, an intermediate core segment support assembly 82, a lower segment handling assembly 80, and an upper tire unloading apparatus 36. The assemblies 84, 82, 80 and 36 constitute the lower core manipulator 16 and are oriented generally in a mutually stacked configuration as shown in FIG. 3. The assemblies 36, 80, and 82 are generally circular in configuration, peripherally oriented about a common circular central opening 39. The bottom spindle clamp assembly 84 projects axially upward from the bottom of the station 34 into the opening 39. As will be explained, multiple operations are conducted at station 34 within the curing line 10. As used herein, the core assembly and disassembly station 34 is the combination of the lower core manipulator 16 (sub-assemblies 36, 80, 82, and 84) and the upper core manipulator 12.

With reference to FIGS. 4, 6, 12, 13, and 38 tire unloading apparatus 36 is part of the lower core manipulator 16 and is shown positioned at the top of the manipulator 16 within station 34. The tire unloader 36 is supported by a vertical support post 38 and includes a tire gripping assembly 40. The assembly 40 includes a circular upper support plate 41 and a lower support plate 43 spaced below upper plate 41. The central axial opening 39 extends medially through each of the plates 41, 43. Spaced about the periphery of the opening 39 and facing inward is a plurality of elongate, generally vertically oriented tire gripping paddles 42. Eight paddles 42 are shown but more or fewer may be deployed if desired. The paddles 42 are generally L-shaped having a vertical plate portion 44 and a horizontal bottom flange 46 extending into opening 39. Linkage arms 48 connect the paddles 42 together to maintain the paddles in a radial orientation relative to the opening 39. An upper connecting link 52 is further provided to tie the paddles together as shown. Spaced apart sets of upper and lower actuation arms 52, 54 are pivotally coupled at remote ends to the paddles 42 and pivotally coupled at opposite ends to pivot rods 58. The arms 52, 54 are linked together to swing the paddles 42 in unison along an arcuate path radially inward and outward as the arms 52, 54 pivot about the pivot rods 58. The paddles 42 are mounted to pivot at the remote end of the arms 52, 54 to maintain a radially inward facing tire clamping orientation at the innermost extent of the arcuate path. The pivot rods 58 extend vertically between the plates 41, 43. Accordingly, paddles 42 move reciprocally in unison between a radially innermost tire clamping position and a radially outward tire release position as arms 54, 56 pivot.

An air cylinder 60 is mounted and includes a drive shaft coupled to arms 54, 56. The drive shaft of the cylinder 60 is linked by a conventional linkage to the arms 54, 56 that are linked to each paddle 42. Accordingly, the drive shaft of cylinder 60, by way of reciprocal axial movement, imparts rotational movement to the arms 54, 56, whereby moving the arms 54, 56 and the paddles 42 connected thereto between the tire clamping and release positions as described above. A circular support frame 62 carries the tire gripping assembly 40 and is secured to a support stand 64. A ball screw mechanism 66 is driven by a servo-motor 68 and couples by means of drive linkage 69 to raise and lower the tire unloading assembly 36 along rails 70. Rails 70 are spaced apart and positioned to extend vertically up the post 38. A drive motor 72 is coupled to rotate the tire gripping assembly 40 180 degrees between the positions illustrated in FIGS. 12 and 13. The assembly 40 is mounted to shaft 74. Motor 72 engages shaft 74 by means of clutch 76 to drive shaft 74, thus effecting programmed reciprocal pivotal movement of the assembly 40. Cables are routed to the unit by means of cable carrier 71. An encoder position sensor 78 controls pivotal movement of the assembly 40.

Figure 4:
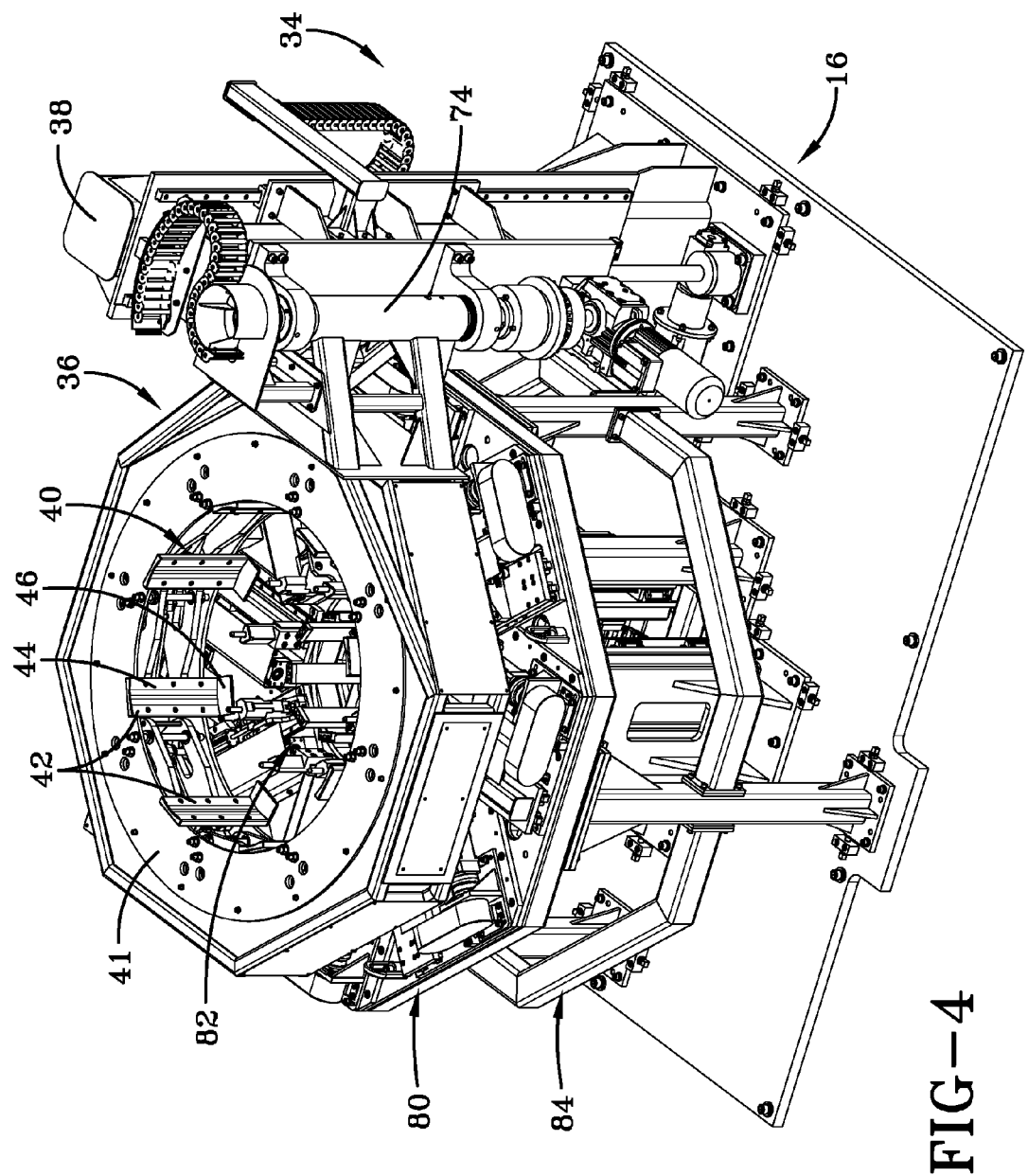
FIG. 4 is a perspective view of the lower core manipulator assembly.
Figure 5:
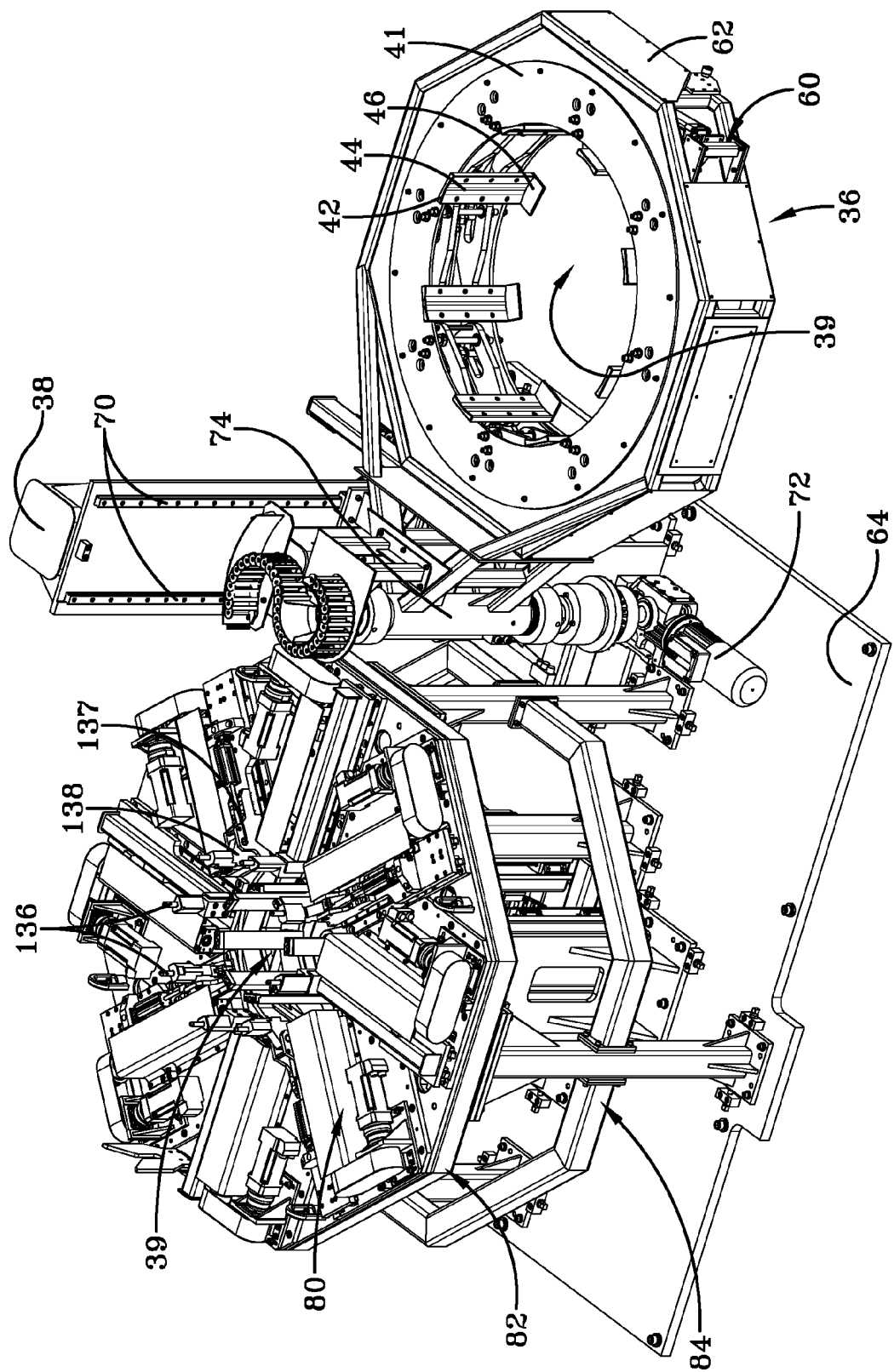
FIG. 5 is a perspective view of the lower core segment handling assembly.
Figure 6:
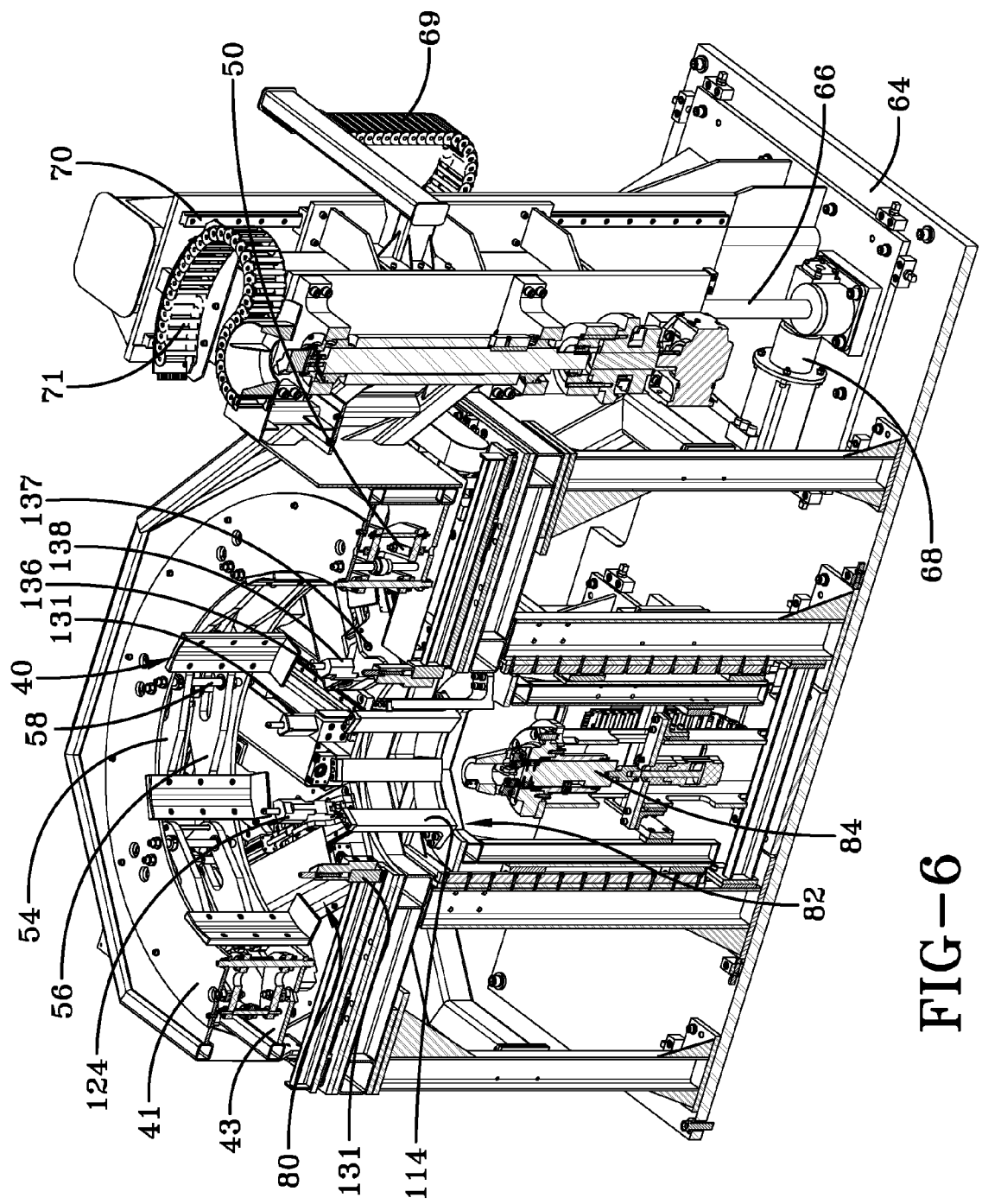
FIG. 6 is a perspective view of the lower core segment handling assembly with portions removed for illustration.

Referring to FIGS. 4, 5, 6, the tire unloading apparatus 36 is shown positioned generally above the remaining sub-assemblies of lower core manipulator 16, namely the lower core segment handling assembly 80, a central core segment supporting apparatus 82, and a lower spindle clamping assembly 84. As best seen from FIGS. 7 and 8, the lower spindle clamping assembly 84 provides an upward directed clamping mechanism 86 including a frustro-conical support 88 mounted to move vertically in reciprocal fashion within support column 87. A pneumatic cylinder 104 is mounted to move the mechanism 86 vertically along rails 96. An air cylinder 90 through a drive rod 92 is coupled to pivot four latch members 94 mounted within respective openings 95 within the support 88. The four latch members 94 reside within the openings 95 spaced equidistant and ninety degrees apart about the frustro-conical support 88. The latch members 94 are spring biased to an inward position that places and holds the latch members 94 within detents in a lower core spindle assembly 240. The latch members 94 are spring biased in the inward latched position until the rod 92 moves axially upward and cams the latch members 94 outward and out of their respective core spindle detents, whereby releasing the lower core assembly from the frustro-conical support 88 as will be further explained. U.S. patent application Ser. No. 11/292,991, incorporated by reference herein, shows and describes the attachment and release mechanisms employed between the core assembly and a clamping mechanism configured similarly as the clamping mechanism 86.

The clamping mechanism 86 moves reciprocally in the vertical direction along rails 96. A freestanding support stand 98 is provided. Power and control cables are routed to the bottom spindle clamp assembly 84 from a control tower 100 along a cable support 102. An air cylinder 104 with an integrated rod clamping braking mechanism 93 is mounted to vertical support column 106 and reciprocally drives the assembly 86 along rails 96.

Figure 9:
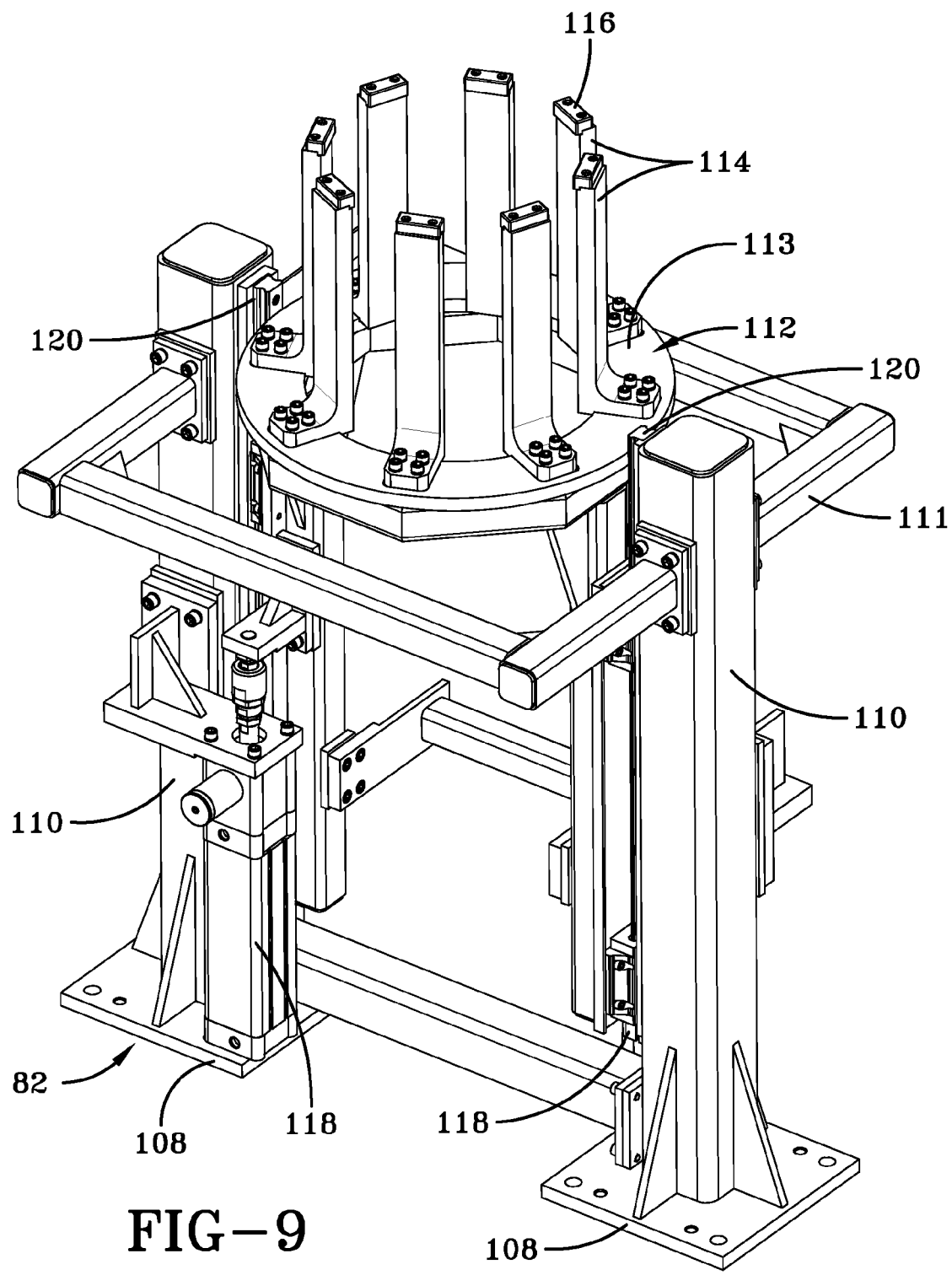
FIG. 9 is a perspective view of the core segment support apparatus.

Referring to FIG. 9, the core segment support apparatus is shown in detail. A pair of support base members 108 support posts 110. A rectangular frame 111 is coupled to an upper end of the posts 110. Between the frame 111 is a central moveable segment support frame 112. The support frame 112 includes a circular plate 113. Circumferentially spaced about and projecting upward from a top surface of the plate 113 is a circular array of L-shaped arms 114, each having a pad 116 affixed to a remote end. Pads 116 are composed of abrasive resistant material such as bronze or plastic. While eight arms 114 are illustrated, corresponding to the number of segments within the lower core assembly, more or fewer arms may be employed if necessary for alternative core assembly configurations. A pair of air cylinders with a braking mechanism 118 attach to the posts 110 and act to reciprocally move the moveable support frame 112 along rails 120 that extend upwardly along the inward facing sides of the posts 110. The circumferential array of spaced apart L-shaped arms 114 define a circular array having a diameter allowing each of the arms 114 to support a respective segment component of a segmented core 234.

Figure 10:
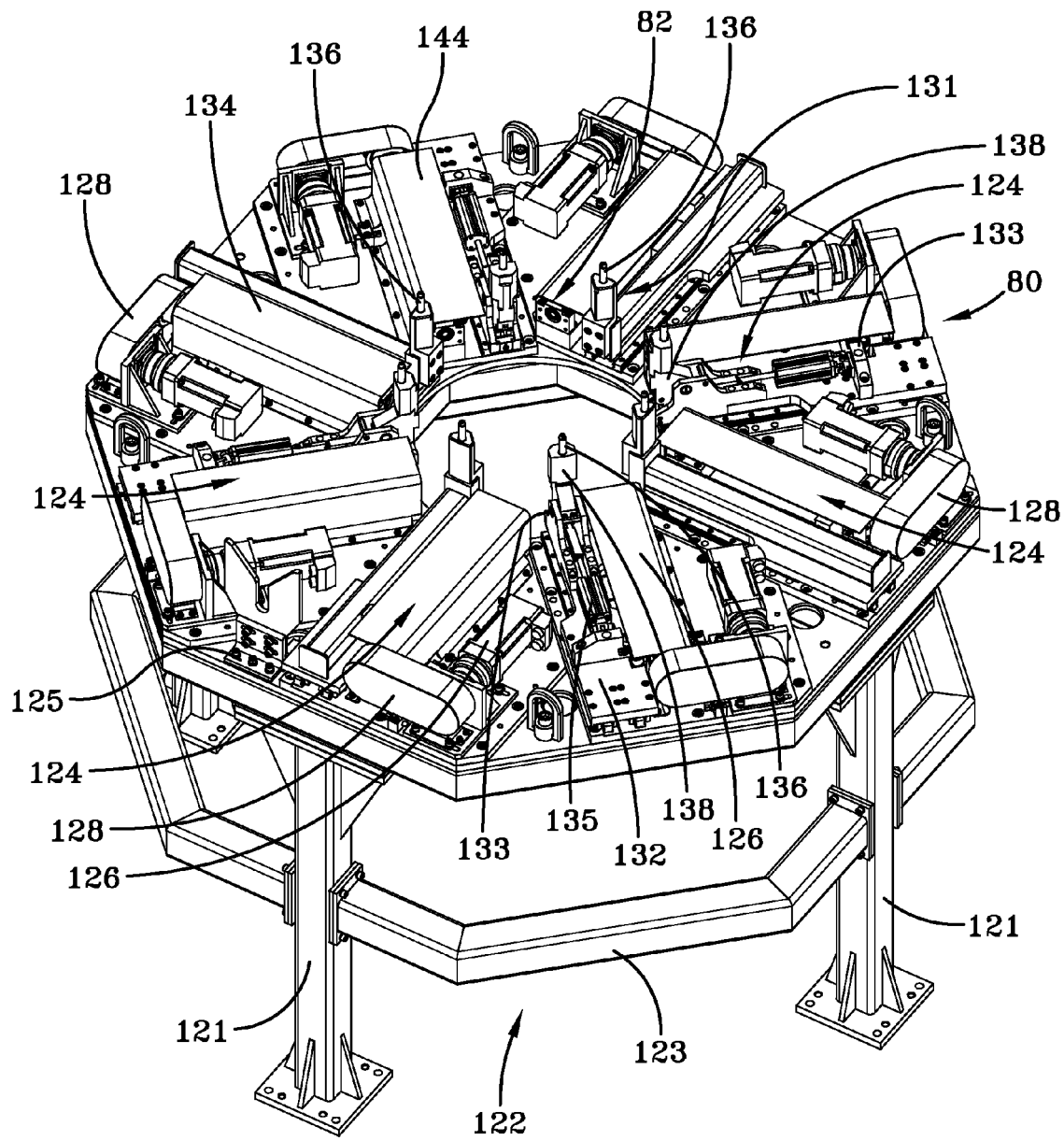
FIG. 10 is a perspective view of the lower core segment handling assembly.
Figure 11:
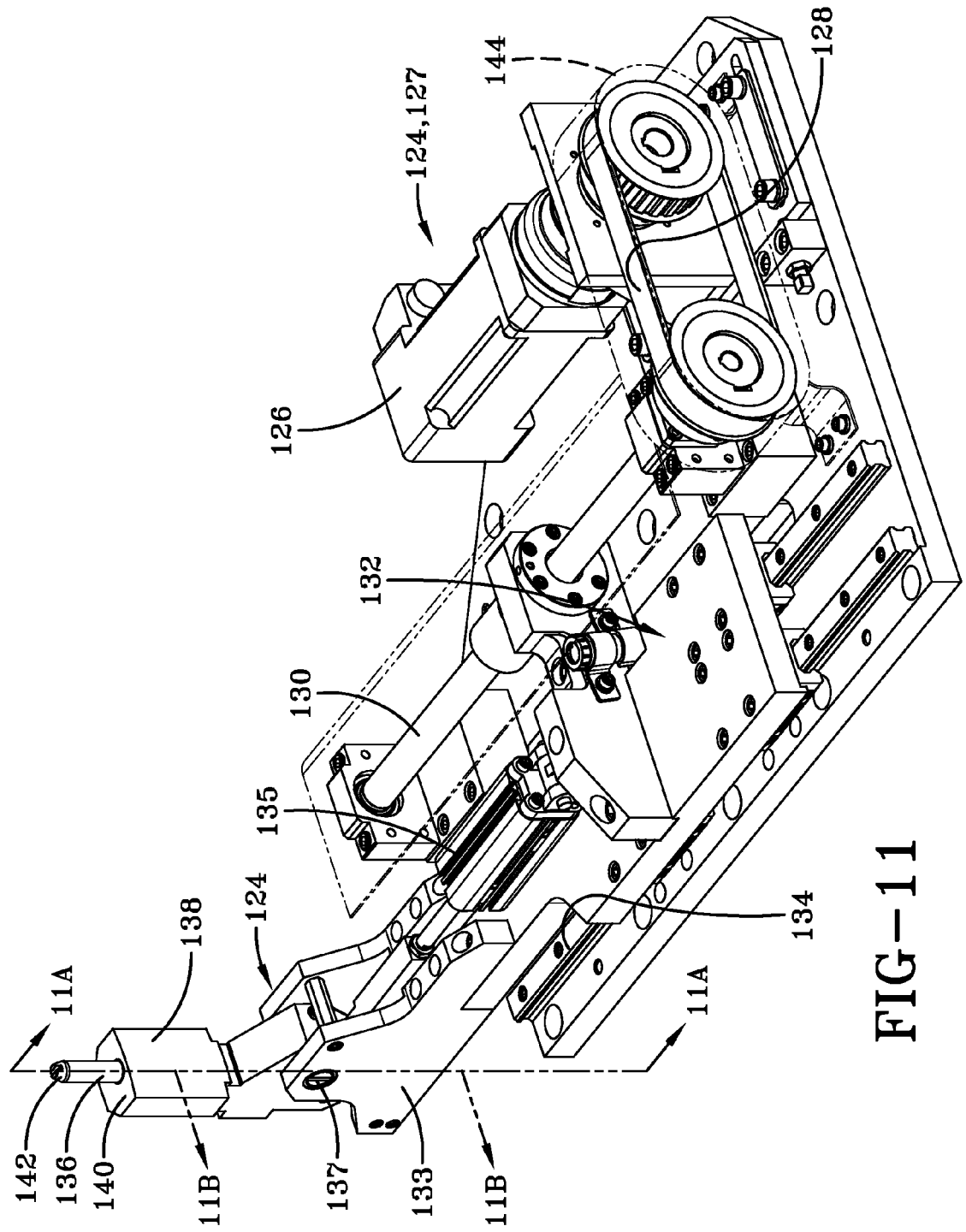
FIG. 11 is a perspective view of one of eight core segment pin subassemblies.

FIGS. 5, 10, 11, 11A, and 11B illustrate the lower segment handling assembly 80. The lower core segment handling assembly 80 is supported in a free standing frame 122 by support posts 121 connected by cross support braces 123. A circular array of eight radially extending alternating segment pin sub-assemblies 124, 127 are positioned on an upper top plate 125, the eight sub-assemblies corresponding to the eight core segments comprising the assembled annular core. There are four pin sub-assemblies 124 for the key segments 244 and four pin sub-assemblies 127 for the larger core segments 246. More or fewer sub-assemblies 124, 127 may be used as necessary to accommodate more or fewer core segments. Each sub-assembly 124, 127 has a servo-motor 126 coupled by a positive drive belt 128 to ball screw 130. The ball screw 130 is coupled to drive sub-assembly 132 axially along guide rails 134 as shown in FIG. 11. Positioned at the forward end of the moveable frame 132 and projecting upward is a pin 136 supported by block 138. The pin 136 extends from a segment support surface 140 situated at a remote end of the block 138 and each pin is provided with a convex lead-in remote surface 142 to facilitate insertion of pin 136 into a respective segment pin-receiving aperture. Each pin 136 is thus reciprocally moveable in a radial direction along the plate 125 between an inward, segment engaging position and an outward storage position. The configuration of the pin array on surface 125 is such that the pins 136 are positioned to insert into appropriate respective apertures extending upwardly into respective core segments. A protective guard 144 covers the belt 128. The tilting pin assembly 124 is depicted in FIG. 11 and represents a key segment engaging assembly. The segmented core is assembled from smaller key segments 244 alternating with larger core segments 246 in a circular array.

During disassembly of the core, the four segment pin assemblies 124 and the four large segment pin assemblies 127 are in the radially outward position (FIG. 10). The pins 136 of the four key segment engaging assemblies 124 project into respective key segments 244 from below and the pins 136 of the large segment engaging assemblies 127 project into respective large segments 246 from below. A cured tire 230 is positioned on the assembled core 234. The segments 244, 246 are moved radially to the center of the assembly 15 and removed one by one from the center opening of the core and the tire. The key segments 244 are first removed, one by one. Each key segment is moved radially inward by its assembly 124 to the center of the core and tire assembly 15. From the center location, the segment is picked by an upper segment manipulator 146 carried by the upper core manipulator 12. The segment is lifted up and out of the center core position by the manipulator 146 and transported to a storage station on the manipulator 12. The moveable frame 132 of the assembly 124 is then retracted radially outward and placed back into its initial position. Once all of the key segments 244 have been removed and stored, the larger segments 246 are removed one by one in like fashion.

Figure 38:
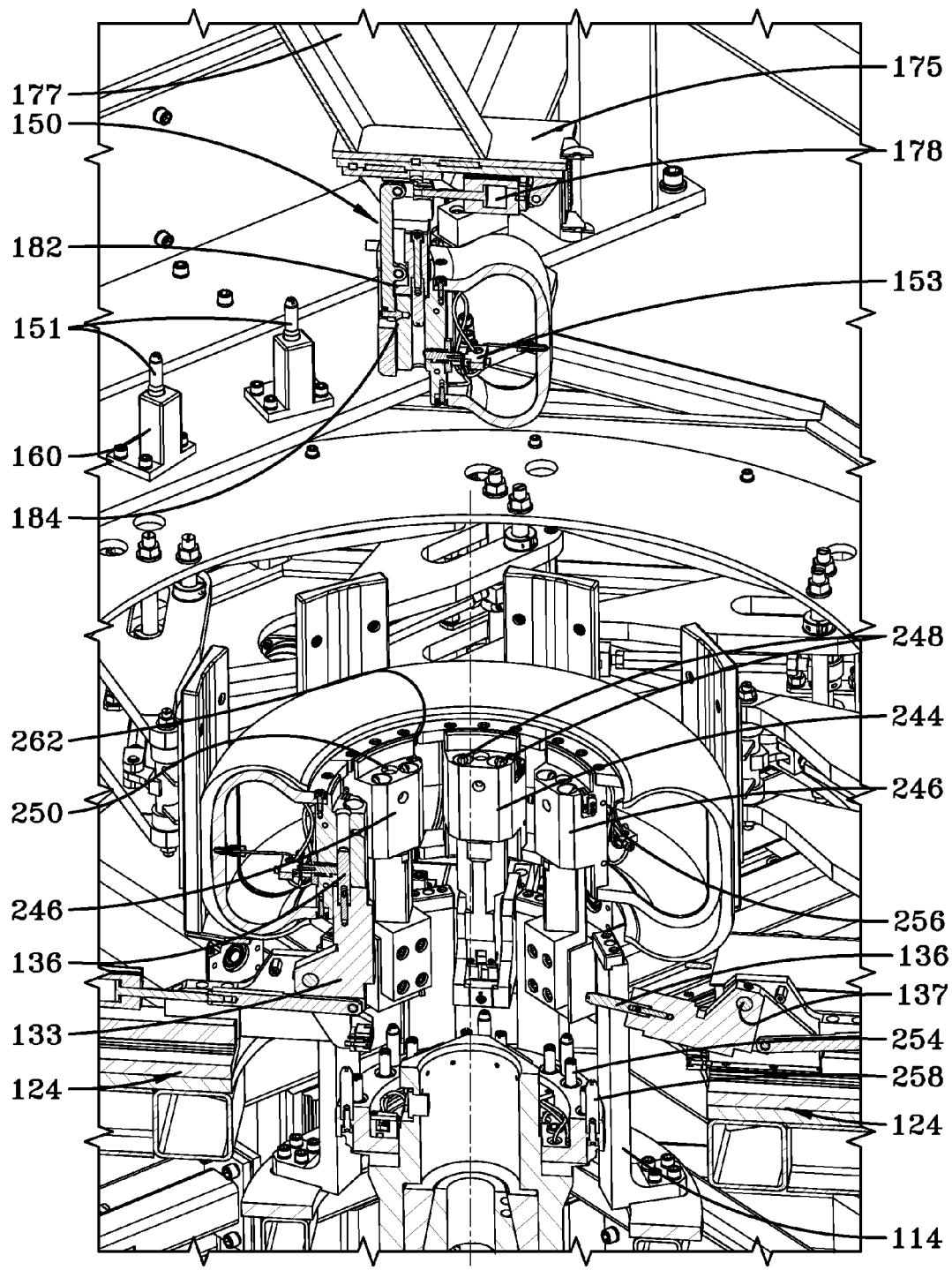
FIG. 38 is an enlarged perspective view of a portion of FIG. 37 showing a core segment lifted in preparation for transfer to storage.

Each of the four key segment assemblies 124 is constructed to allow the pin 136 carried thereby to be tilted from the upright pin position of FIG. 11 into a tilted, near horizontal orientation shown in FIG. 38. The tilting of each key segment assembly 124 occurs when the assembly is retracted into a radially outward storage position after delivering its key segment to the manipulator 146 at the center of the core assembly 15. Each of the four key segment assemblies 124 are tilted downward after unloading their respective key segments and returning to the radially outward storage position. The downward tilting of the key segment assemblies 124 allows sufficient clearance for each larger segment assembly 127 to move its larger segment 246 past the adjacent key segment assemblies 124 to the center of the core and tire assembly 15 for delivery to the manipulator 146.

At the conclusion of the core disassembly, all of the segment handling assemblies 124, 127 are returned to their respective radially outward storage positions shown in FIG. 10. The key segment handling assemblies 124 are tilted upward and back into a vertical orientation in preparation for the core re-assembly procedure. In the storage position, the segment handling assemblies 124, 127 generally take the form of the assembled core 15. However, the position of the key segment handling assemblies 124 in the retracted location is slightly radially inward relative to the large segment handling assemblies 127. The manipulator 146 delivers the core segments back to positions on their respective pins 136 in reverse order one by one, larger segments 246 first followed by the key segments 244. After all of the segments 244, 246 are on their respective pins, the key segments 244 are moved radially outward to engage against adjacent large segments to form the final assembled shape of the core 15. The key segments 244 retain the larger segments 246 into the assembled circular segmented core 234 by the segment surface to surface abutment referenced at 262 of FIG. 38. Thus, the key segments 244 removed first from the circular array in order to allow removal of the larger segments 246 and returned last to the array in order to lock the larger core segments into place.

It will be appreciated that the key segment handling assemblies 124 are similarly constructed to the large segment handling assemblies 127 except that the assemblies 124 mount the segment pin 136 on a pivoting block 133 at the forward end of the assembly to facilitate the downward tilting of the pin for clearance as described above. The segment handling assemblies 127 for each larger segment 246 are similarly constructed to assemblies 124 except that the tilting capability and, hence, mechanism is not necessary and, accordingly, not present. Each pin 136 for the larger assemblies 246 is mounted to a fixed block (not shown). It will further be appreciated that the segments 244, 246 are removed one by one from the center of the core and tire assembly 15 during core disassembly to avoid the cured tire 120 on the core. Once the core has been disassembled and tire unloaded, the core segments 244, 246 are moved downward by the manipulator 146 onto the pins 136 in the radially outward position. The core is thus reassembled into final configuration segment by segment.

An activation cylinder 135 is mounted on the frame 132 and includes an actuation rod coupled to the pin supporting block 138. Actuation of the cylinder 135 acts to pivot the pin 136 from a core segment engaging vertical position (shown in FIG. 11) to a storage position approaching horizontal as in FIG. 38. Once all of the segments 244, 246 are disassembled, the pins 136 of the segment handling assemblies 124 are pivoted back into a vertical orientation to await reassembly of the core 234.

Figure 14:
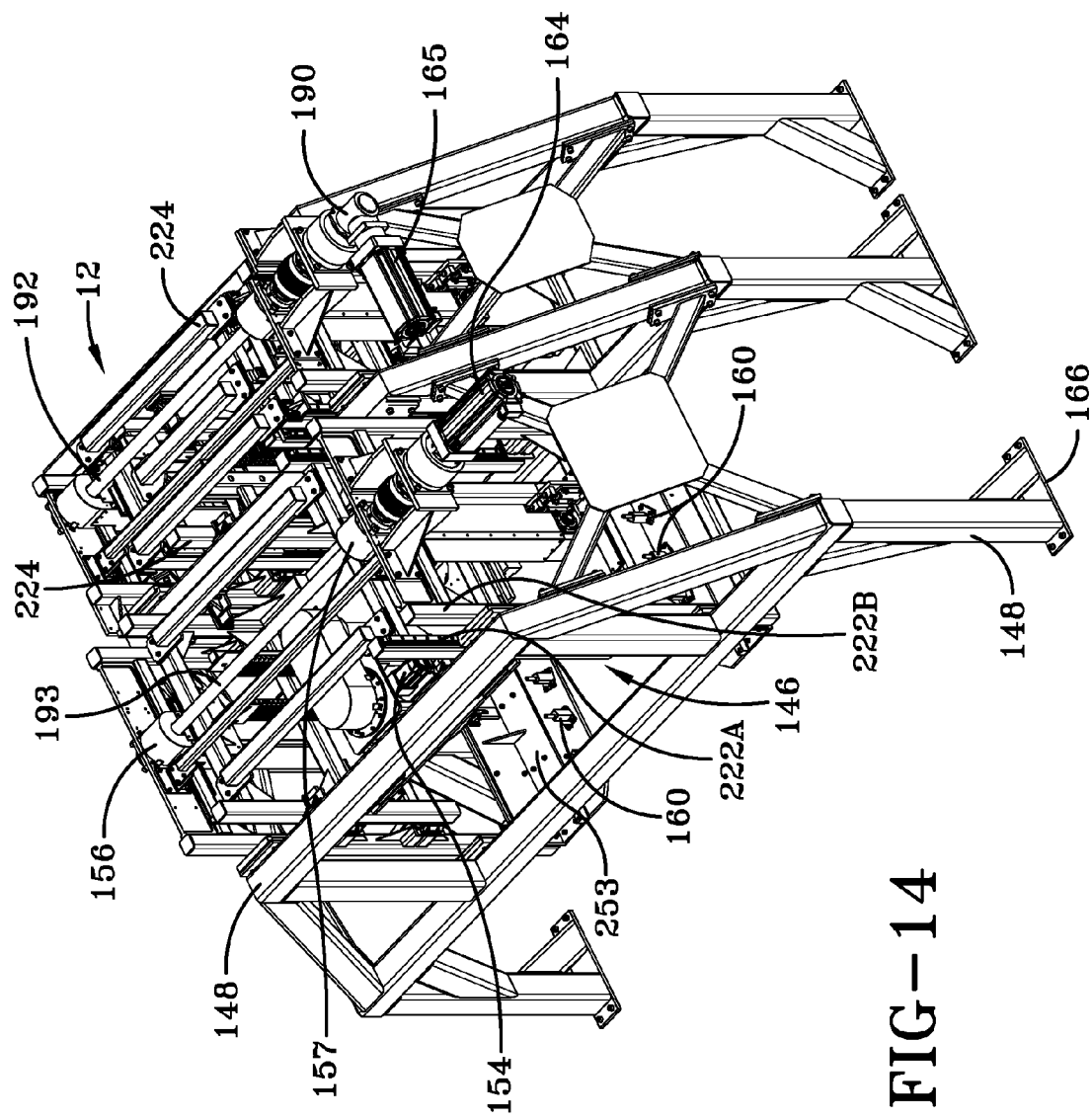
FIG. 14 is a perspective side view of the upper core manipulator.
Figure 15:
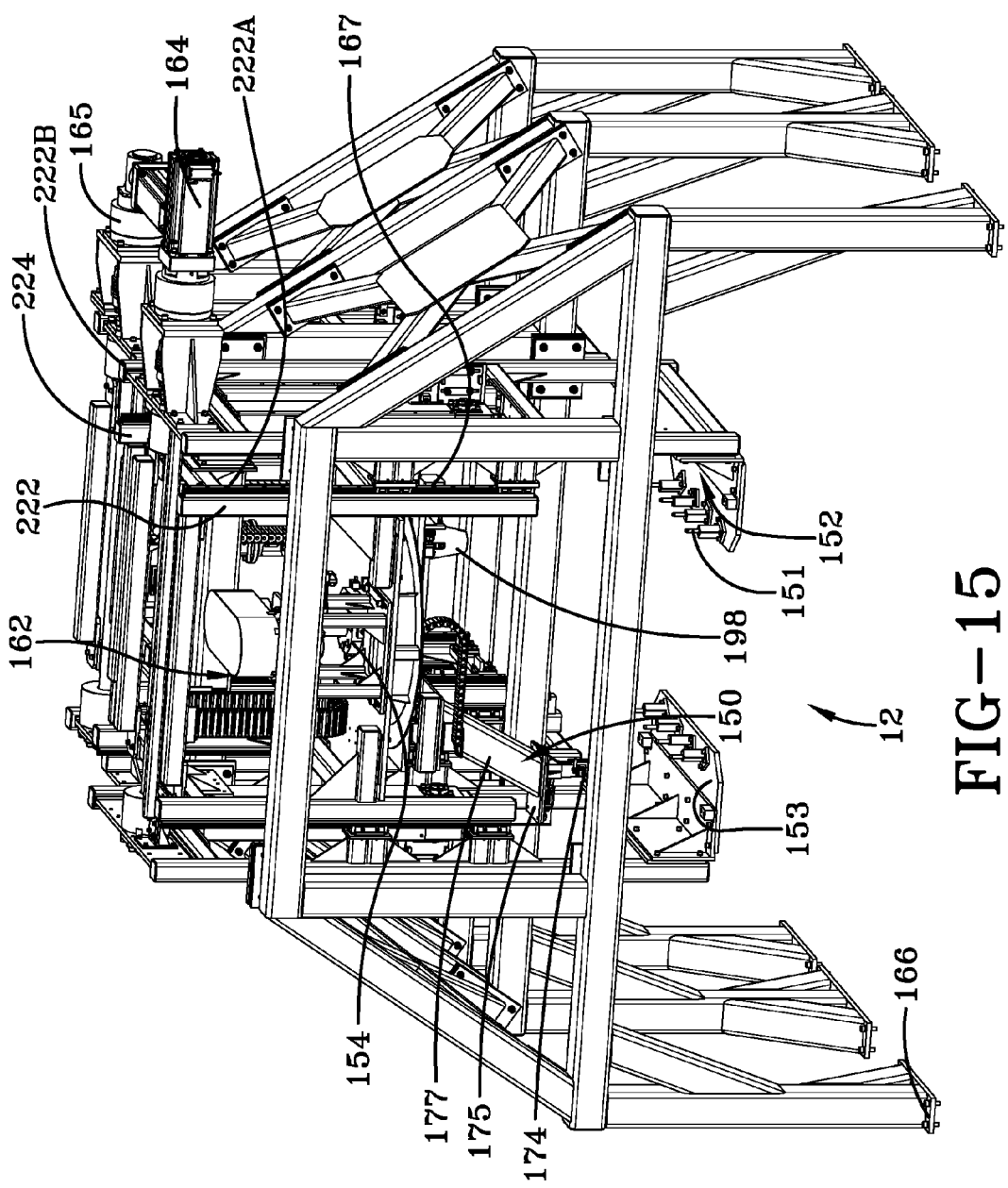
FIG. 15 is a perspective end view of the upper core manipulator.
Figure 22:
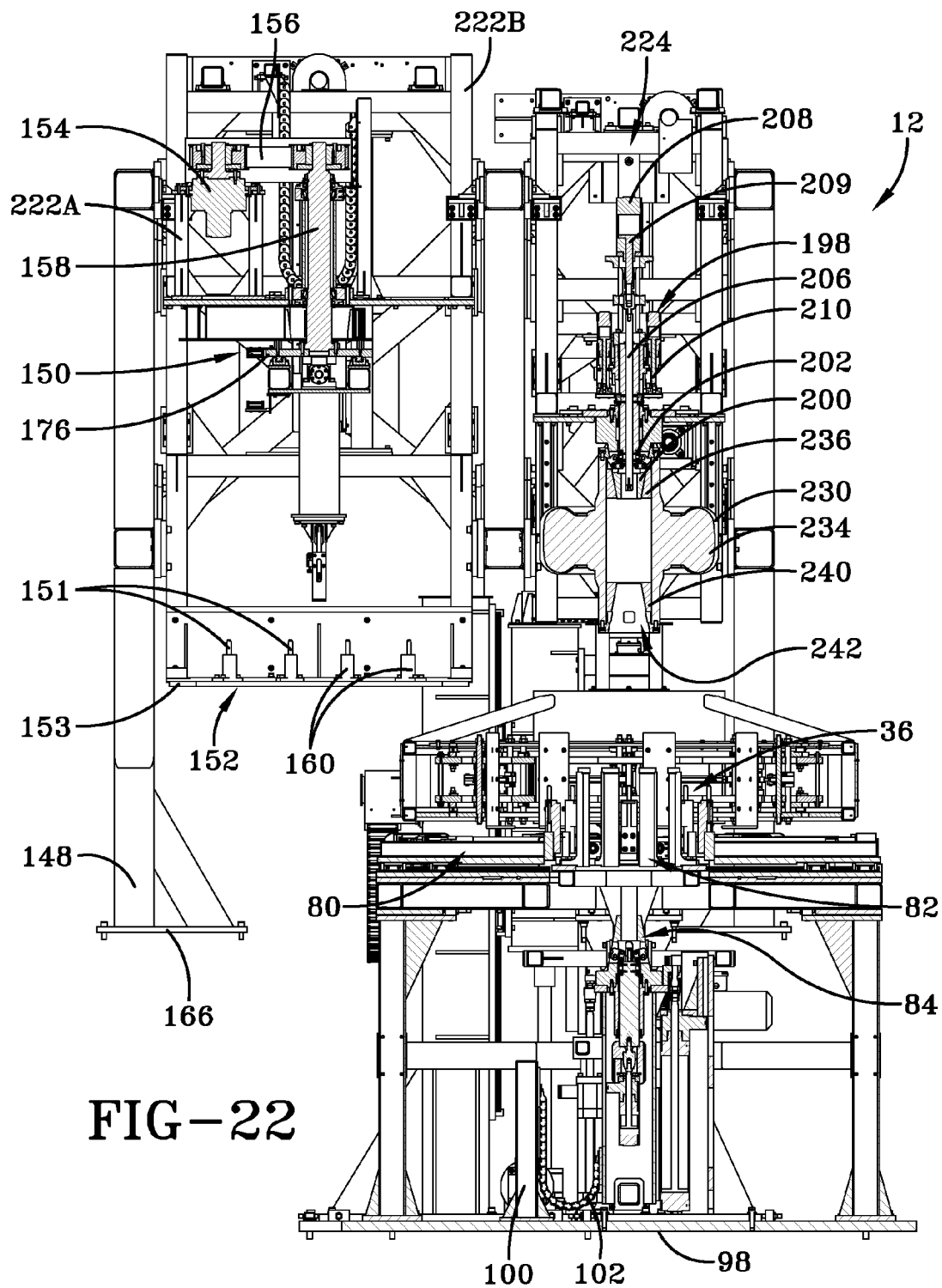
FIG. 22 is a sectional view of the core assembly/disassembly station shown in FIG. 21 taken along the line 22-22.

FIGS. 14, 15, and 22 show the upper core manipulator assembly 12 to include an upper core segment manipulator 146 and an upper spindle latch mechanism 198. Bridging trusses form a support frame assembly 148 that includes a frame 222 carrying the core segment manipulator 146 and a frame 224 for carrying the upper spindle latch mechanism 198. The frame 222 includes a vertically repositionable inner frame 222A and an outer frame 222B and the frame 224 an inner frame 224A and an outer frame 224B. The core segment manipulator 146 includes an upper core segment handling mechanism 150 (shown in detail by FIG. 16) that mounts to the inner frame 222A. The upper core segment manipulator 146 further includes a core segment storage station 152 adjacent the handling mechanism 150. A pair of spaced apart horizontal plates 153 is located within the storage station 152, each plate 153 supporting a linear array of four spaced apart, upwardly directed pin members 151. The pins 151, four on each side of the storage station 152, are dimensioned for insertion into a respective core segment socket and function to support a core segment within the storage station 152. Collectively, the eight pins 151 receive eight core segments in a disassembly sequence as will be describe, and temporarily store the segments until the procedure is reversed for core re-assembly.

Figure 35:
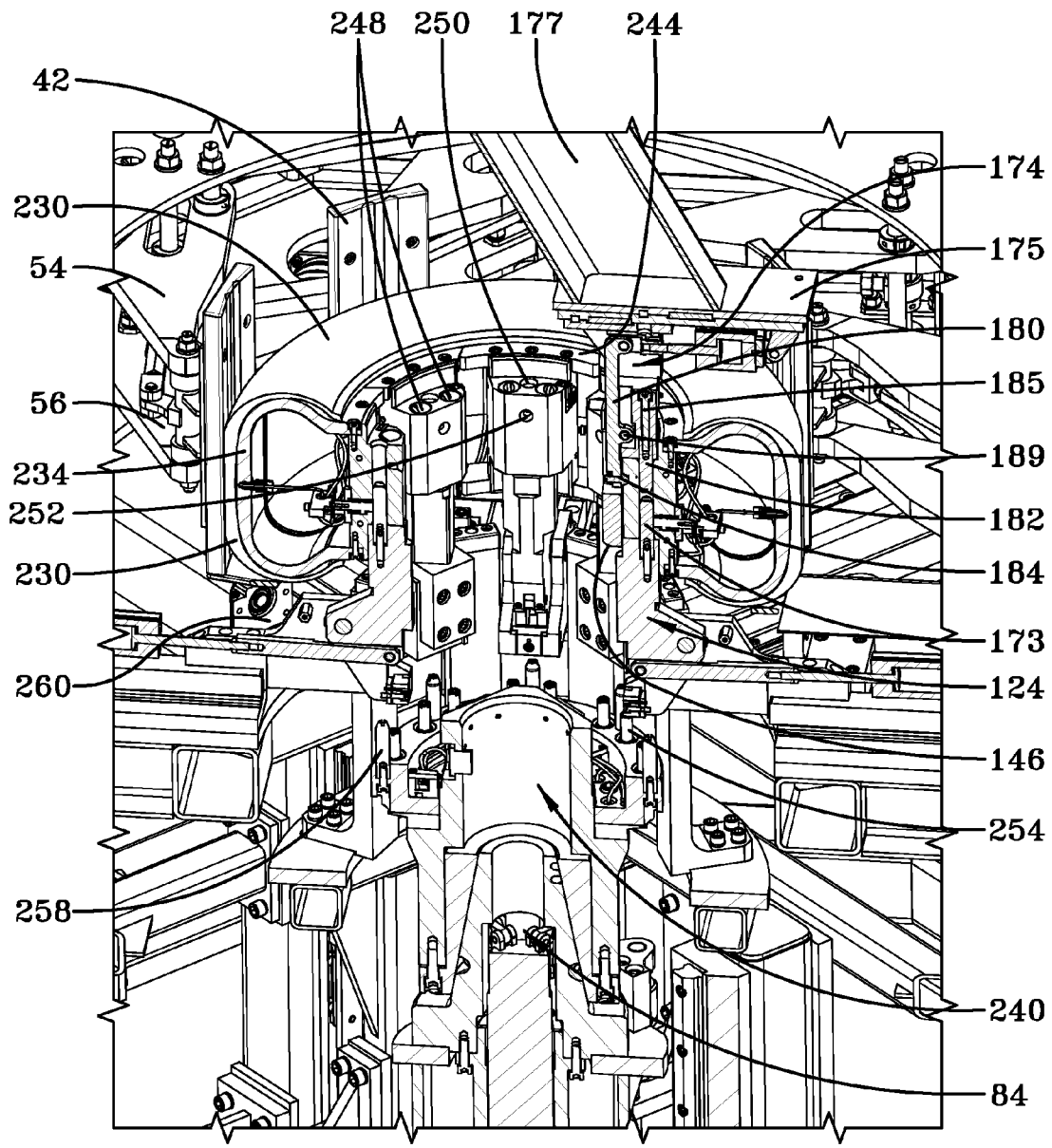
FIG. 35 is an enlarged perspective view shown in partial section of the core, upper segment manipulator, and core assembly/disassembly station from FIG. 34.
Figure 36:
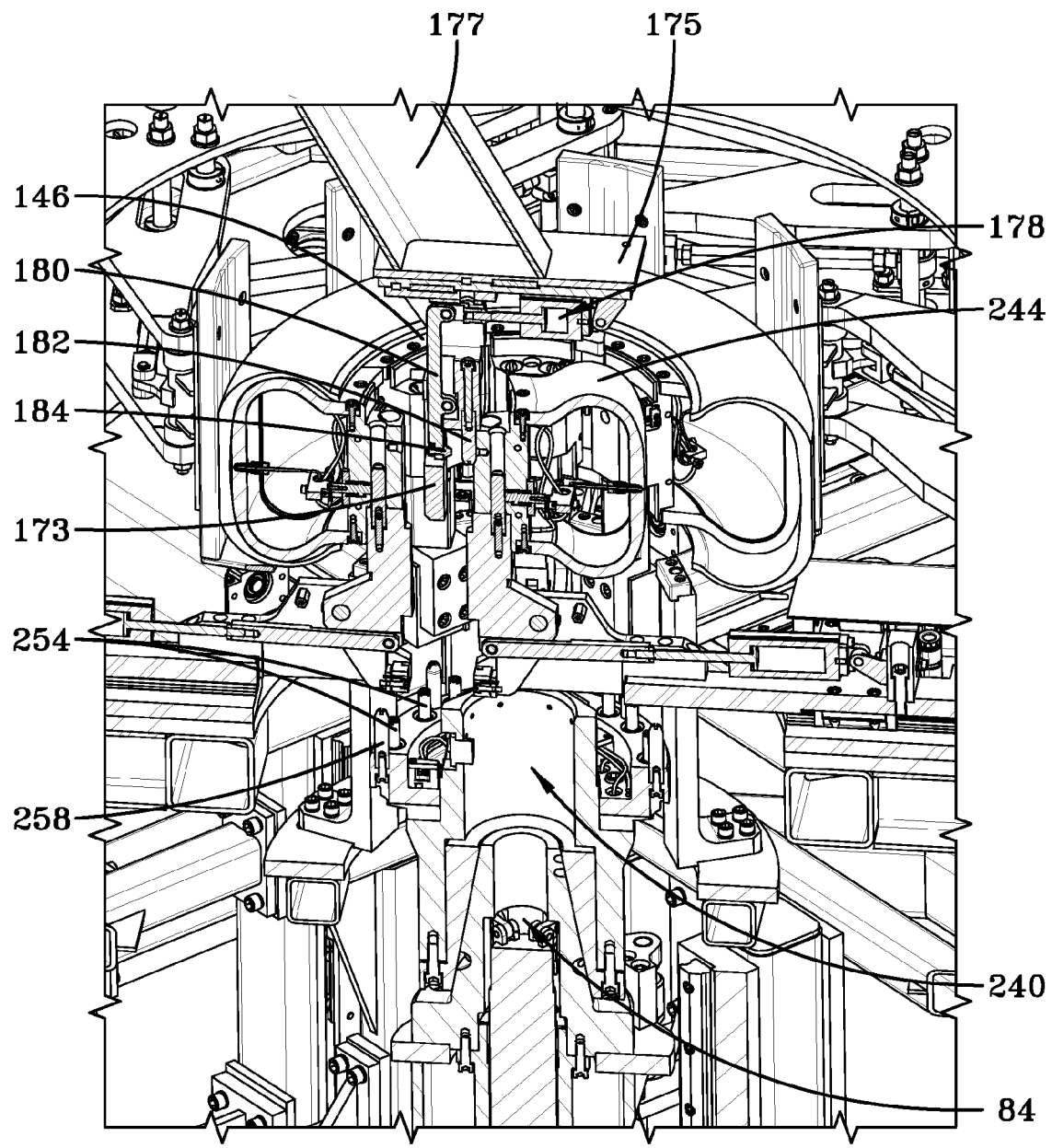
FIG. 36 is an enlarged perspective view shown in partial section of the core, upper segment manipulator, and core assembly/disassembly station in sequence to FIG. 35 and showing a key segment being driven to the center in the core disassembly sequence.

A gear box and servo-motor 154 is coupled by belt drive 156 to rotate a vertical shaft 158 360 degrees. Shaft 158 thereby rotates the upper core segment handling mechanism 150. Referring to FIGS. 14, 17, 41 and 42, the storage pins 151 within storage station 152 each extend from a respective pin support block 160. Each of the pins 151 is at a specific location in the storage station 152 determined by the core segment assigned to the pin. Each segment is picked by the core segment gripper 174 at the remote end of the core segment handling assembly 150. The horizontal pin 184 of gripper 174 is pivoted into a segment side socket 252 while the vertical pin 182 of the gripper 174 enters down into a segment vertical socket 250 (FIG. 35). Guide flange 173 assists in aligning the vertical pin 182 into a targeted segment socket. Once the pins 182, 184 are engaged into respective sockets within a segment, the segment is securely gripped and may be moved radially inward and lifted out of the core segment array as the upper core segment handling assembly 150 is moved upward along the frame rails 167. The lifted segment is transported laterally by the assembly 150 along rails 170 until reaching an intended pin 151 in the segment storage station 152. The segment is then lowered onto the intended pin 151 and rotated by pivotal movement of the gripper 174 into the position depicted in FIG. 42. The segment is released as the horizontal pin 184 is pivoted out of the segment side socket. The assembly 150 is raised and may return to the core by a reverse procedure to locate and retrieve another core segment. The procedure is reversed in a reverse sequence in order to reassemble the upper core during a core reassembly operation. Once completely reassembled, the segmented core 234 is available for another new tire build operation.

The storage location of each core segment 244, 246 is pre-assigned within the storage station 152 to correspond with the sequence the segments 244, 246 are disassembled and assembled. As discussed previously, the core 234 is constructed from alternating wedge shaped smaller key segments 244 and larger core segments 246. The key segments 244 entrap the larger segments 246 into the annular configuration of core 234 through an abutment of beveled segment surfaces 262. See FIG. 38. Accordingly, the smaller key segments 244 are removed first to facilitate subsequent removal of the larger core segments 246. Each of the four of the key segments 244 are removed and placed in the storage station 152 first, followed by the four larger segments 246. The sequencing used in disassembly will be understood from FIG. 42 in which the storage location in station 152 of the key segments K1-K4 and the larger core segments L1-L4 are identified. The key segments K1-K4 are positioned over center located pins 151 while the core segments L1-L4 are located on outer pins 151 adjacent to the same key segment that a given segment abuts within the assembled core array. Thus, the core segment, for example L4, in the assembled core would reside next to the key segment K1. The storage location of each larger segment 246 adjacent to its neighboring key segment 244 in the storage station 152 expedites the disassembly of the upper core as well as expedites reassembly of the core in a reverse procedure because the proximity of neighboring key/large segment pairs in the core is maintained in the storage station 152.

In addition, a radially inward face or side 251 of each segment 244, 246 is canted inwardly within the station 152 toward a center point "P" between the two sides of the station 152. The rotational travel of the gripper 174 necessary to deposit and to retrieve each segment is thereby minimized. The canted orientation of the front side 251 of each segment orients the vertical socket 250 and horizontal socket 252 of each segment toward the center point "P" where gripper 174 is stationed to provide the gripper 174 with oriented access to each segment 244, 246 whereby eliminating wasted motion and time. The position of each segment 244, 246 on the storage station plates 153 adjacent to the segment neighboring the segment within the assembled core; coupled with the radially inward cant of the forward side 251 toward the point "P" between parallel station plates 173, expedites assembly and disassembly of the upper core and reduces cycle time.

The upper core segment handling mechanism 150 is mounts to inner frame 222A that reciprocally moves along rails 167. A servo-motor/gear box 164 is coupled to drive the moveable frame 222A, and thereby the upper core segment handling mechanism 150, along vertically oriented rails 167.

Figure 16:
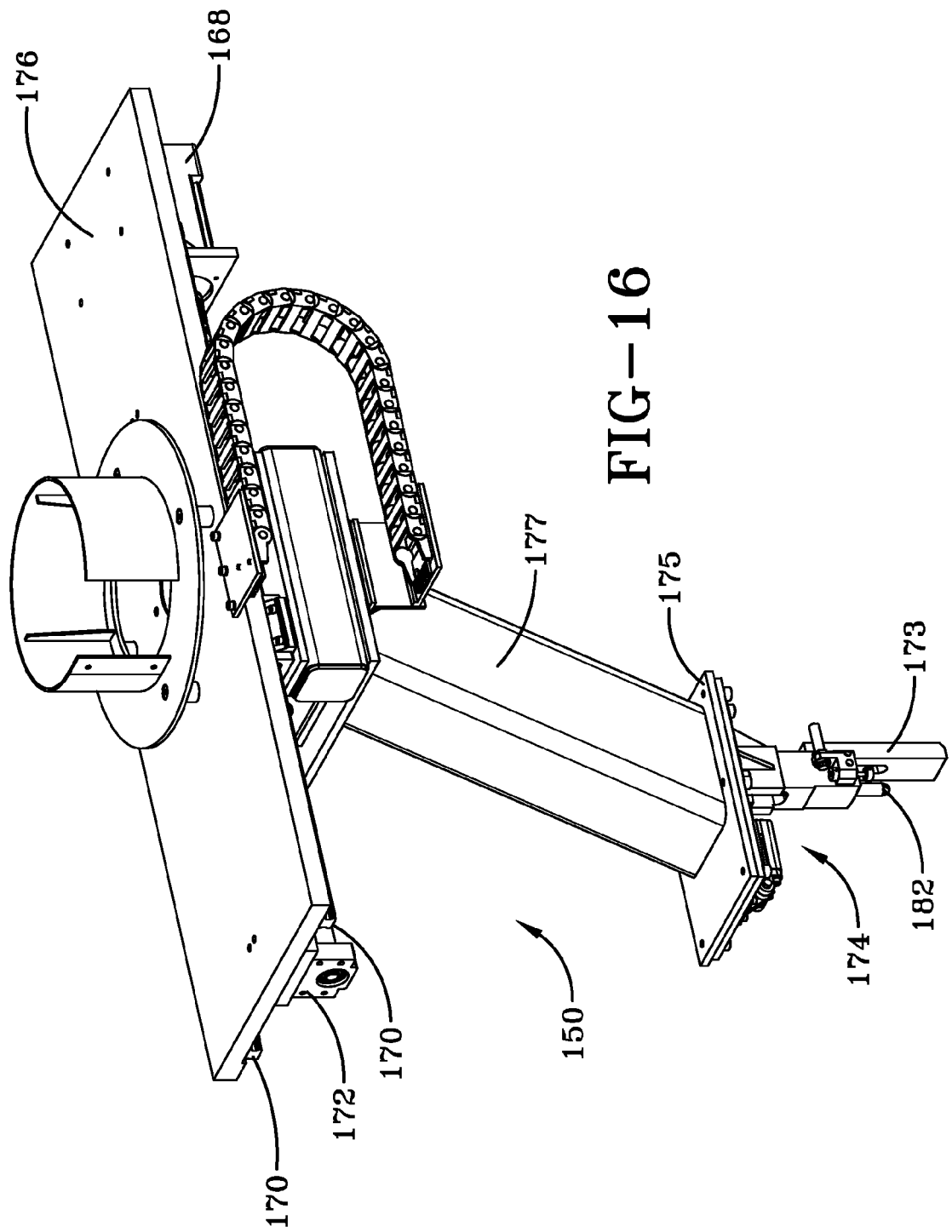
FIG. 16 is a perspective top view of the core segment gripping mechanism.

As will be seen from FIG. 16, a servo-motor 168 is mounted to drive ball screw 172 which moves the upper core segment handling mechanism 150 in a radial direction along rails 170. At the remote end of the mechanism 150 is a segment gripper assembly 174 including a mounting plate 175 from which a guide lead-in projection 173 depends. Arm 177 depends from base plate 176 at an acute angle. The segment gripper assembly 174 is connected to a remote end of arm 177 at a mounting plate 175.

With reference to FIGS. 16, 17, 17A, and 38, a support mount 179 extends from an underside of the mounting plate 175. Air cylinder 178 is pivotally coupled to the mount 179 at pin 181. A support arm 183 depends from the underside of the plate 175 and a vertical segment engaging pin 182 is secured by a screw 185 to the support arm 183. Pin 182 projects downward from the support arm 183 and is dimensioned for close downward receipt into a socket within each core segment as will be explained. A dependant pivot arm 180 is pivotally coupled to the remote end of an actuation rod of air cylinder 178 by pin 187. The pivot arm 180 is pivotally coupled by a lower pin 189 to the support arm 183. Actuation of the air cylinder 178 pivots the pivot arm 180 about pivot points 189, whereby moving a remote end of the pivot arm inside and outside of a passageway through the arm member 173. Secured to a remote end of the pivot arm 180 is a segment side engaging pin 184 which moves with the pivot arm remote end into and out of the passageway 188 through the arm member 173. A proximity switch 186 is mounted to the support arm 183 and controls the extent to which the pin 182 is inserted into each core segment by proximally detecting the presence of the core segment.

Referring to FIGS. 14, 15, 18, 19, and 28, a motor/gear box 165, 190 having an output shaft 192 is mounted to the frame 148 and drive shaft 192 is coupled to the core manipulator frame 224. The drive shaft 192 powers a reciprocal vertical movement of the core manipulator frame 224 along rails 192. Mounted to and depending from the frame 224 is an upper core spindle latch mechanism 198 shown in detail in FIGS. 18 and 19. The upper core spindle latch mechanism 198 reciprocally moves in the vertical direction on the inner frame 224A of the frame assembly 224. The mechanism 198 as shown includes a frustro-conical nose 200 having four circumferentially spaced latch members 202. Members 202 pivot about a respective pivot pin 203 within respective openings 205 between an outward latched position in which members 202 protrude beyond an outer surface of the nose 200, and a retracted unlatched position in which each latch member 202 is within a respective passage 205. A cylindrical sleeve 204 extends axially within an upper housing 216 of the mechanism 198 and a co-axial actuation rod 206 is positioned within an axial bore 201 of the sleeve 204. The actuation rod is provided with an end cap 207. An air cylinder 208 is positioned above the housing 216 in axial alignment with the sleeve 204 and includes a push rod 209 coupled by a clevis 213 to the actuation rod 206. Axial motion of the actuation rod 206 operated the internal latching mechanism in the upper spindle assembly of a tire building core assembly 15, allowing it to be detached from the lower spindle assembly at the appropriate stage in the core disassembly process. A pair of air cylinders 210 mounts to opposite sides of the housing 216 surrounding the sleeve 204 and each cylinder 210 has a push rod 215 that is coupled to an angle bracket. Angle brackets 219 are positioned on either side of sleeve 204 and are attached to it by means of screws 218. Each latch member 202 attaches to the sleeve 204 by a fitting 212. The upper core spindle latch mechanism 198 is lowered by moving frame 224 downward as described above until nose 200 is received into an upper spindle assembly socket of a tire building core assembly. The latch members 202 pivot outward to engage recesses within the spindle assembly socket sidewalls. Upon encountering the recess, the latch members 202 load outward by the force applied by cylinders 210 into a latched relationship with the core recess. The upper core spindle latch mechanism 198 is thereby secured to the upper spindle assembly of a tire building core.

The core, subsequent to latching engagement with spindle latch mechanism 198, may be lifted and lowered axially by the mechanism 198 traveling along the rails 226. U.S. patent application Ser. No. 11/292,991 describes and shows the latching mechanism employed in attaching the upper core spindle latch mechanism 198 to the core and tire assembly 15.

The core assembly 15, once attached to the latch mechanism 198, is transported station to station in the curing line 10 by the upper core manipulator 12 traveling reciprocally along the rail assembly 30. As will be seen from FIG. 21, the upper core manipulator 12 is configured to suspend a core and tire assembly 15 attached to latching mechanism 198 a distance "H" above the feet 166 of the frame 148. As will be apparent from FIGS. 1 and 2, the distance "H" is of sufficient height to create clearance between a core and tire assembly 15 suspended from the manipulator 12 and stations 16, 18, 22 comprising curing line 10. Accordingly, the clearance created by the height "H" allows the manipulator, for example, to transport a cured tire and core assembly 15 over a second tire and core assembly at another station. Multiple core and mold units may thereby be processed simultaneously at different locations within the line 10 whereby improving efficiency by reducing cycle time.

It will be appreciated that the latch members 202 may be pivoted into a retracted unlatched position by axially moving the sleeve 204 within mechanism 198 upward under pressure from the air cylinders 210. The sleeve moves upward causing the linkages to pull the latch members 202 inward until each latch member 202 exits its respective detent in the core upper spindle assembly sidewalls and retracts each latch member 202 into its respective opening 205. In the retracted position, the latch members 202 do not protrude beyond the outer surface of the frustro-conical nose 200. Upon movement of the latch members 202 within the respective openings 205 into the retracted position, the nose 200 is released from the upper spindle assembly socket and the core upper spindle latch mechanism 198 may be withdrawn from the upper spindle assembly socket by vertical movement of the core manipulator frame 196.

Referring collectively to FIGS. 3, 12, 14, 15, 20, 21, 23, 25, the upper core manipulator 12 includes four vertically oriented guide rails forming outer frame 220B supporting the inner frame 222A for core segment manipulation. The frame 224A similarly moves vertically along a vertical set of rails 226 to raise and lower the latch mechanism 198. The latch mechanism 198 lifts the upper core spindle assembly 236 from a core and tire assembly 15 stationed on the lower core manipulator 16. Access to the core segments 244, 246 is thereby facilitated. Thereafter, the manipulator 12 moves along the rails 30 until the upper core segment handling assembly 150 is above the manipulator 16. The segments are sequentially disassembled from the assembled core by moving the segments 244, 246 radially inward using a coordinated motion between assembly 150 and the core segment handling assembly 80 and then axially moving the segments to escape the confines of the tire and core assembly 15 using assembly 150. The cured tire 230 is dropped from the unloader 36 after the segmented core 234 has been disassembled. Reassembly of the core is conducted in reverse fashion. Alternatively, the segments 224, 246 may be removed by radially moving them inward using only assembly 80 and then moving them axially with assembly 150. This allows assembly to be storing the previous segment while the current segment is being moved radially, thus reducing cycle time.

As seen in FIGS. 25, 35, 36, and 38, the core and tire assembly 15 is shown to include a tire carcass 230 extending between a tire bead 232. The carcass 230 mounts to a segmented core 234 that includes an upper core spindle assembly 236 having a frustro-conical socket 238 extending therein along a longitudinal spindle axis. The core 234 further includes a lower core spindle assembly 240 having a frustro-conical socket 242 extending therein along a longitudinal spindle axis. The body of the core 234 is toroidally shaped formed by a plurality of alternating core small key segments 244 and core large segments 246, each segment having an outer surface portion that together define a toroidal outer surface surrounding a central axis. The core 234 in the assembled configuration is adapted to hold a green tire on the toroidal outer surface. The tire carcass 230 is constructed onto the core 234 at a tire building station (not shown). At the conclusion of the tire build operation, the assembly 15 consisting of the core 234 and green tire carcass 230 is transported to the upender apparatus 14 of curing line 10 where the assembly 15 is upended from an axial horizontal orientation to an axially vertical orientation. The upper core manipulator 12 traverses rails 30 to the upender 14 where the latching mechanism 198 is employed to latch into the upper spindle assembly 236 of the core and tire assembly 15. The mechanism 198 lifts the assembly 15 and transports the assembly 15 to the mold assembly station 22 where a multiple component mold is constructed around the assembly 15.

A plurality of electrical connector sockets 248 extend into ends of the core segments 244, 246. Also disposed within the ends of the core segments 244 is a pin socket 250. A horizontally extending bore 252 extends into the base of each segment 244, 246. The segments 244, 246 are composed of suitable material such as aluminum, each segment having a resistive heating element attached to the segment for heating the segment to a desired temperature during the curing cycle. Electrical conductors 256 are provided to provide electrical power to the segment heating elements. The conductors 256 are electrically connected to connectors within the electrical sockets 248 of each segment. The connectors within sockets 248 are engaged by pins in the spindle assemblies 236 and 240. U.S. patent application Ser. No. 11/292,991 describes the electrical and mechanical components and connectors electrically and mechanically connecting the upper and lower core spindle assemblies 236, 240 with the segmented core 234.

Operation of the apparatus described above is as follows. The tire building core assembly and disassembly station 34 is a part of the cure line assembly 10. Its purpose is to receive a tire building core 15 with a freshly cured tire 230 attached from the mold assembly station 18, disassemble the tire core piece-by-piece from inside the cured tire, transport the cured tire away from the main zone of the cure line 10, and then re-assemble the tire building segmented core 234 and place it back into the tire building process. All of this activity is preferably to be preformed in a totally automatic mode without a machine operator.

The cure line 10 is shown in a preferred layout in FIGS. 1 and 2. Other arrangements of the sundry stations within the line may be utilized to suit the preferences of or facilities of the user. As shown in FIG. 1 and previously explained, the stations of the cure line 10 are from right to left:
1. The tire upender 14, partially hidden by the upper core manipulator 12 mounted on the cure line rail transport assembly 30.
2. The tire building core assembly and disassembly station 34 consisting of the lower core assembly station 16 and the upper core manipulator 12. FIGS. 1 and 2 show only the lower core manipulator 16 because the upper core manipulator 12 has been moved to the tire upender station 14.
3. The mold assembly station 18.
4. The mold loading and storage station 20, shown in FIGS. 1 and 2 with the mold transport assembly or manipulator 26 mounted on another part of the cure line rail transport assembly 30.
5. The cure station 22.
6. The jib crane 236, used for positioning the induction curing dome 24.

FIG. 3 shows the tire building core assembly and disassembly station 34. As described above, the station 34 is comprised of two main assemblies. The lower core manipulator station 16, which is fixed to the cure line foundation plate assembly, and the mobile upper core manipulator assembly 12, which is connected to the cure line rail transport assembly 30 and moves between the tire upender 14, the lower core assembly station 16, and the mold assembly station 18. The connection to the rail assembly 30 is not shown for clarity in FIG. 3, and therefore, the upper core manipulator assembly 12 appears to be floating in space.

The lower core manipulator assembly 16 is shown in FIGS. 4 and 5. FIG. 6 shows the assembly in a cross-sectional view. This assembly includes four sub-assemblies: the bottom spindle clamp assembly 84, the core segment support assembly 82, the lower core segment handling assembly 80, and the tire unloader 36.

Figure 7:
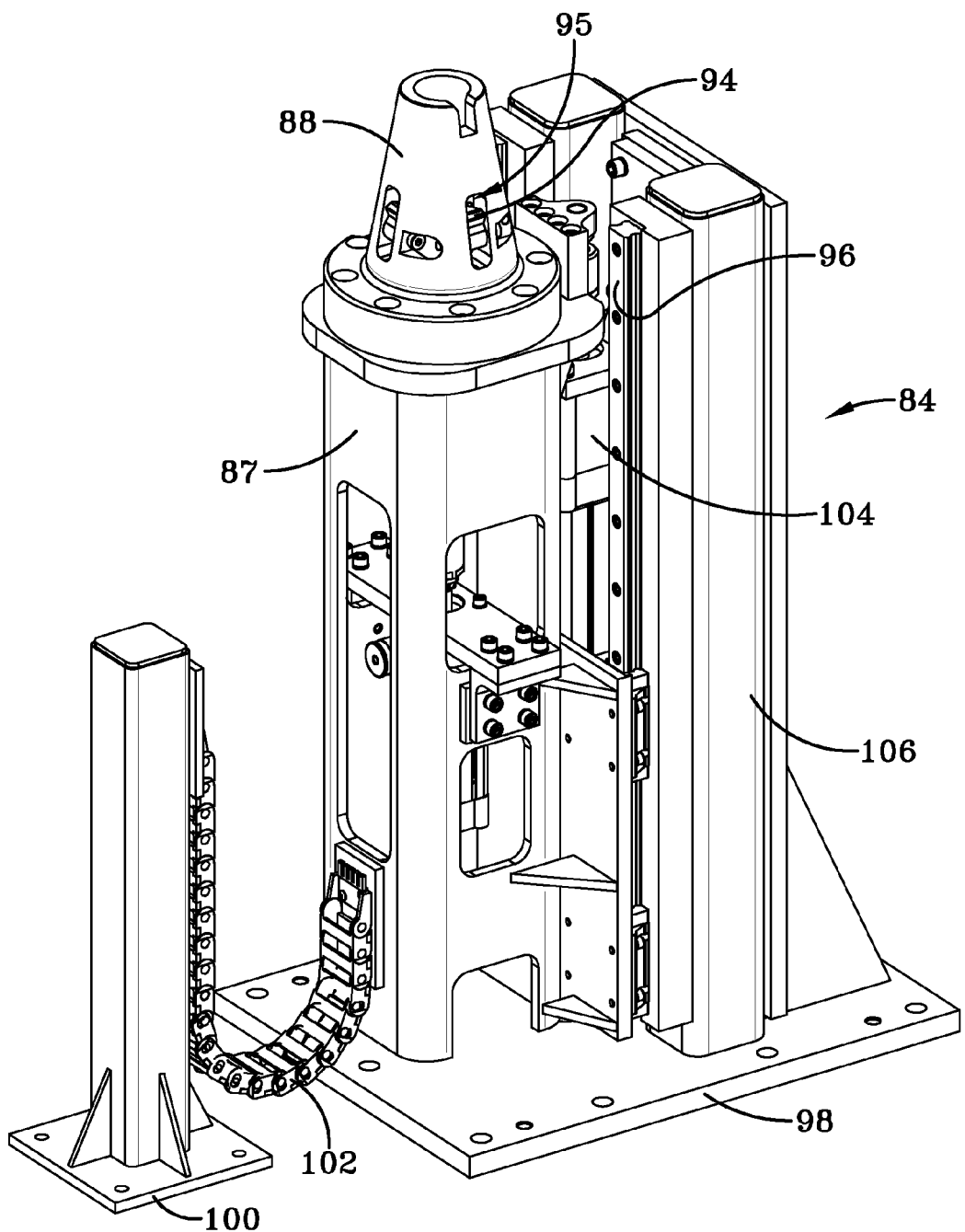
FIG. 7 is a perspective view of the bottom spindle clamp assembly.
Figure 8:
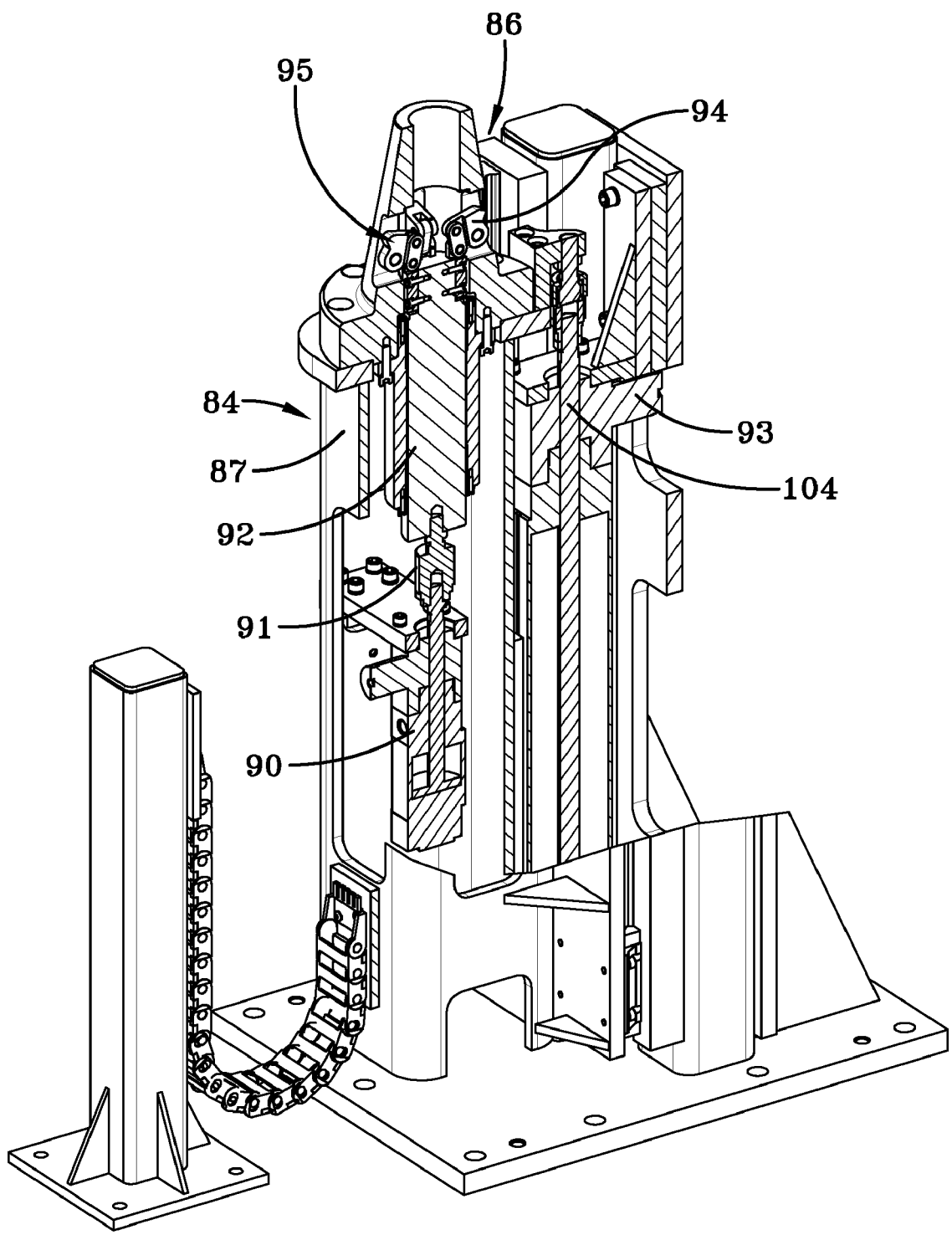
FIG. 8 is a perspective view of the bottom spindle clamp assembly with portions removed for the purpose of illustration.

The bottom spindle clamp assembly 84 is shown in FIGS. 7 and 8. Its function is to remove one half of the tire building core spindle, namely the lower core spindle assembly 240. The clamp assembly 84 is actuated by the pneumatic cylinder 104 and traverses vertically on the set of linear guide rails 96. The tip or nose 88 of the clamp assembly 84 is tapered into a frustro-conical shape to mate with the tapered socket 242 on the tire building lower core spindle assembly 240. A rod clamp on the cylinder 104 is a braking mechanism used to maintain position. A second pneumatic cylinder 90 actuates a linkage at the tapered end to clamp the end of the tire building core spindle assembly 240 as described previously. The rod 92 actuates pivotal latch members 94 within respective openings 95 to extend the latch members 94 into and out of detent openings in the frustro-conical socket 242. This clamp linkage and tapered spindle connection are used in station 14 as well as station 16 within the curing line 10 as will be appreciated from FIGS. 1 and 2. The clamp linkage and tapered spindle connection may further be utilized at a tire building station (not shown) to provide means for mechanically connecting to the core assembly 15.

The core segment support assembly 82 is shown in FIG. 9. Its function is to support the tire building core segments 244, 246 in eight places below the tire bead area so that the lower core spindle assembly 240 can be removed or inserted. The support moves vertically on linear guide rails 120 and is actuated by two pneumatic cylinders 118. Rod clamps on the cylinders are used to maintain the desired vertical position of the support 82.

The lower core segment handling assembly 80 is shown in FIGS. 10, 11, 11A and 11B, and described in detail previously. Eight pins 136, one for each of the eight core segments 244, 246, are used to support the tire building core 234 after the lower and upper spindle assemblies 236, 240 have been removed. Each pin 136 is moved radially on linear rails 134 using a ball screw 130 driven by a servo-motor 126. See FIGS. 11, 11A, and 11B. This radial movement is used to pull the respective core segment inward to allow the upper core segment handling assembly 150 to remove it upward from the cured tire.

Figure 12:
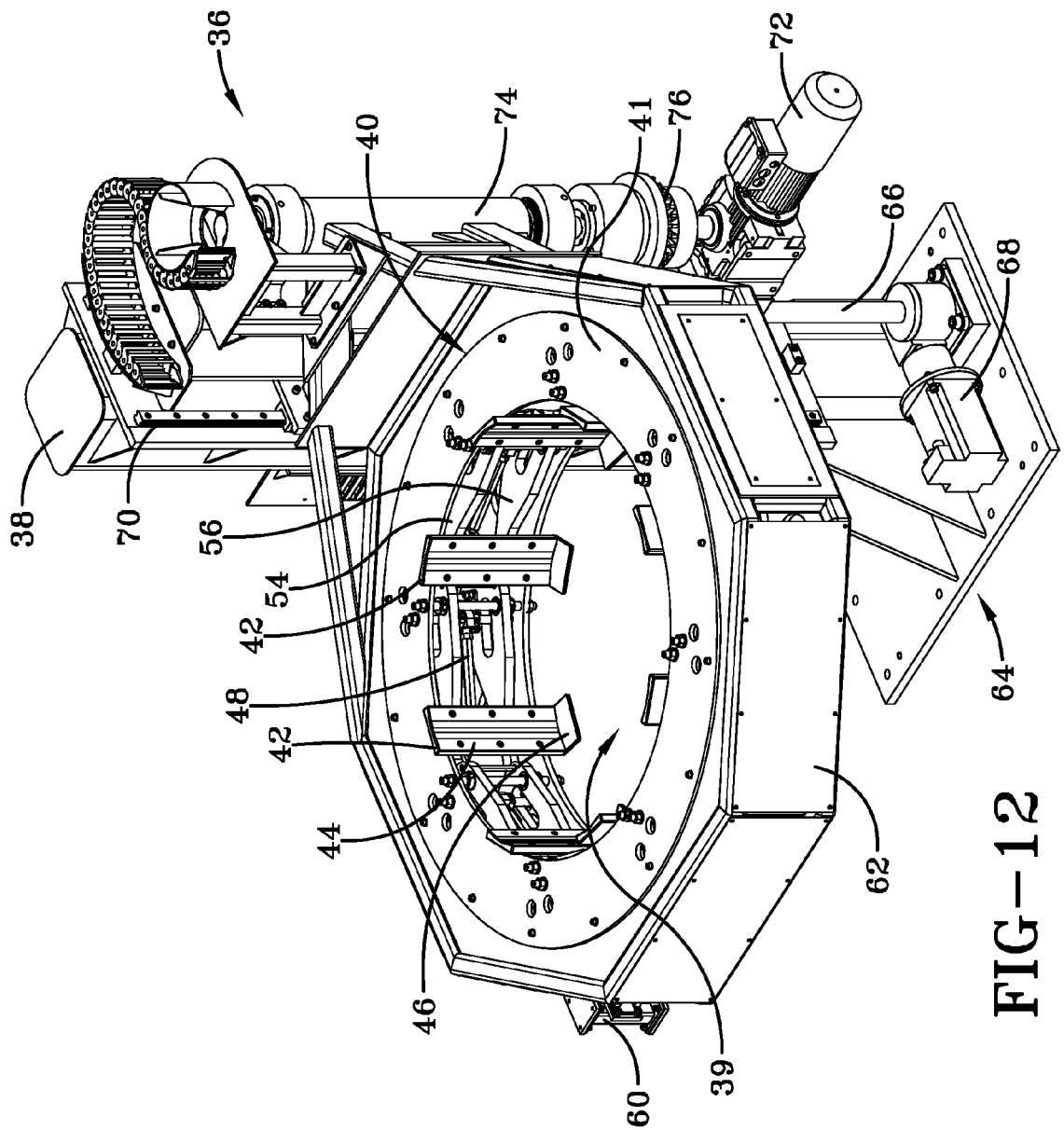
FIG. 12 is a perspective view of the tire unloader apparatus shown with the tire gripping assembly 40 in the tire pickup position.
Figure 13:
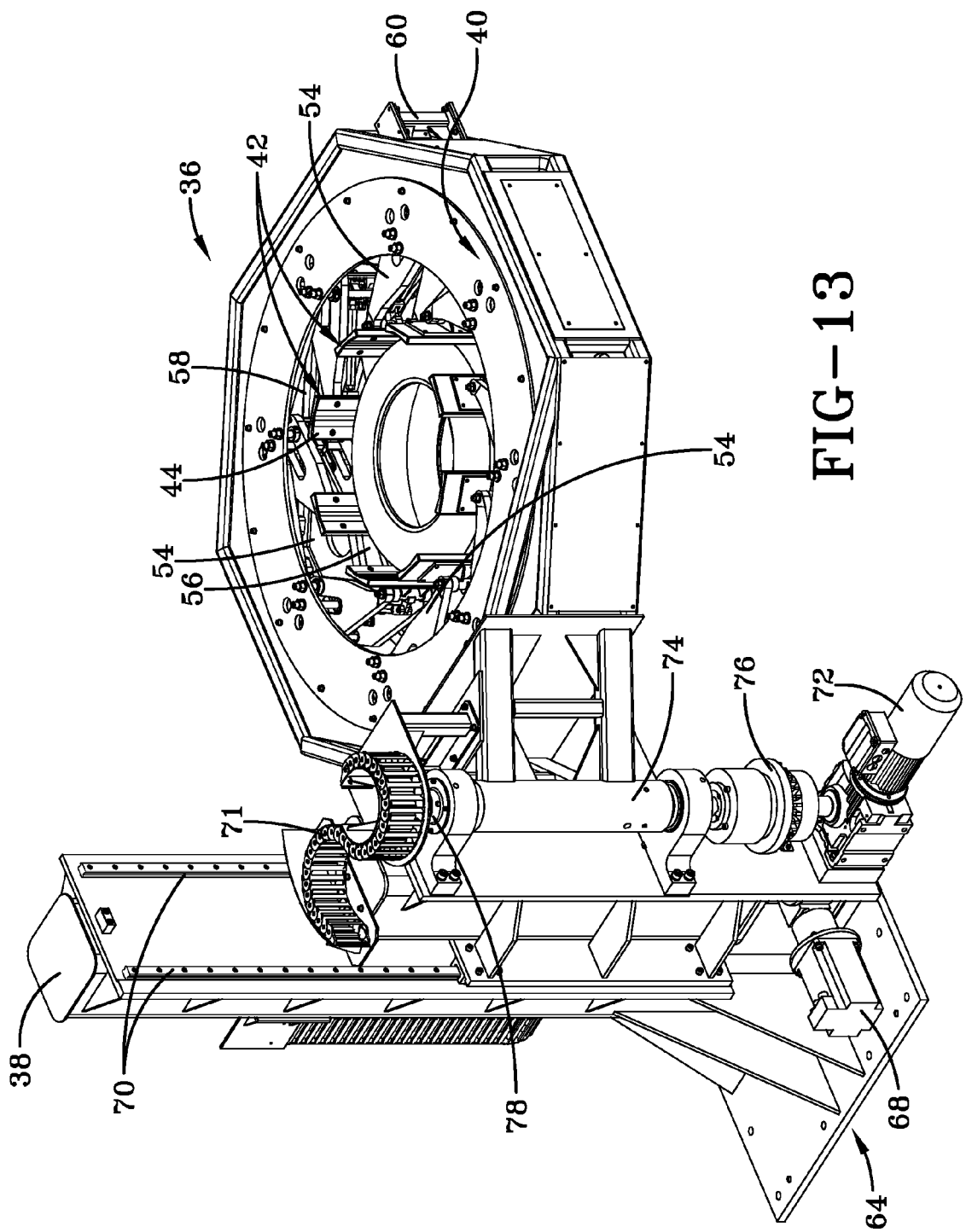
FIG. 13 is a perspective view of the tire unloader apparatus from a side opposite that shown in FIG. 12 shown with the tire gripping assembly rotated 180 degrees from the position in FIG. 12 to the unload position.
Figure 39:
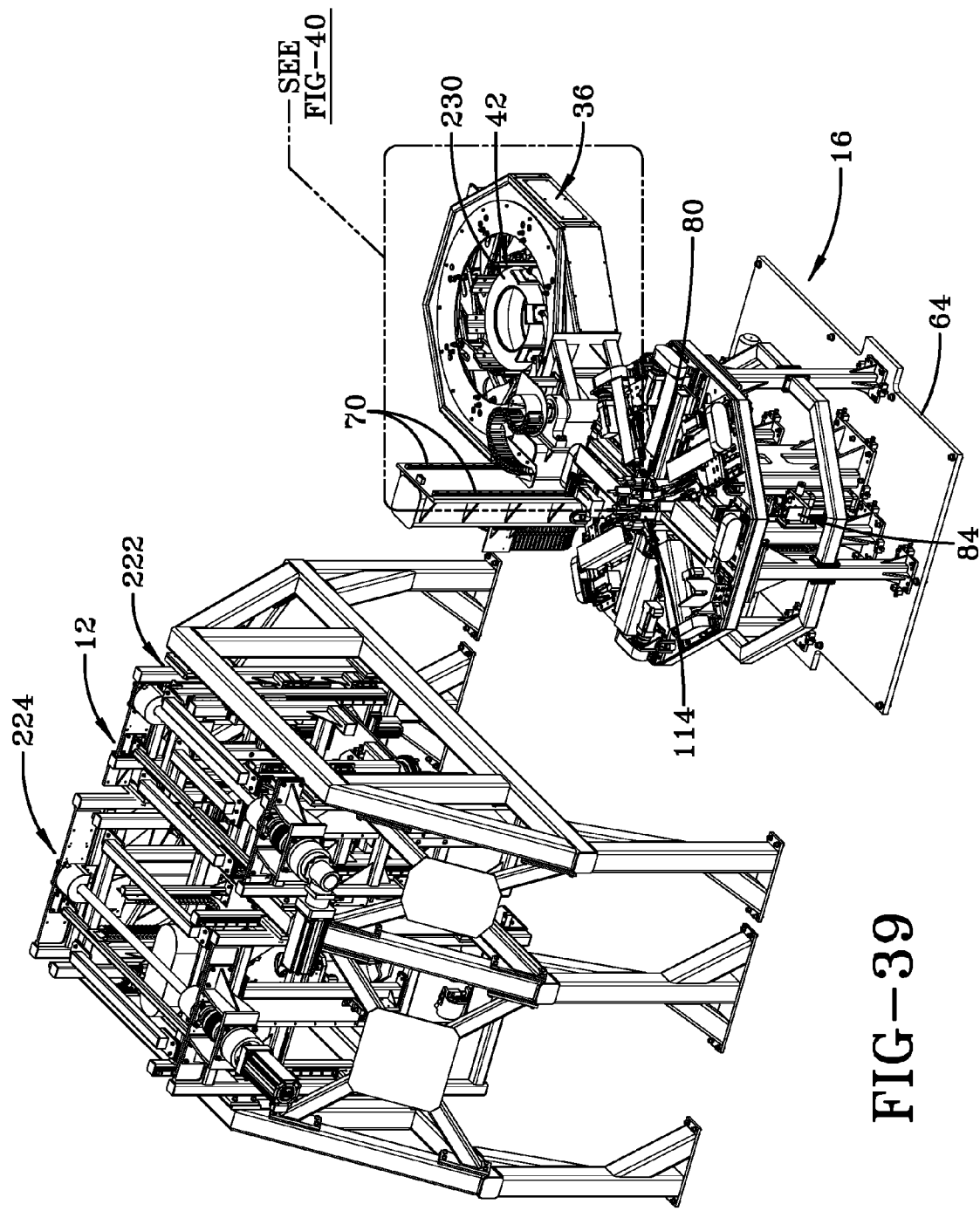
FIG. 39 is a perspective view of the tire being lifted and rotated into the unload position.
Figure 40:
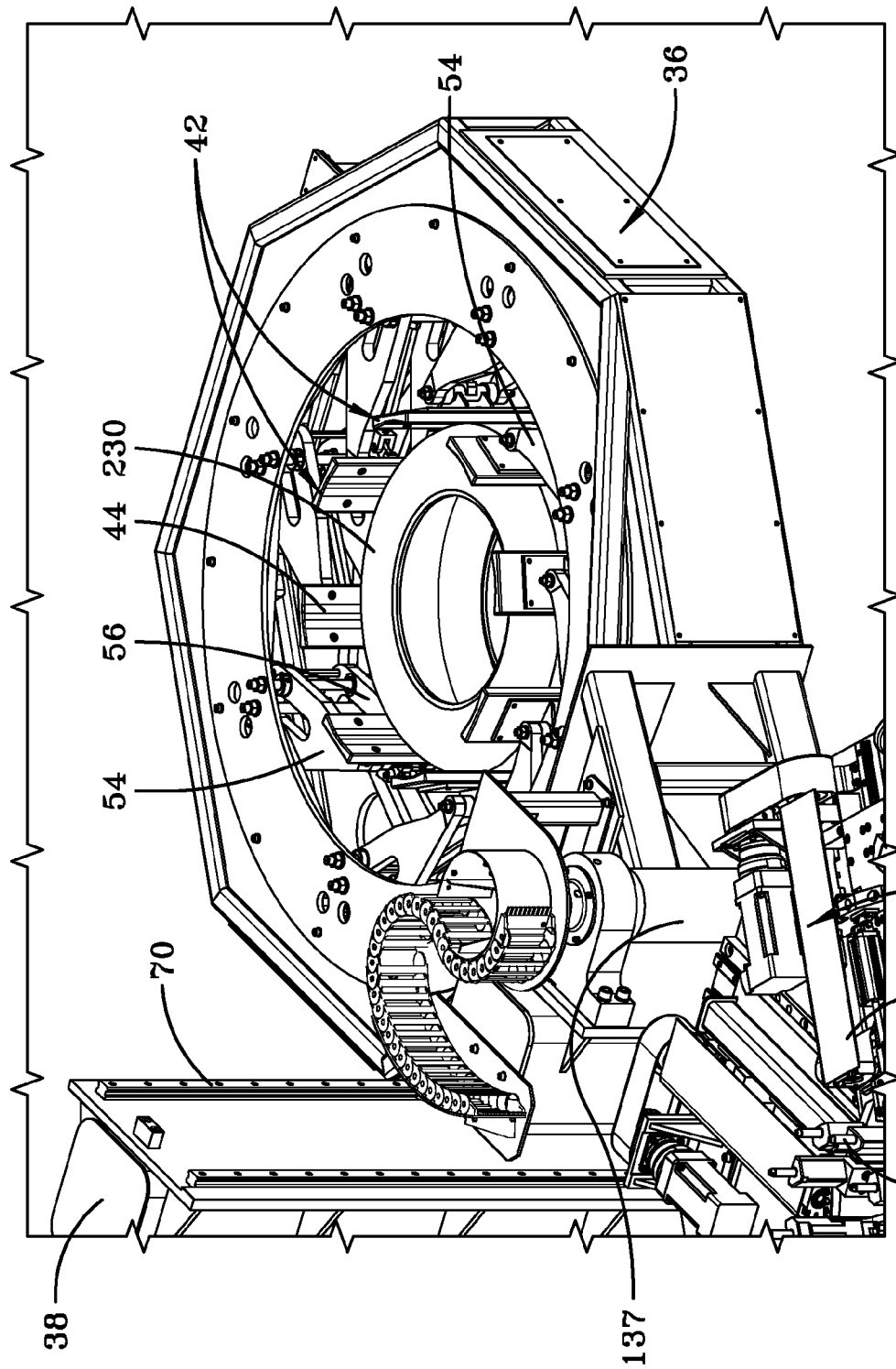
FIG. 40 is an enlarged perspective view of a portion of FIG. 39 showing the tire in the unload position prior to being dropped.
Figure 41:
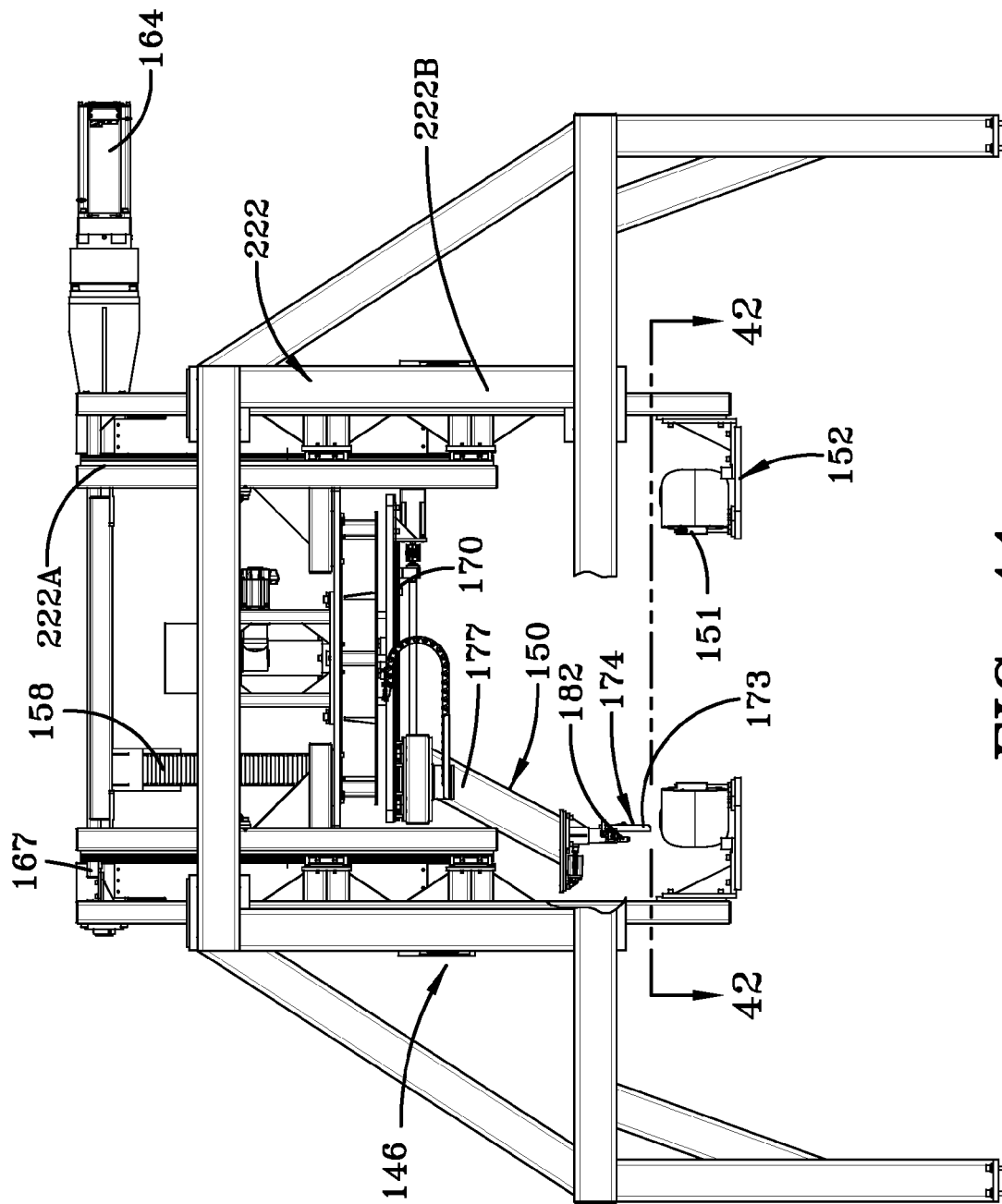
FIG. 41 is a front plan view of the upper segment manipulator showing core segments positioned in the segment storage station.
Figure 42:
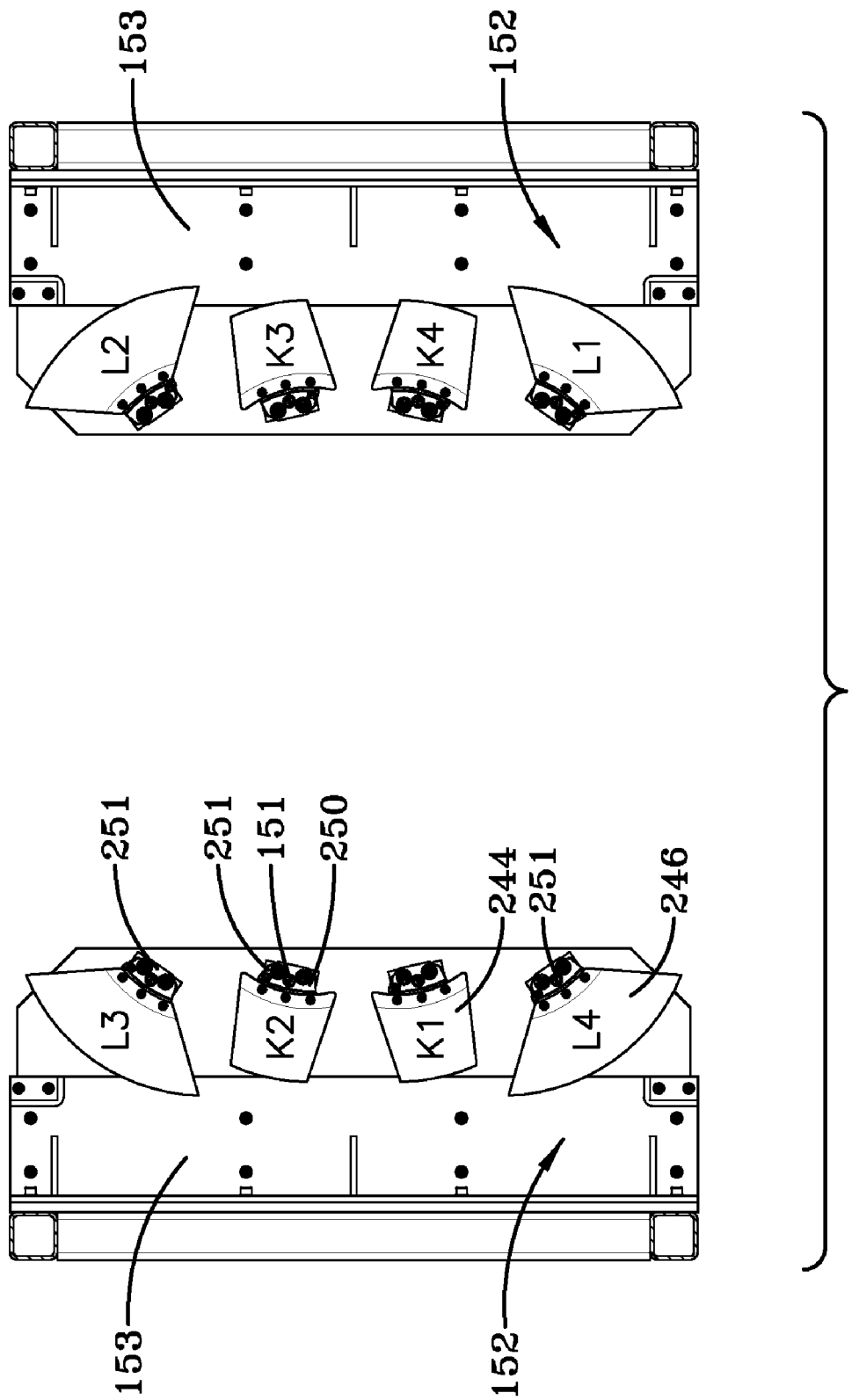
FIG. 42 is a schematic top plan view of the positioning of core segments in the segment storage station taken along the line 42-42 of FIG. 41.

The tire unloader assembly 36 is shown in FIGS. 12 and 13 and described in detail previously. The tire unloader assembly 36 grips the outside diameter of a cured tire by means of the tire gripping paddles 42 driven by pneumatic cylinder 60 through arms 54, 56 as the tire building core segments 244, 246 are being removed, one by one. Thereafter, the unloader lifts the tire over the lower segment handling assembly 80, rotates 180 degrees about shaft 74 to the tire drop zone (rotated from the FIG. 12 position to the FIG. 13 unload position), and lowers the assembly 36 by means of ball screw 66 along rails 70 to the drop-off height. The tire is released by the paddles 42 at the drop-off height. The tire is thus held by the eight paddles 42 which are actuated in unison from the single pneumatic cylinder 60 acting on the drive linkage 54, 56. A rod clamp of a type common within the industry operates on the rod of the cylinder 60 to maintain the desired linkage position during the unloading operation. The unloader is lifted using the servo-motor 68 driven ball-screw jack 66. The servo-system allows precise vertical positioning. The unloader rotation is achieved using the gear motor 72 with a variable frequency drive and encoder feedback. A clutch is used to prevent damage to the assembly should the path of rotation become unexpectedly restricted. FIGS. 38, 39, and 40 illustrate sequentially the operation of assembly 36. FIG. 38 is a sectional view showing clamping engagement of the paddles 42 against a tire carcass 230; and FIGS. 39 and 40 the tire carcass 230 being lifted and rotated for placement at a tire unload position and height represented by FIG. 40.

The upper core assembly station 12 is shown in FIGS. 14 and 15. The station 12 is comprised of two mechanisms 150, 198 supported by sub-frames 222A, B, and 224A, B, respectively, within a common outside frame 148, which is mounted to the rail transport assembly 30 below. The first mechanism, the upper core segment handling assembly 150 has three primary axes of motion and is used to transport the individual core segments 244, 246 between positions on the pins 258 on the lower core segment handling assembly and the pins 151 in the segment storage station 152. The second mechanism, the upper core handling assembly 198, is used to grip and remove the upper spindle assembly 236 from the tire building core 234 to expose the individual core segments 244, 246 for removal. It is also used to transport the tire and core assembly 15, both with and without a tire on it, between stations on the cure line assembly 10. The upper core handling assembly 198 can position the complete core assembly at these stations: tire upender 14; core assembly and disassembly 34; and mold assembly and disassembly 18.

The upper core segment handling assembly 150 is mounted to a sub-frame 222A which is attached to the main frame 222B through four linear guide assemblies. Three axes of movement are possible: vertical lift, rotation about the center of the tire, and radial movement.

Figure 17:
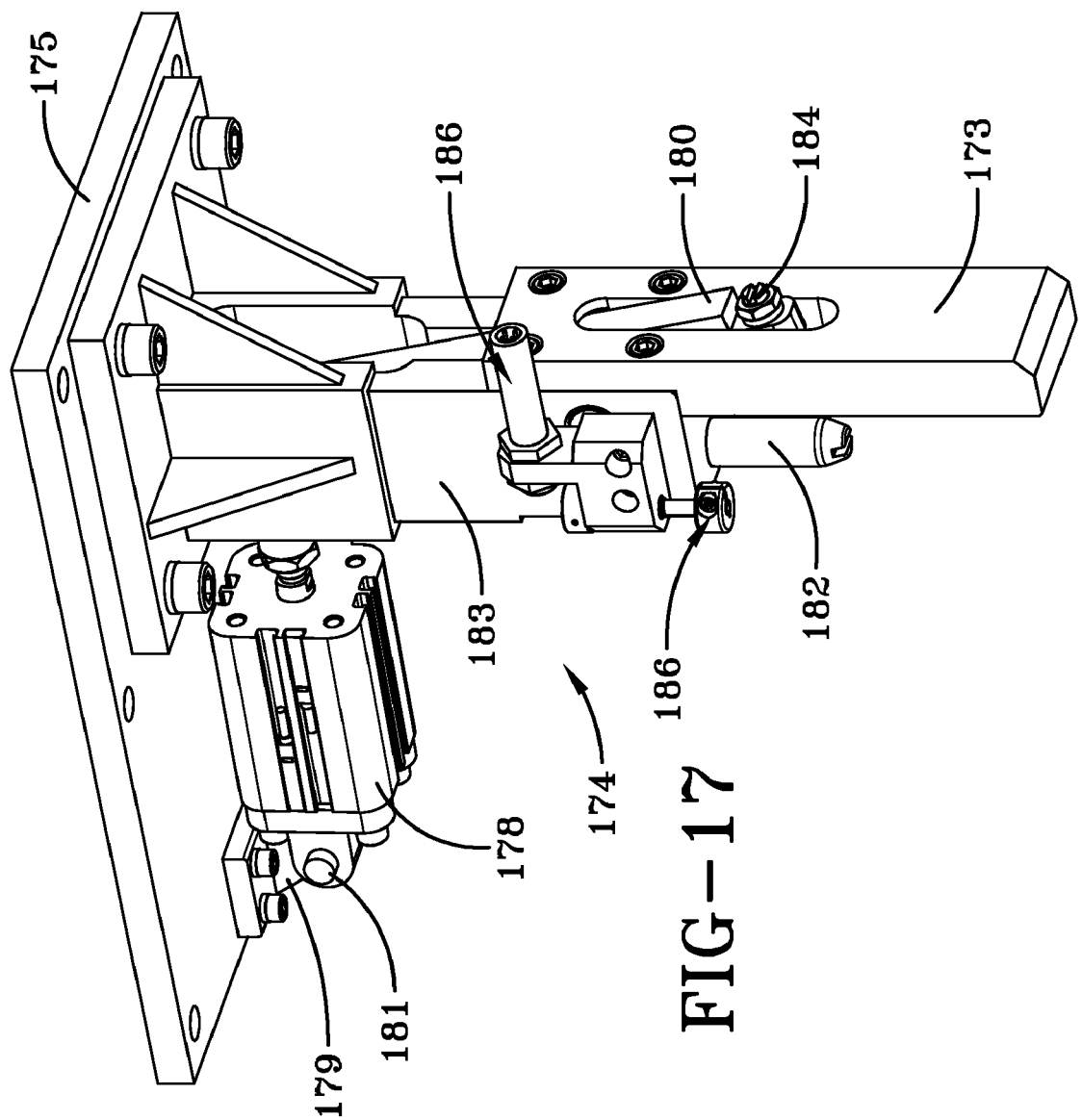
FIG. 17 is a bottom perspective view of the core segment gripping mechanism.
Figure 17A:
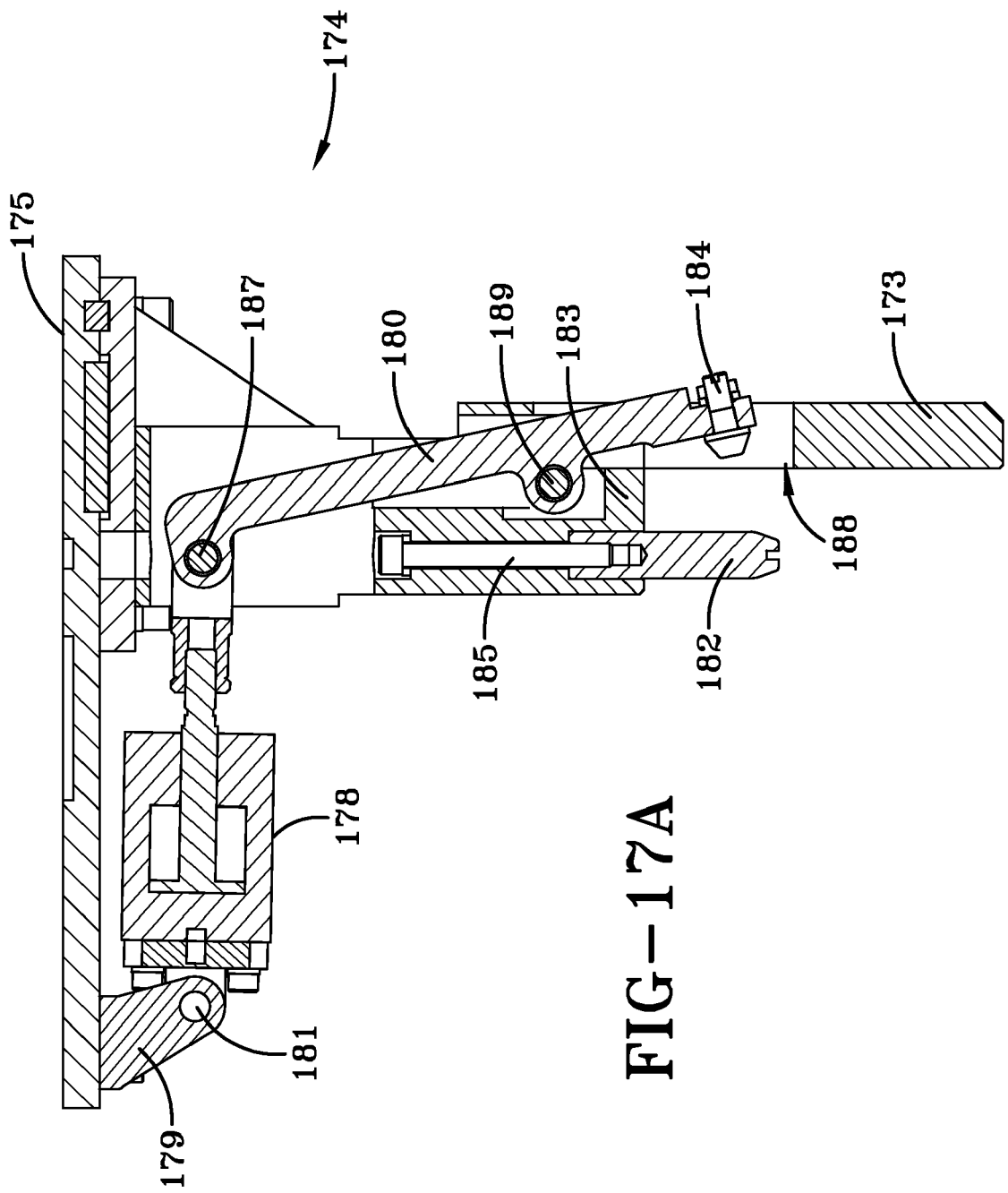
FIG. 17A is a longitudinal sectional view of the core segment gripping mechanism.
Figure 18:
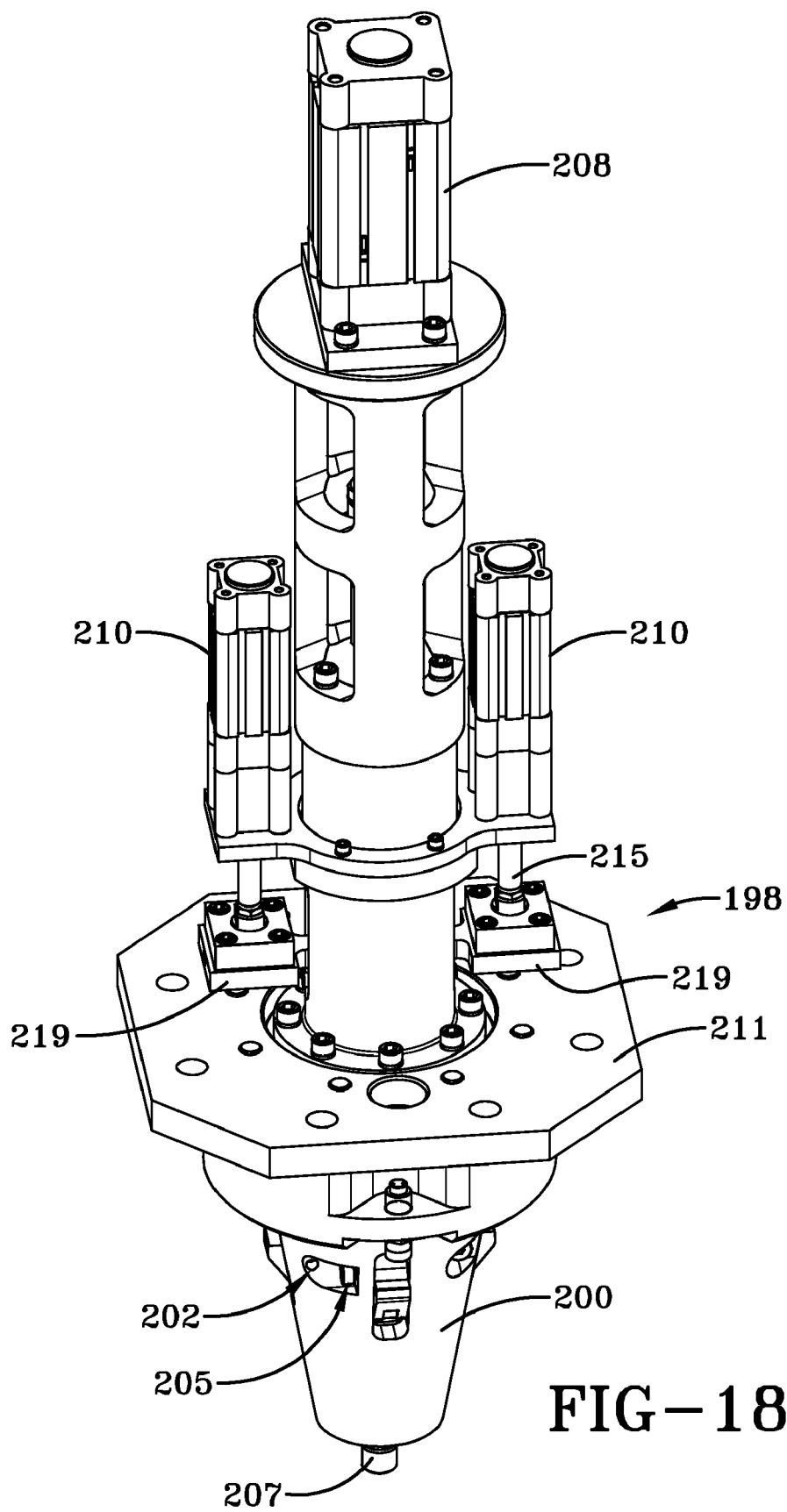
FIG. 18 is a perspective view of the upper core spindle latch mechanism.

Precision vertical movement control is achieved by lifting or lowering the sub-frame 222A using two positive-drive belts 157, driven by a common drive shaft 193 connected to the output of a gearbox and servo-motor combination 164. The sub-frame 222A also supports a second servo-motor and gearbox combination 154 which uses a positive-drive belt 156 to rotate the center shaft 158 to the desire angular position. Full rotation from zero to 360 degrees is possible. This drive shaft 158 supports the radial positioning assembly 150 shown in FIG. 16. The radial positioning assembly 150 uses another set of linear guides 170 and a ball screw 172 driven by a third servo-motor 168 to establish the desired radial position for the core segment gripper head 174 which is shown in FIGS. 17 and 17A.

The gripper head 174 inserts a guide pin 182 into the top socket 250 of the core segment, and then uses a pneumatic cylinder 178 to actuate a link arm 180 to drive a conical pin 184 into a conical hole 252 in the core segment. Proximity switches 186 mounted on the cylinder 178 detect the position of the link arm 180, and a spring-loaded foot mechanism actuates a proximity switch to assure that the core segment is present.

The core segment storage station or area 152 consists of two plates 153 with four pins 151 each mounted on either side of the upper core segment handling assembly frame 222. The pins 151 are similar to the pins 254 used on the lower core assembly station 34 to hold the core segments in place until the sequence calls for the tire building core 234 to be re-assembled. The pins 151 are placed such that they may be accessed using only the vertical, rotational, and radial axes of the upper core handling assembly 150 as shown at the bottom of FIG. 15 and in FIGS. 41 and 42.

Figure 19:
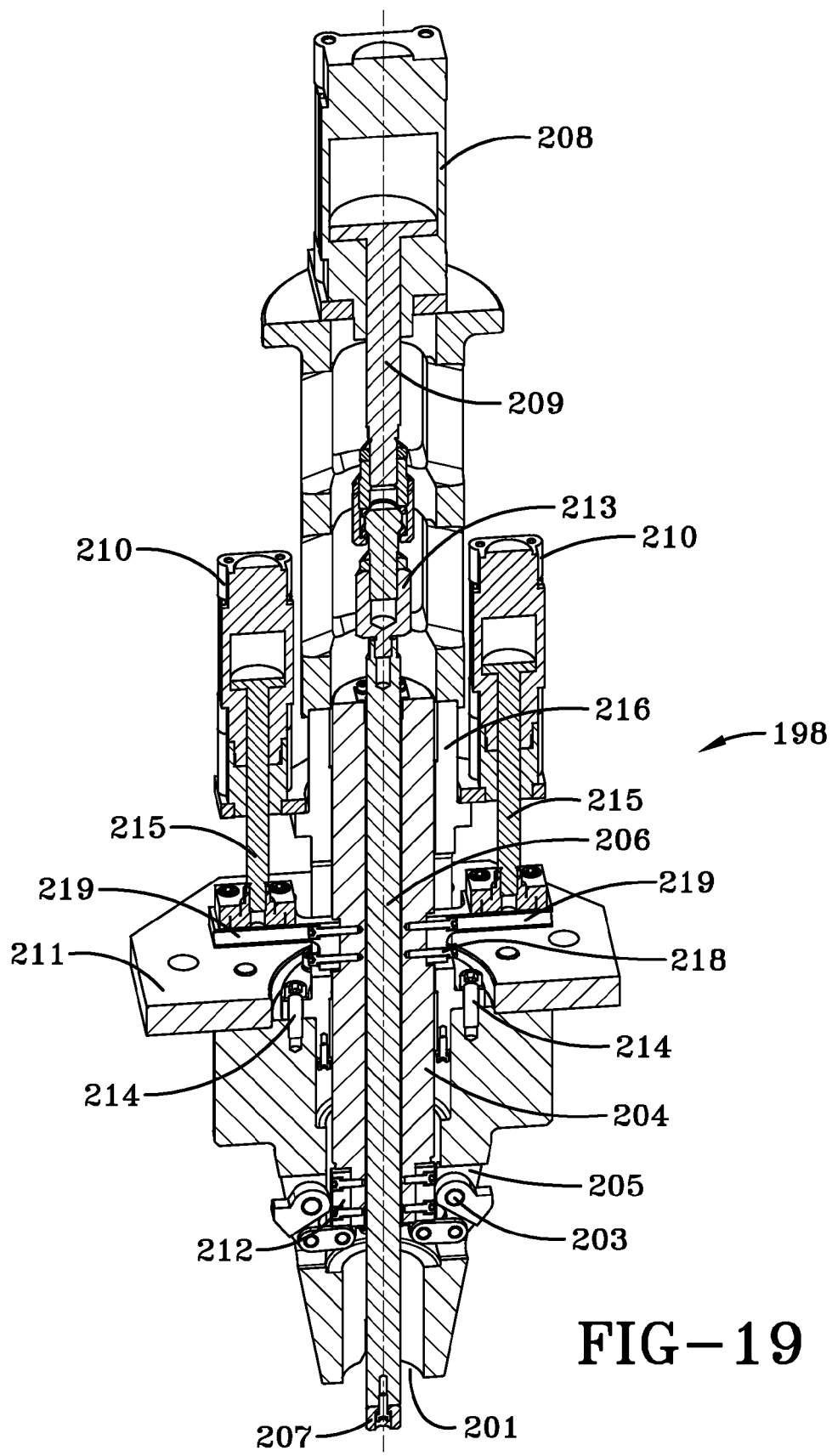
FIG. 19 is a longitudinal perspective view in partial section of the upper core spindle latch mechanism.
Figure 20:
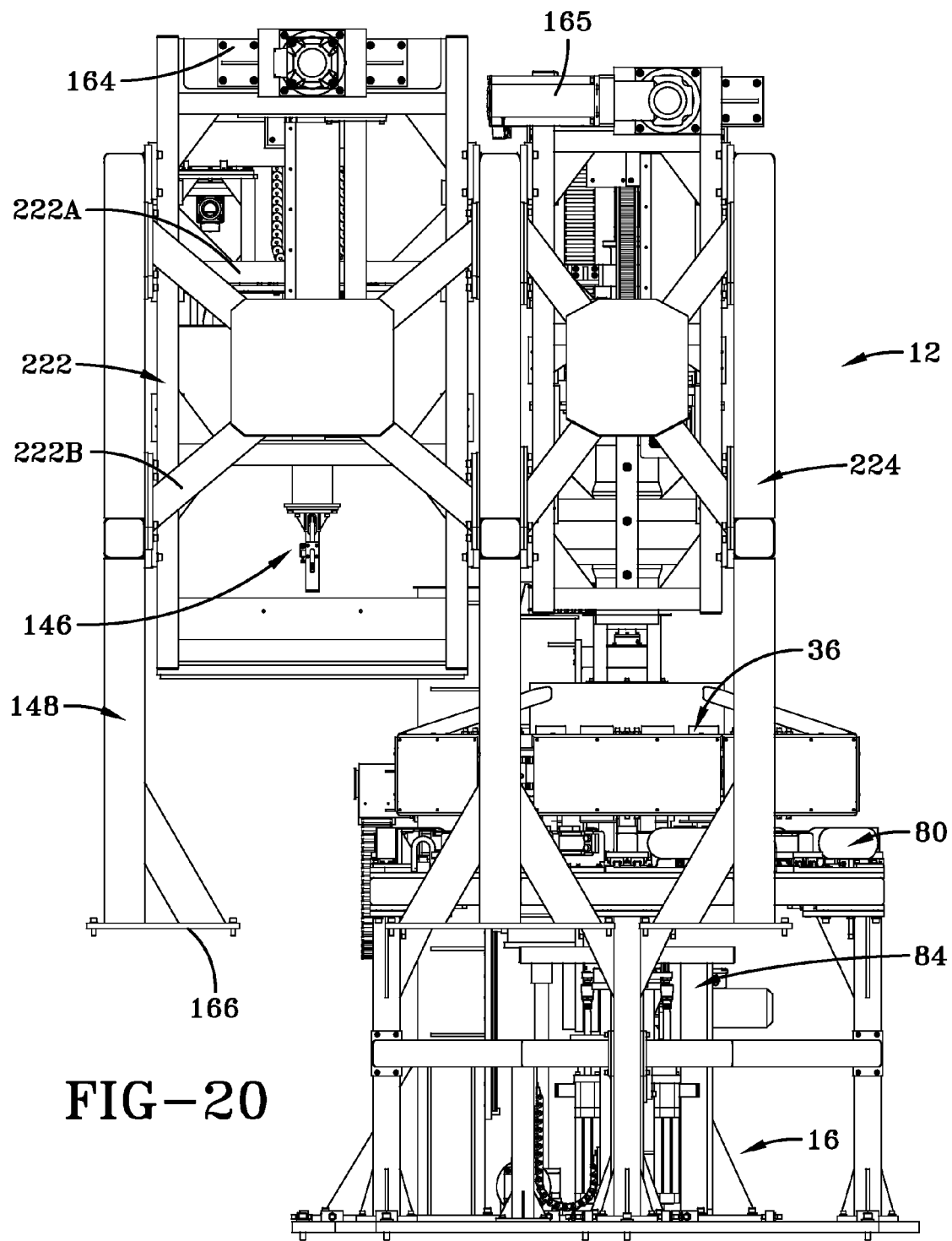
FIG. 20 is perspective view of the core assembly/disassembly station and a tire positioned therein.

The upper core handling assembly 198 also uses a sub-frame 224A moving on four linear guide assemblies 226 to control vertical movement similar to the upper core segment handling assembly 150. A telescoping mechanism is used to conserve space. Two intermediate frames 224A, one on each side, are raised and lowered by two positive-drive belts 194, 196 connected to a common drive shaft 192 which is driven from the output of a gearbox and servo-motor combination 165. A pinion gear 191A mounted on each intermediate frame 224A engages gear racks 191B mounted to both the sub-frame and main frame. This pinion gear and rack combination allows the sub-frame 224A to travel twice the vertical distance that the intermediate frame moves. The core gripper assembly 198, shown in FIG. 18 and in cross-section in FIG. 19, is mounted to the moving sub-frame 224A.

The core gripper assembly, alternatively referred to as the upper core spindle latch mechanism, 198 is designed to hold and transport the assembled tire building core comprising core 234 and spindle assemblies 236, 234, with or without a tire 230 on it, or the upper core spindle assembly 236 alone. The tip or frustro-conical nose 200 of the assembly 198 is tapered to match the tapered socket 238 in the spindle assembly 236. This frustro-conical nose and socket arrangement is the same one used on the bottom spindle clamp assembly 84 described above. Once the nose 200 is engaged in the socket, a linkage is actuated using two pneumatic cylinders 210 acting in parallel. Rod locks on the cylinders maintain the position in case air pressure is lost. A third pneumatic cylinder 208 located at the top, center of the shaft is used to drive a long rod 206 in the assembly center. This rod 206 actuates the latch at the center of the tire building core 234 that keeps the two halves of the core spindle together. Extending the cylinder 208 actuates the latch, which separates the two halves 236, 240 comprising the tire building core spindle.

Sequence of Operations

The sequence of operation will be understood from the following with reference to the drawings.

Figure 21:
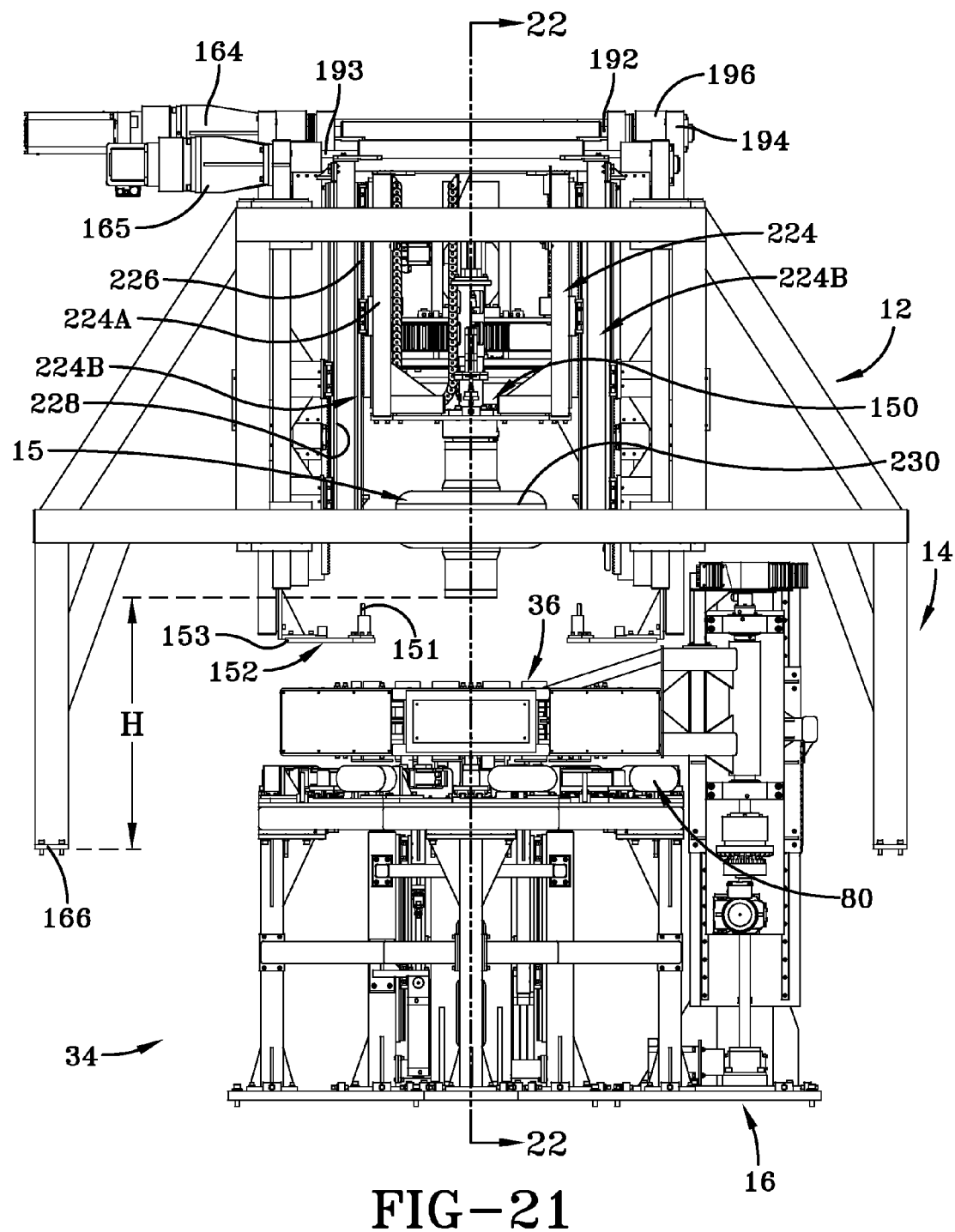
FIG. 21 is a perspective view of the cure station showing a cured tire moving from the core assembly/disassembly station.
Figure 23:
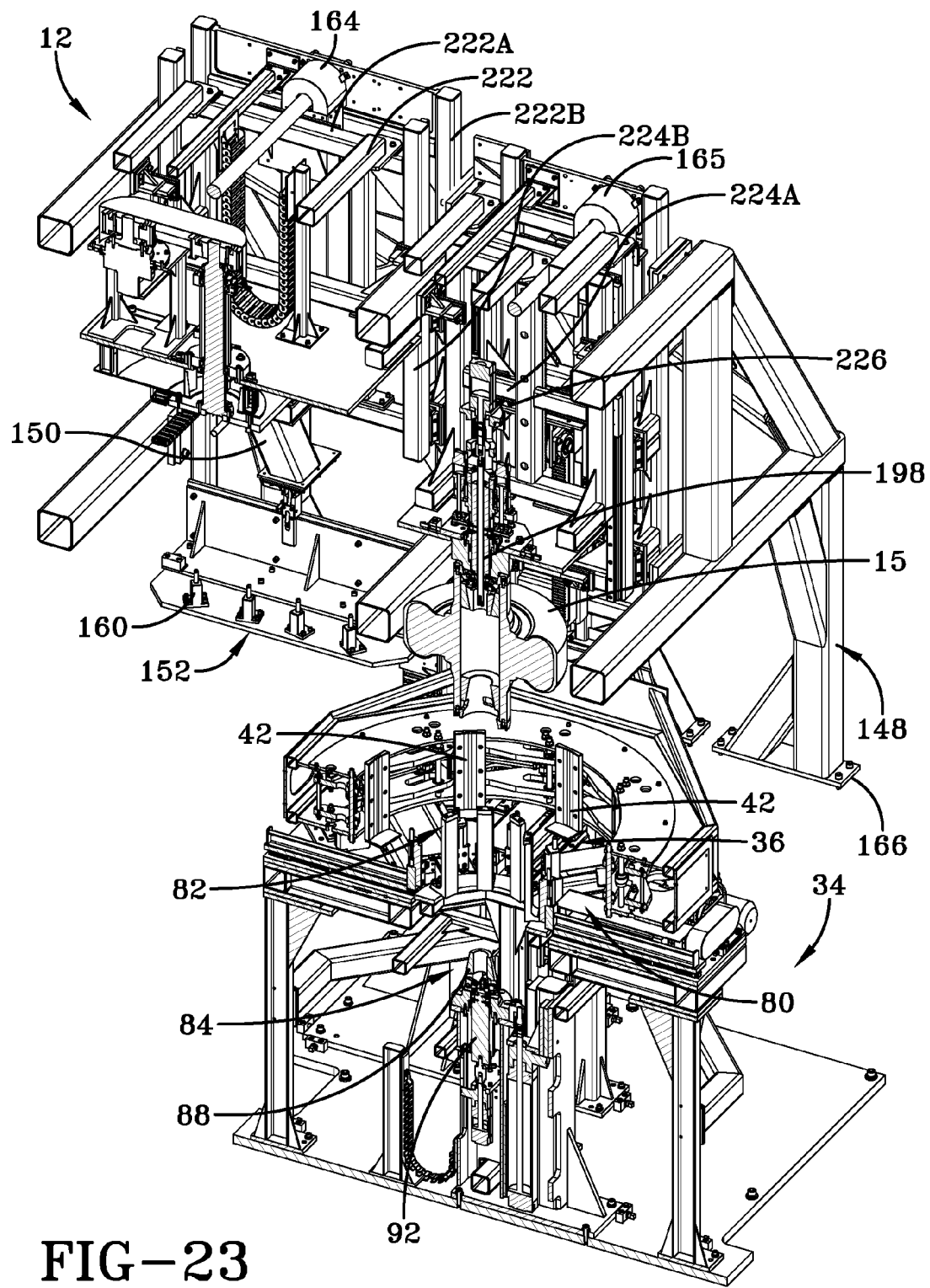
FIG. 23 is a perspective view of the upper core manipulator positioning a tire over the core assembly/disassembly station.

Disassembly—Initial Conditions:
1. Tire building core 234 with cured tire 230 attached to upper core manipulator 12 at core assembly station 34. FIGS. 21, 22, 23.
2. Core segment support 82 extended upward.
3. Bottom spindle clamp assembly 84 retracted (down).
4. Lower core handling assembly 80 with pins 136 retracted (radially outward) to wide diameter for clearance.
5. Tire unloader assembly 36 in tire pickup position over the lower core handling assembly center.

Figure 24:
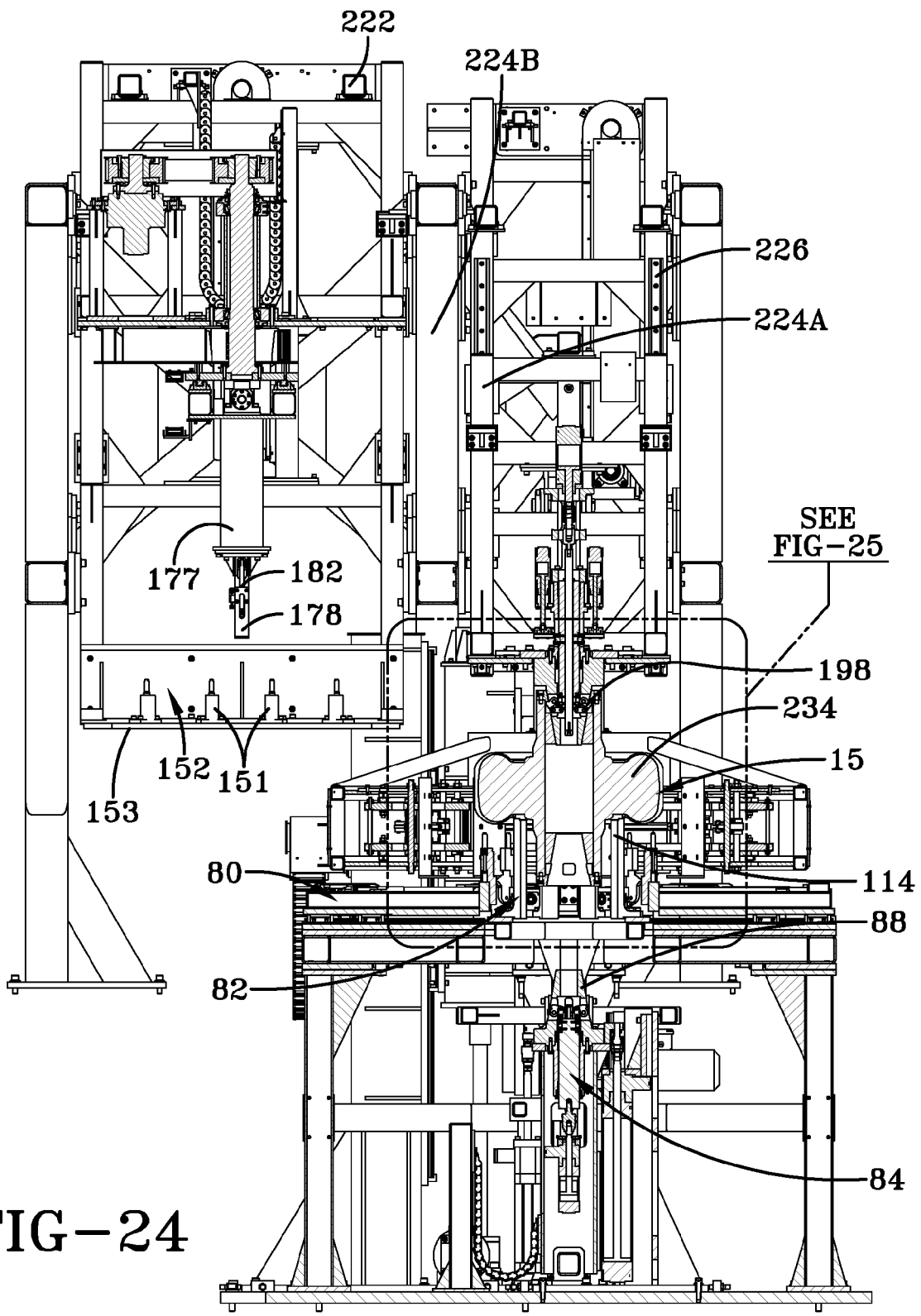
FIG. 24 is a perspective view of the upper core manipulator lowering the core onto the core assembly/disassembly station.
Figure 25:
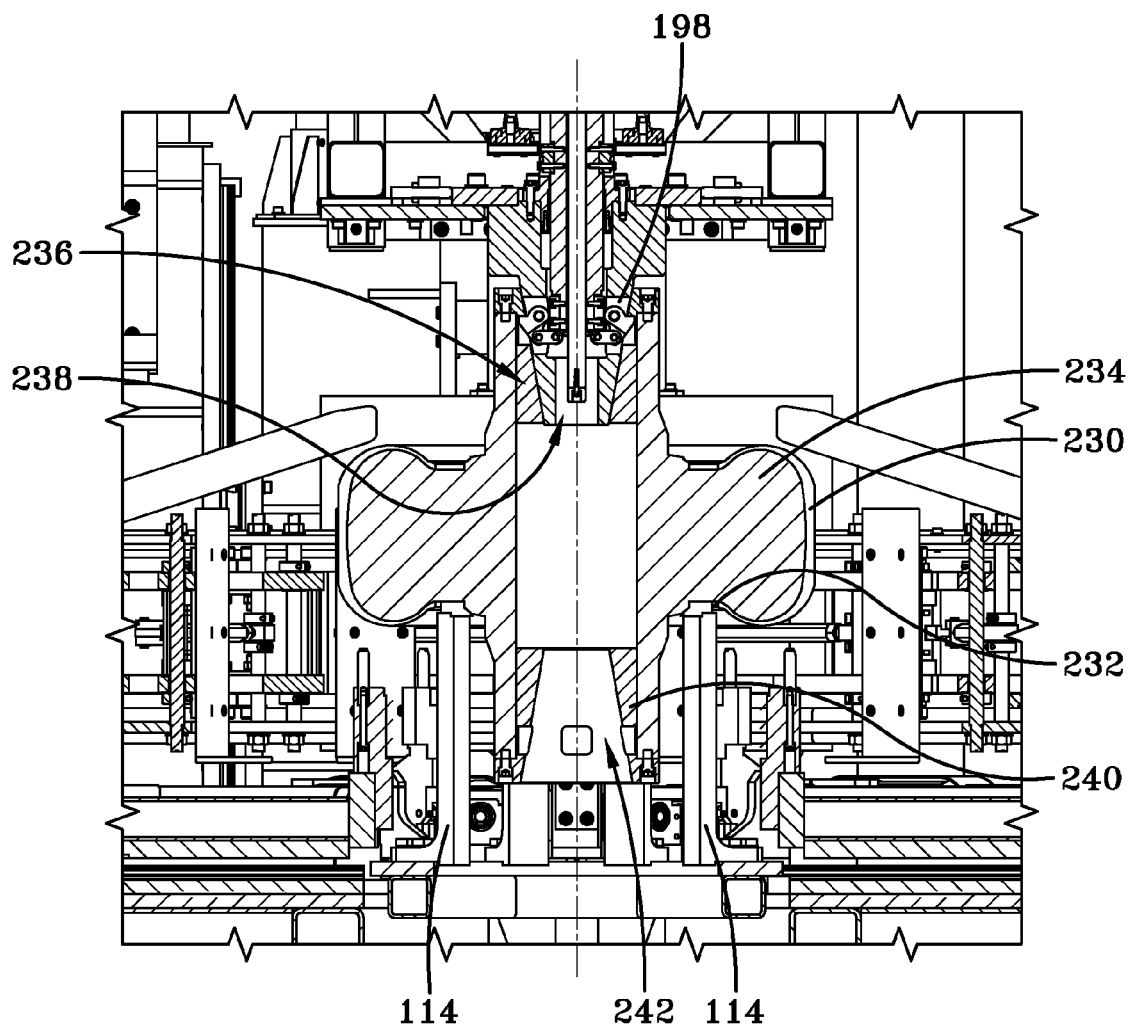
FIG. 25 is an enlarged perspective view shown partially in section of a portion of the upper core manipulator, core, and core assembly/disassembly station identified in FIG. 24.
Figure 26:
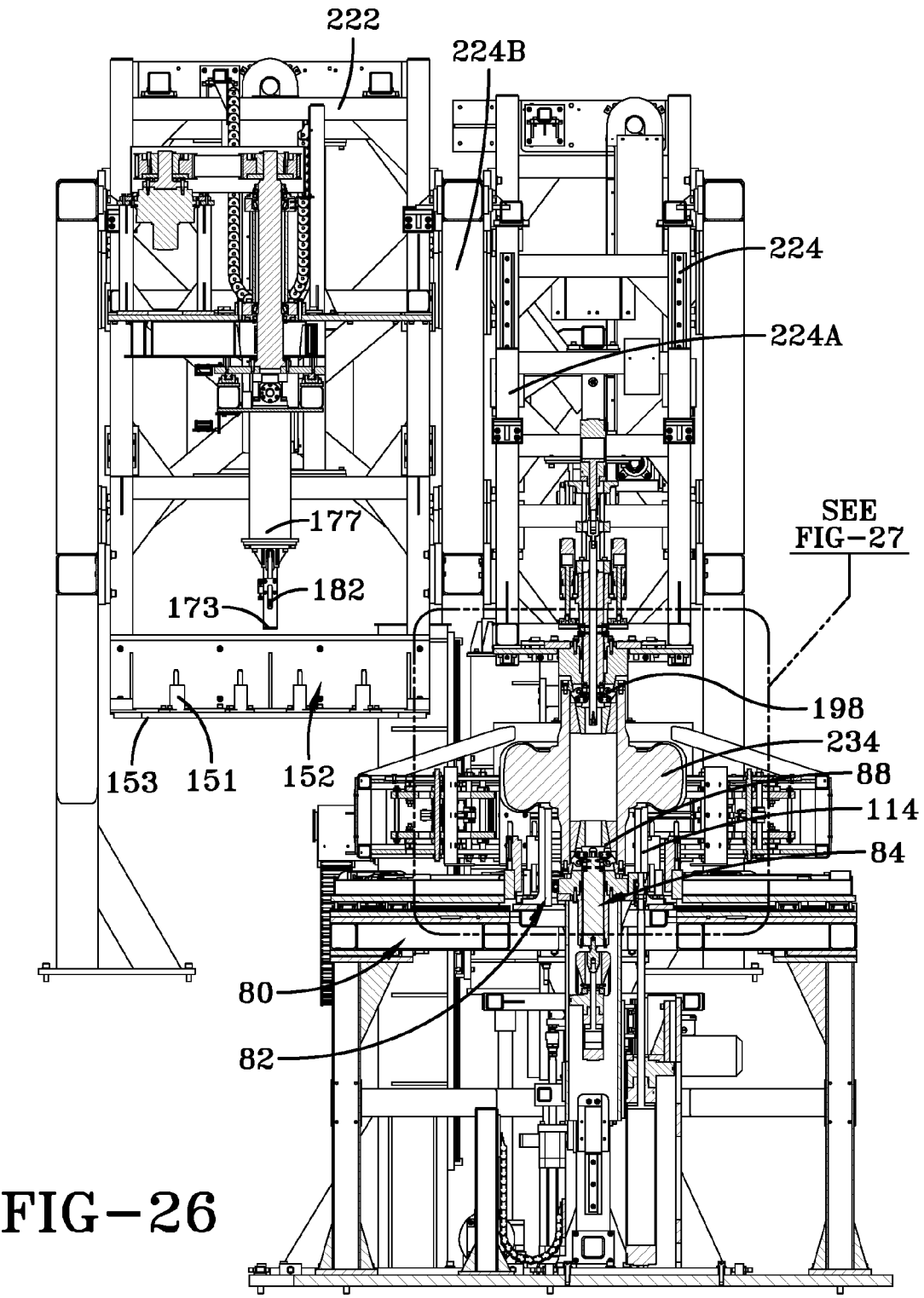
FIG. 26 is a perspective view in sequence to FIG. 24 showing the lower spindle latch assembly rising to engage the core in the core assembly/disassembly station.
Figure 27:
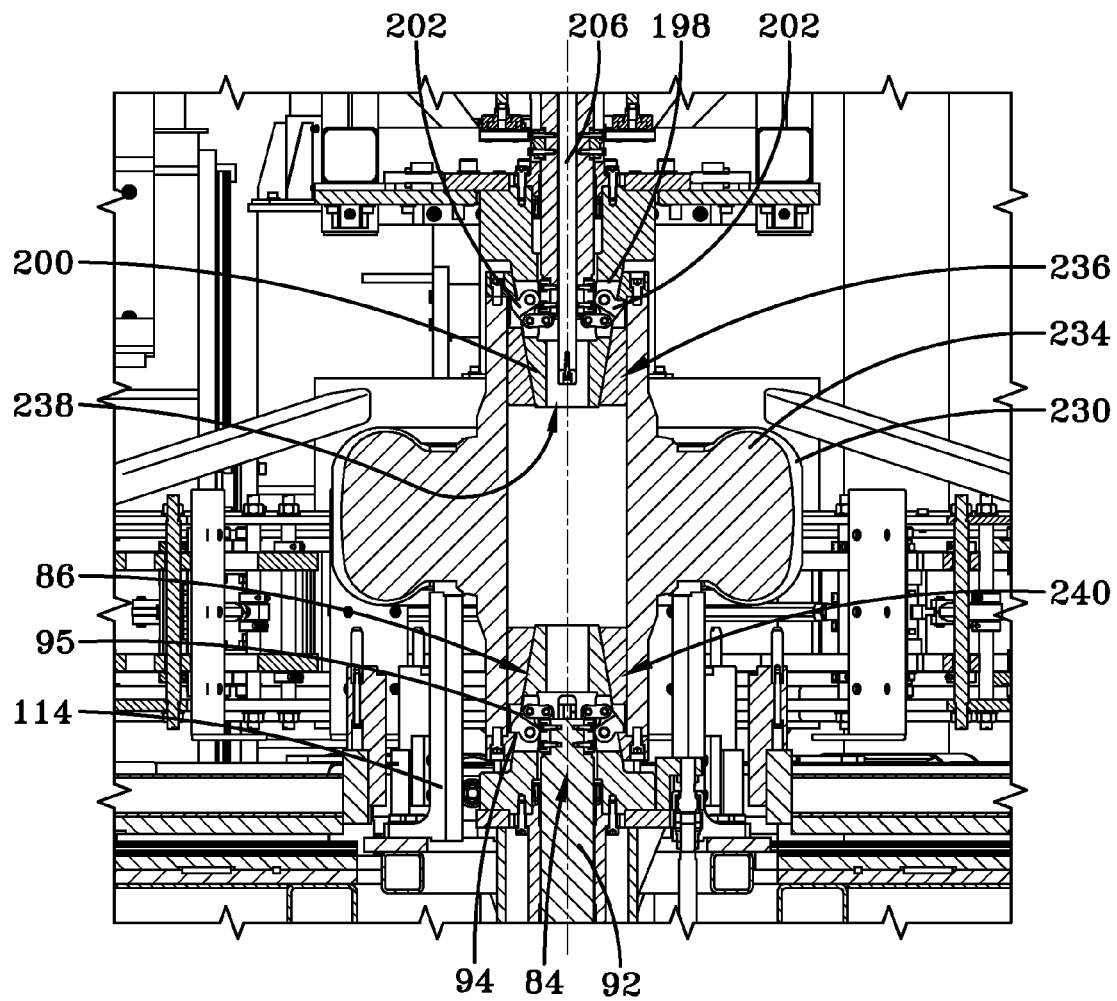
FIG. 27 is an enlarged perspective view shown partially in section of a portion of the upper core manipulator, core, and core assembly/disassembly station illustrated in FIG. 24.
Figure 28:
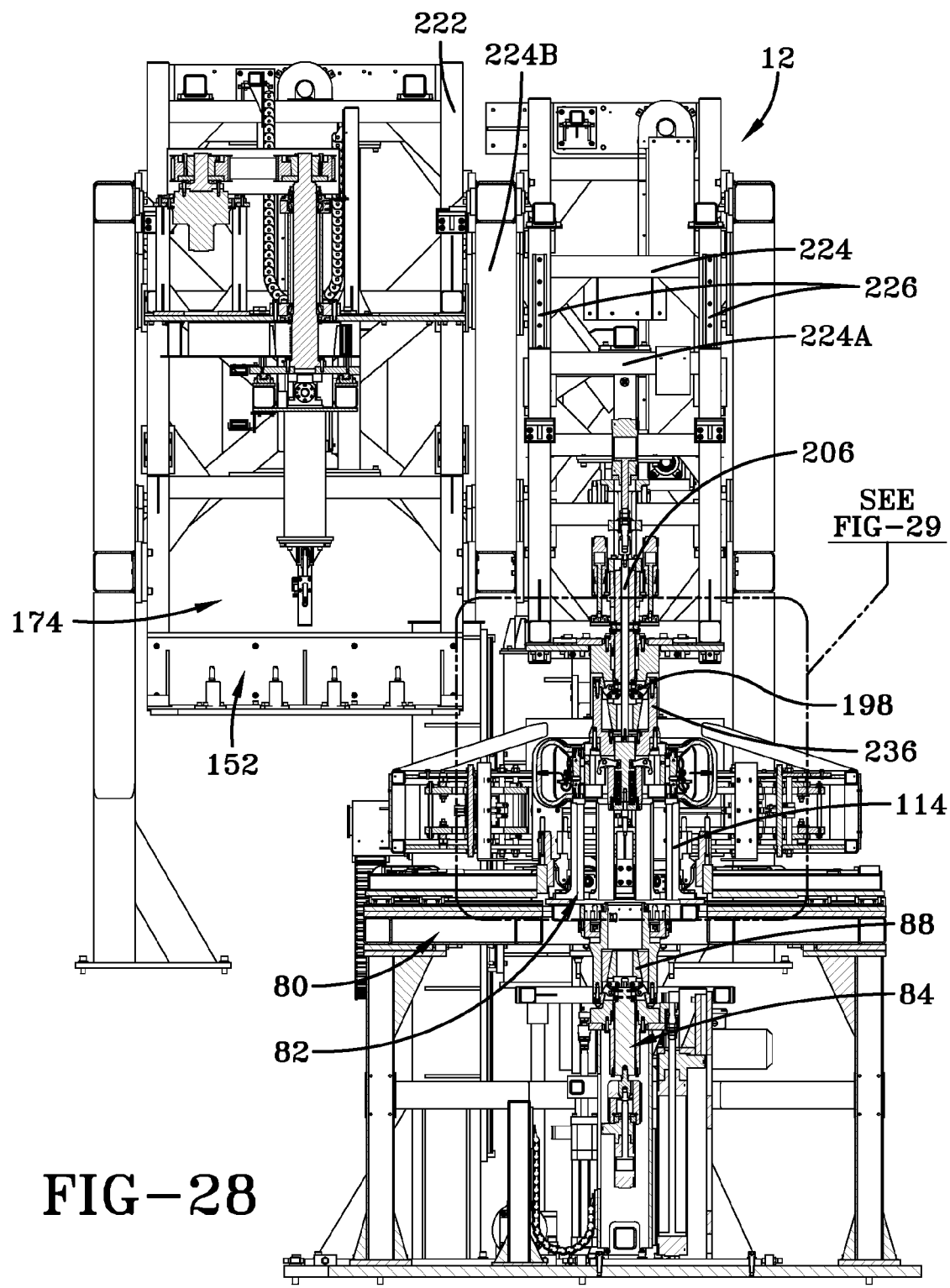
FIG. 28 is a perspective view in sequence to FIG. 26 showing actuation of the latch mechanism inside the core to release the lower core spindle, thus rendering the core in two sub-assemblies.
Figure 29:
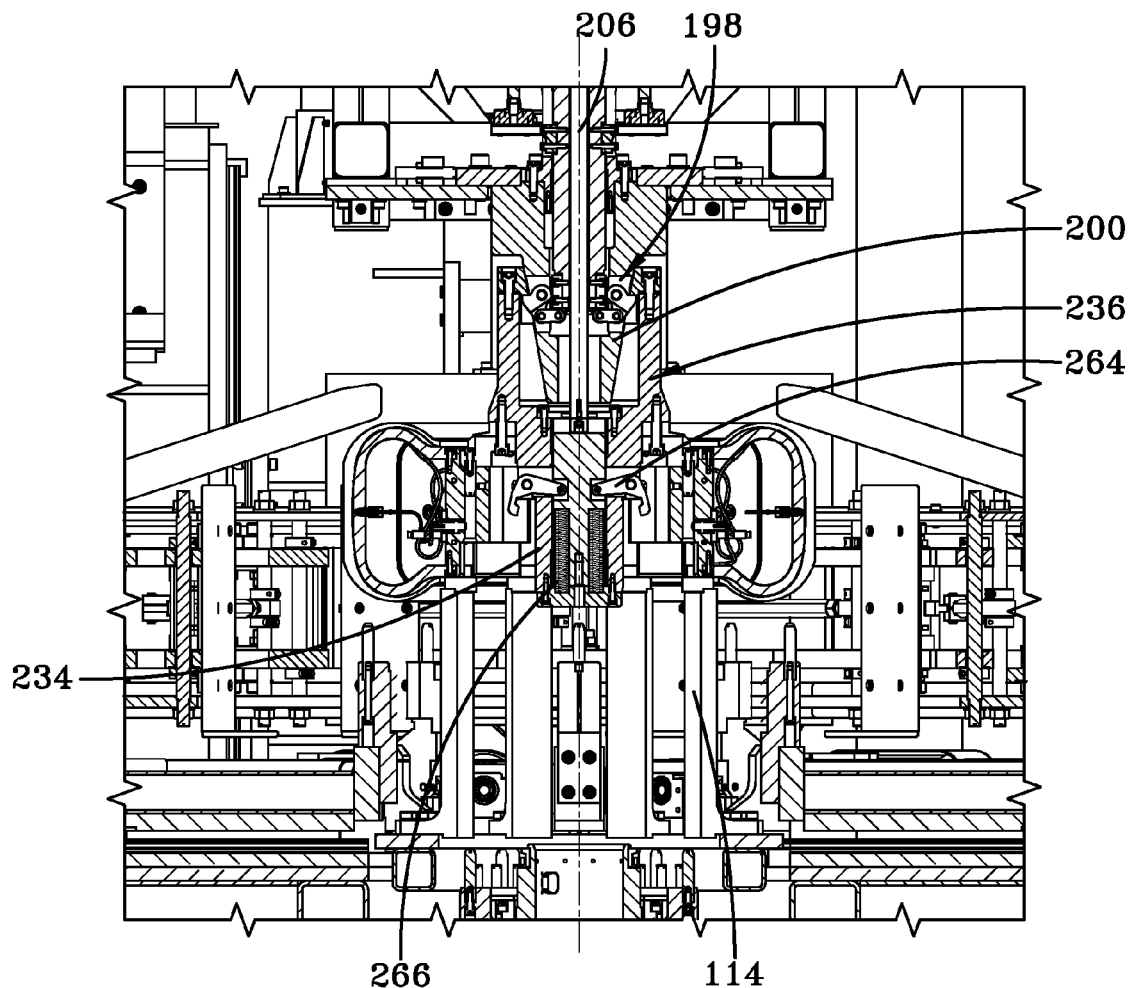
FIG. 29 is an enlarged perspective view shown partially in section of a portion of the actuation latch, core, and core assembly/disassembly station illustrated in FIG. 28.
Figure 30:
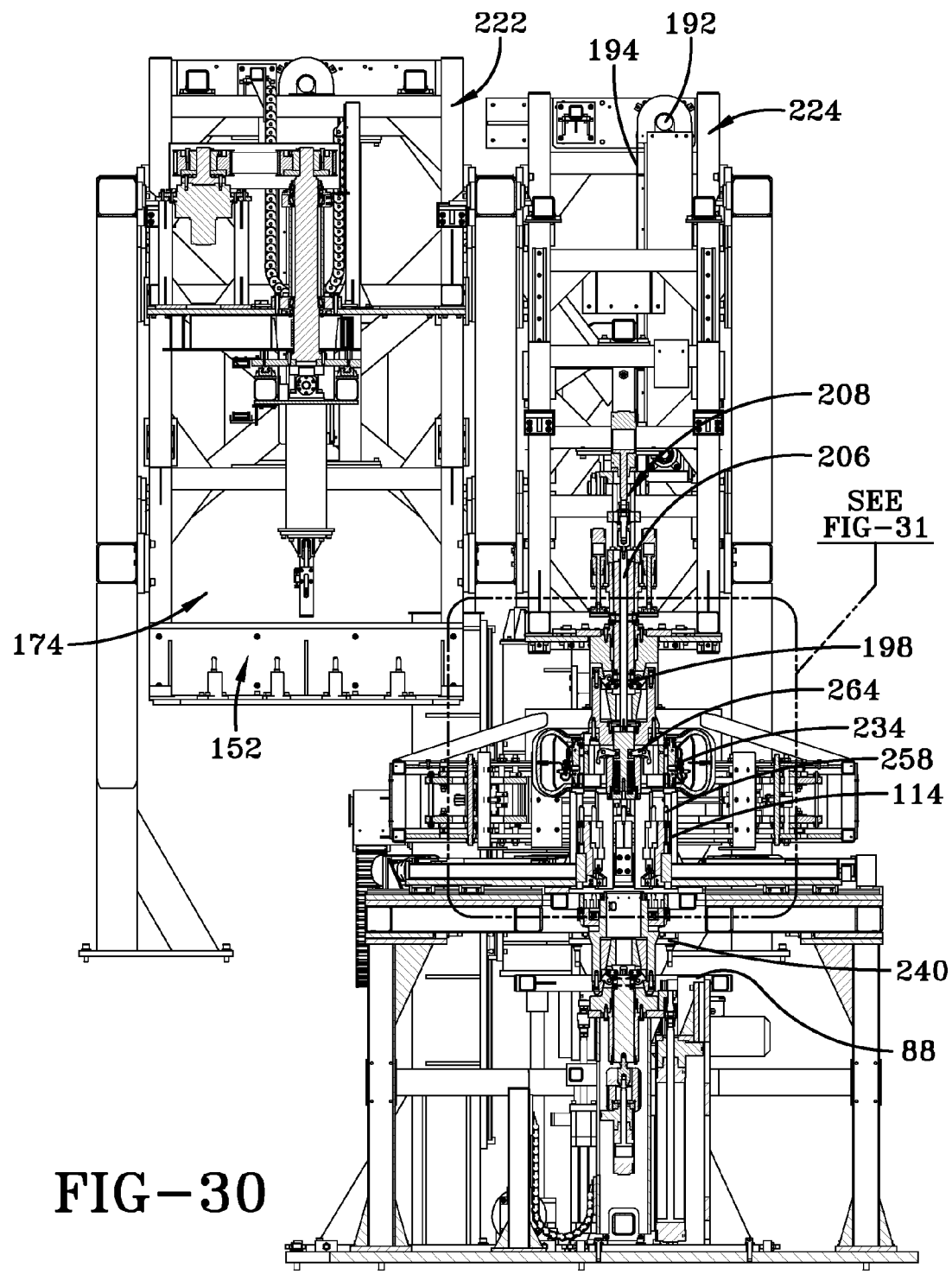
FIG. 30 is a perspective view in sequence to FIG. 28 showing segment receiving pins moved into position through windows defined between core supporting arms in the core assembly/disassembly station.
Figure 31:
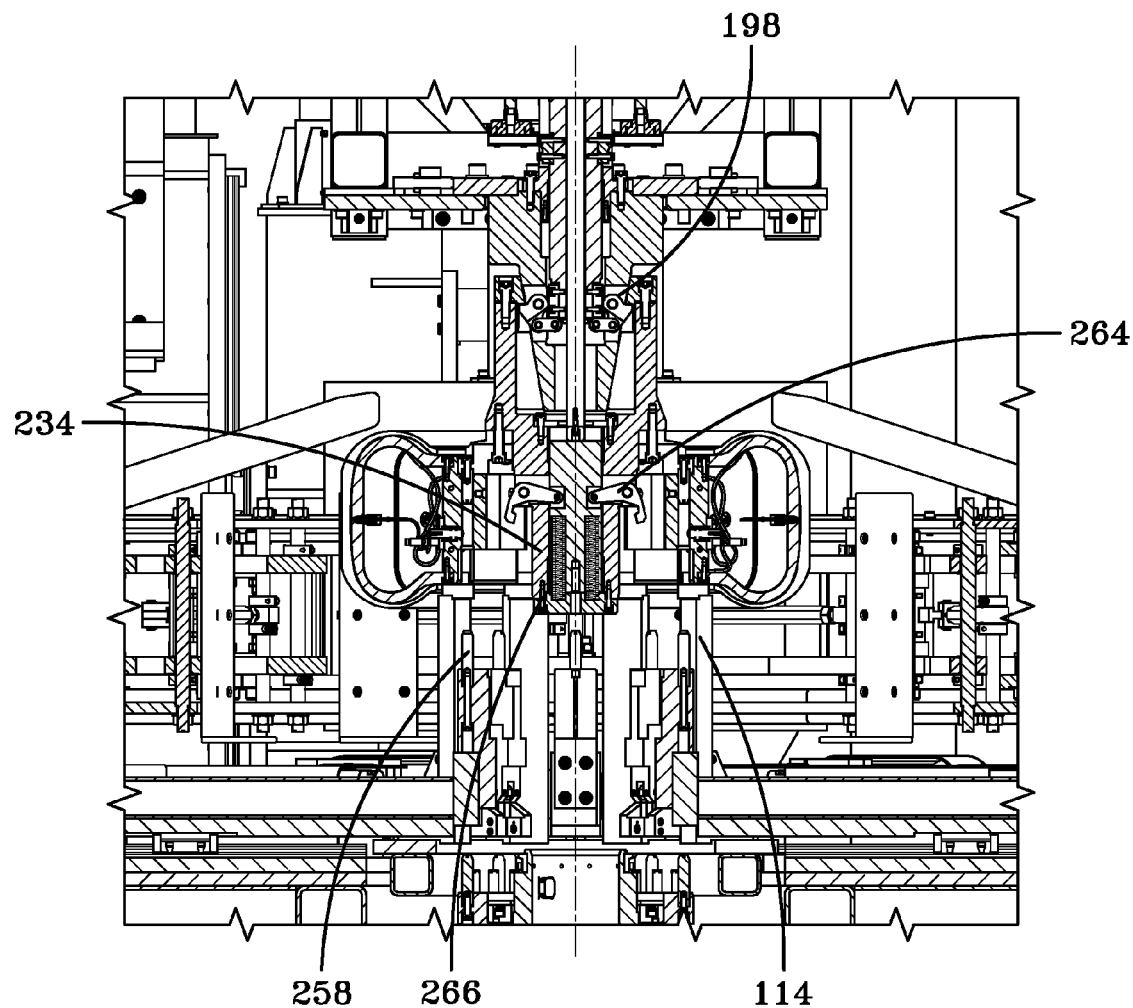
FIG. 31 is an enlarged perspective view of the segment receiving pins in position between core supporting arms as shown in FIG. 30.
Figure 32:
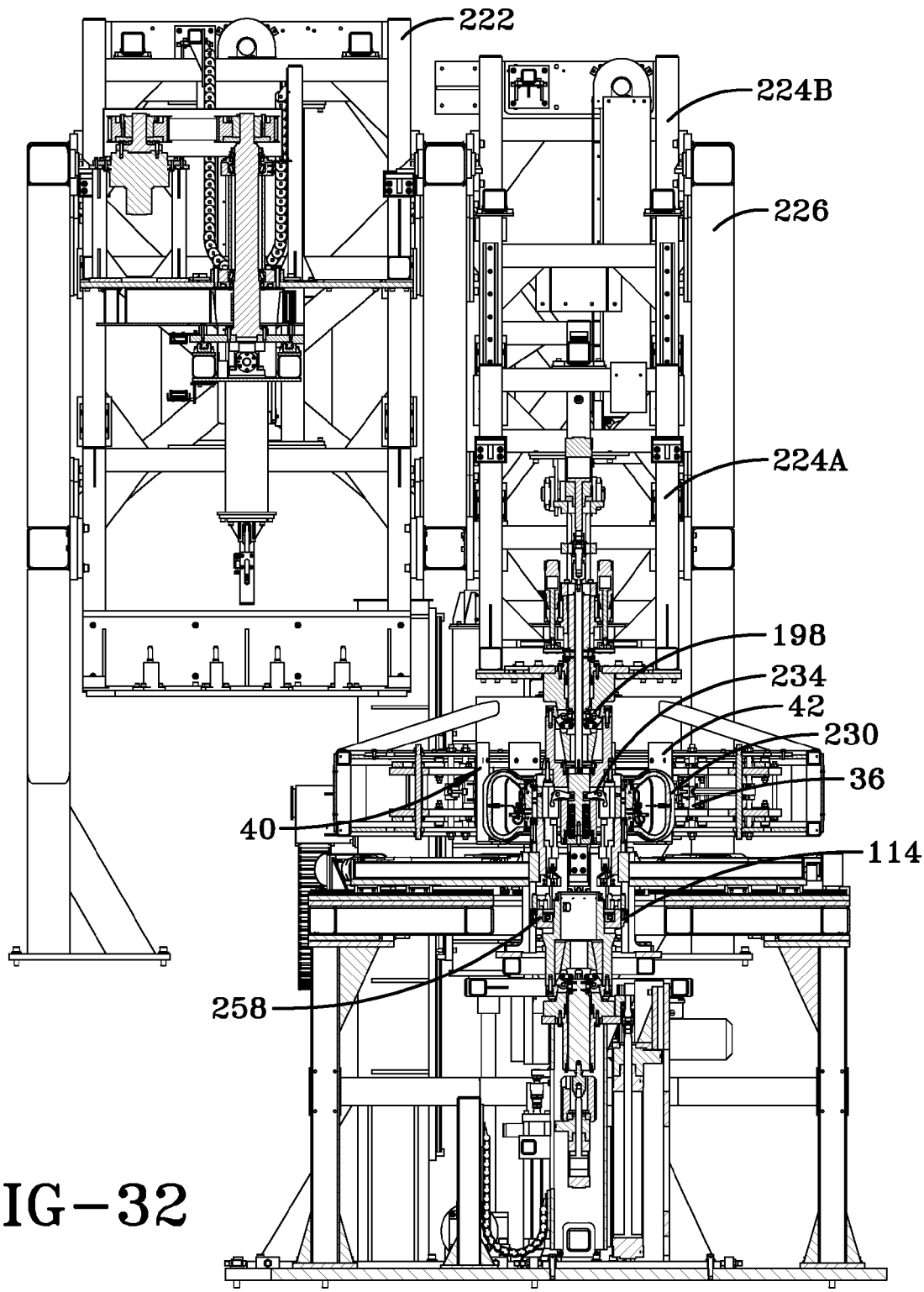
FIG. 32 is an elevation view of the upper core manipulator, core, and core assembly/disassembly station showing the core support assembly moving down to lower the core onto the segment receiving pins.
Figure 33:
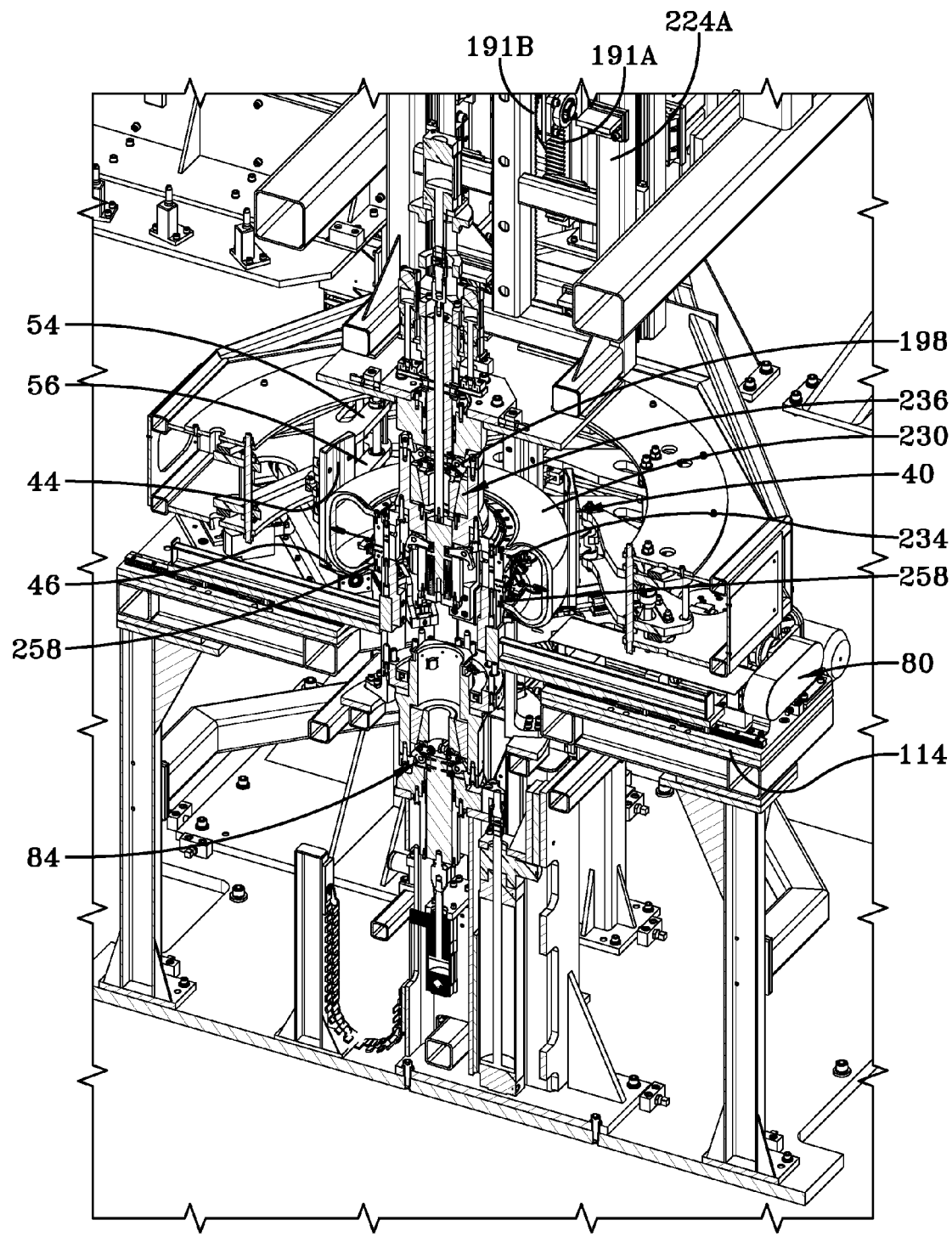
FIG. 33 is an enlarged perspective view of the core support assembly moving down to lower the core onto the segment receiving pins.

Sequence
1. Upper core manipulator 12 moves into position with the upper core handling assembly 198 directly above the lower core segment handling assembly 80. FIGS. 20, 21, 22, and 23.
2. Upper core handling assembly 198 lowers the tire building core 15 onto the core segment support 82. See FIGS. 24 and 25. There is one support 114 for each segment of the core 15.
3. Bottom spindle clamp assembly 84 extends upwardly to engage the lower core spindle assembly 240 of the tire building core 15. Cylinder 90 actuates linkage 92, 94 to clamp. See FIGS. 8, 26 and 27.
4. The center cylinder 208 in the upper core handling assembly 12 actuates a rod 206 which releases the spring-loaded clamp, latches 264, holding the two spindle halves 236, 240 of the tire building core 15 together. See FIGS. 22, 29.
5. The bottom spindle clamp assembly 84 retracts (moves downward) to remove the bottom spindle half 240 of the tire building core 15 The core segments are still supported on the arms 114 of the core segment support assembly 82. See FIGS. 28 and 29.
6. The eight arms of the pin assemblies 124, 127, each with a pin 136 extending upward from the end, of the lower core segment handling assembly 80 extend through the gaps between the arms 114 of the core segment support assembly 82 to positions placing the pins 136 directly under the holes in the tire building core segments. See FIGS. 11, 30 and 31.
7. The air pressure in the cylinders 118 extending the core segment support assembly 80 is lowered. The upper core handling assembly 12 lowers the core segments 244, 246 onto the eight pins 136 on the lower core segment handling assembly 80 arms. This action overpowers the force in the air cylinders 118 of the core segment support assembly 80 causing it to lower as well until the segments are engaged on the pins 136. Then the core support assembly 80 is lowered to its extreme retracted position. The gripper assembly 40 of the tire unloader assembly 36 is engaged to hold the tire 230. See FIGS. 32 and 33.

8. The upper half 236 of the tire building core spindle is removed by raising the upper core handling assembly 198.

9. The entire upper core assembly manipulator 12 shifts along rails 30 to position the center of the upper core segment handling assembly 150 directly above the center of the lower core handling assembly 80.

Figure 34:
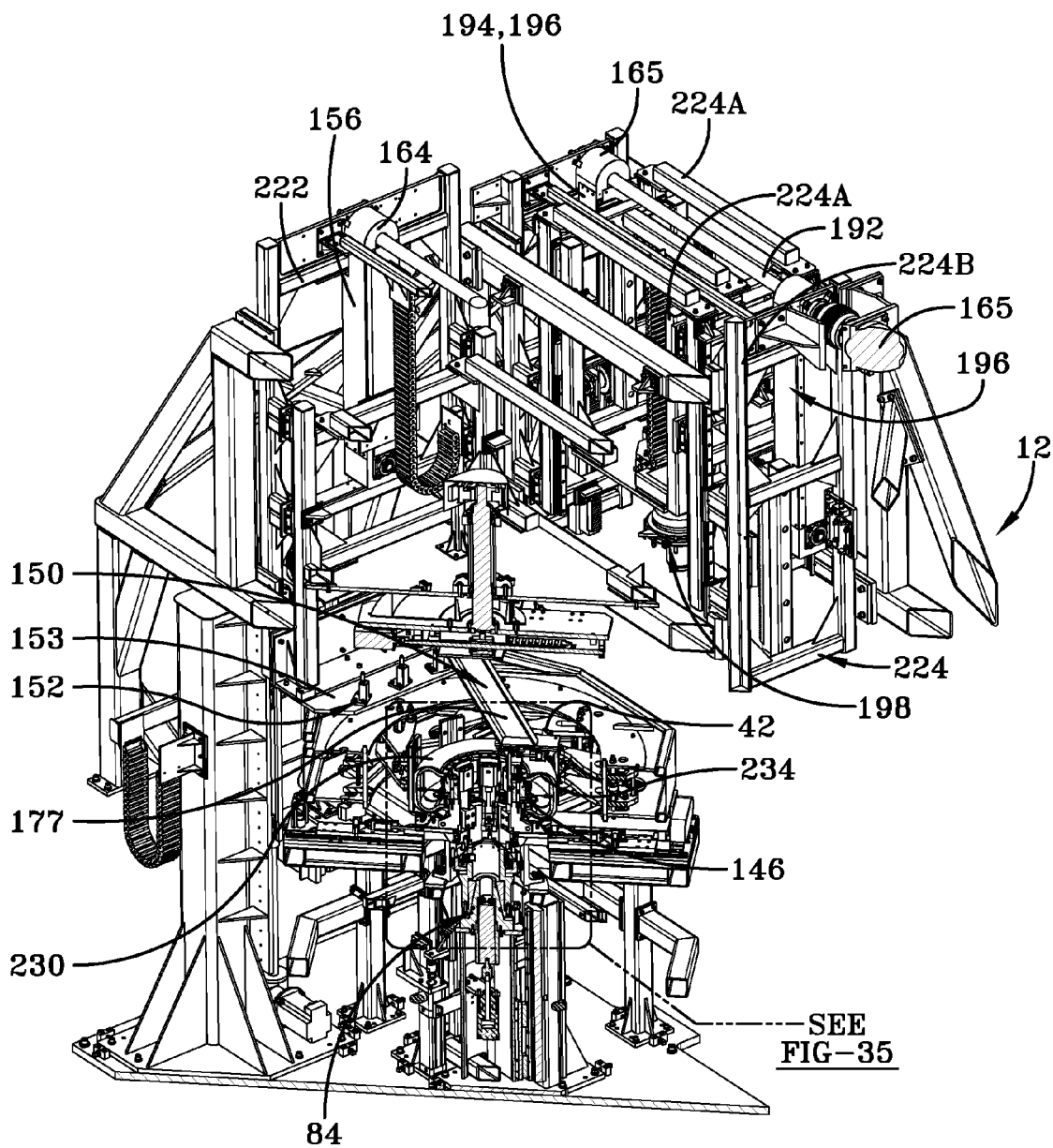
FIG. 34 is a perspective view showing the upper core manipulator being moved out of the way and the upper segment manipulator moving into operative position.

10. Upper core segment handling assembly 150 positions radially, and lowers to a position inside the tire 230 to engage the first key segment of the tire building core 234. See FIGS. 34 and 35.

11. The radial axis of the core segment handling assembly 150 and the axis of the arm of the lower core segment handling assembly 80 are electronically synchronized together to pull the first key segment 244 radially toward the center of the tire 230. The shape of the cured tire 230 may require the tire to flex slightly to allow the wider part of the key segment 244 to pass between the tire beads 232. See FIG. 36.

Figure 37:
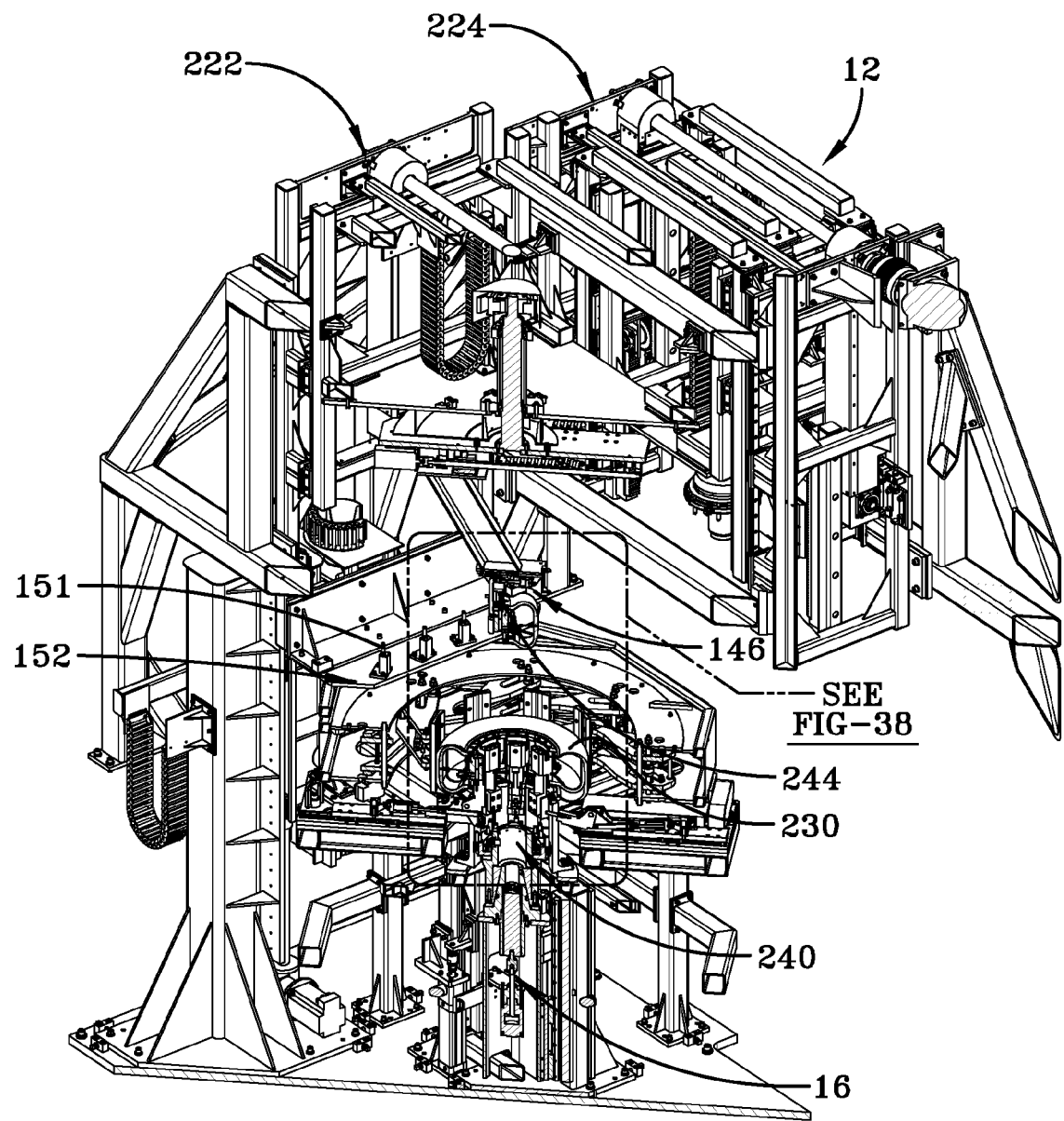
FIG. 37 is a perspective view shown in partial section of the core, upper segment manipulator, and core assembly/disassembly station in sequence to FIG. 36 and showing a core segment lifted in preparation for transfer to storage.

12. The key segment 244 is then lifted by raising the core handling assembly 150. See FIGS. 37 and 38.

13. Upper core handling assembly 150 moves the segment 244 to a storage pin 151 located on the main frame of the upper core manipulator 12 using a combination of vertical, rotational, and radial axes movements. Four segments are stored on each side of the frame at the positions corresponding to the position of each segment in the assembled core 234 as described previously. Each segment is rotated into a preferred retrieval orientation within the storage station in which the leading face of each segment is canted inward to a center region P between the storage plates as previously explained.

14. Steps 10-13 are repeated to remove the other three key segments 244. The pins 136 of the four key segment handling assemblies 124 of the lower segment handling assembly 80 are retracted into the radially outward position and tilted downward to allow clearance for the subsequent removal of the larger core segments 246.

15. Steps 10-13 are repeated to remove the four large segments 246.

16. Upper core segment handling assembly 150 moves to a park position, allowing for clearance as the entire upper core assembly manipulator 12 moves toward the upending station 14.

17. Tire unloader 36 raises to clear the pins 254 from the lower core spindle assembly 240, rotates 180 degrees to the unload position, and then lowers to the unload height. See FIGS. 39 and 40.

18. The above sequence is then repeated in reverse order to re-assemble the tire building core 234. The pins 136 of the four key segment handling assemblies 124 are reverse tilted back into the upright vertical orientation. The segment pins 136 for the core segments 244, 246 are in the retracted (radially outward) position to generally recreate the configuration of the assembled core. The key segment pins 136 for the key segments 244 are positioned radially inward from the segment pins 136 for the larger core segments 246. The large segments 246 are put in place first and placed on respective pins 136. The key segments 244 are then put in place on their respective radially inward positioned pins 136. The key segments 244 are moved radially outward against the larger segments 246 to finally configure the assembled core 234. The upper spindle half assembly 236 is installed followed by the lower spindle half assembly 240. Finally, the assembled tire building core 234 is picked up by the upper spindle latch mechanism 198 of the upper core manipulator 12 and transported to the upender station 14 for delivery back to the tire building area.

19. A completed green tire arrives at the upender station 14 from the tire building area on the tire building core 15. The upender station 14 rotates the core and green tire to a vertical orientation.

20. The upper core manipulator 12 moves into position, picks up the tire building core 15 with the upper core spindle latch mechanism 198 and transports it to the mold assembly station 18 for loading into a tire mold.

21. The upper core spindle latch mechanism 198 releases the tire building core 15 and moves with the upper core manipulator 12 to a storage position to wait for a core to finish the curing operation so that the cycle can begin again.

Alternate Sequence

An alternate sequence for disassembly may be utilized to save cycle time. In steps 10 and 11 above, the segments may be removed using only the force provided by the ball screw 130 on the arm of each pin assembly 124, 127 of the lower core segment handling assembly 80. In the alternative sequence, the lower unit 124, 127 would move a segment to the center, clear of the tire, where it would then be engaged by the upper unit 150. This would allow the next segment to be pushed to the center while the upper core segment handling assembly 150 is still placing the first segment on its storage pin 151. This alternate sequence would save several seconds from the total cycle time.

It will be appreciated that the subject curing line 10 is commercially applicable to the manufacture of all types of tires as well as non-tire items such as bladders and sleeves. The line 10 is not material specific and is not limited only to the manufacture of rubber articles. The subject invention does not involve the conventional practice in the tire building art in which tires are manufactured on building drums that are flat when the tire components are applied and then form the tire carcass to shape that approximates that of the cured tire. Rather the invention accommodates tires built in their final, cured shape. The mold shapes the outside of the tire, and the core flanges provide a solid surface to maintain the inside shape of the tire during curing. The invention thereby provides the means to remove the solid core segments from within a cured tire.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire building core manipulating apparatus for a segmented tire building core, the core including a plurality of core segments positioned in a circular array radially from a central axis, the manipulating apparatus comprising:

a support frame;

a core mating mechanism positioned within a core central opening on the core central axis of the core;

a core latching mechanism mounted to the support frame for operatively engaging and disengaging from the core mating mechanism and operatively suspending the tire building core by the mating mechanism in a first axial orientation;

the mating mechanism being axially removable from the core opening by axial movement of the core latching mechanism;

a transport mechanism for relocating the support frame with the tire building core suspended from the core latching mechanism by the core mating mechanism in the first axial orientation between a plurality of stations in a tire curing line.

2. The core manipulating apparatus of claim 1, wherein the transport mechanism moves the support frame and the tire building core between a core manipulating station, a core assembly and disassembly station; and a mold assembly station in the tire curing line.

3. The core manipulating apparatus of claim 1, wherein the transport mechanism includes a rail assembly extending between the plurality of stations.

4. The core manipulating apparatus of claim 3, wherein the support frame comprises at least one bridging truss assembly operatively traversing the rail assembly between the plurality of stations.

5. The core manipulating apparatus of claim 4, wherein the core latching mechanism mounts to the bridging truss assembly.

6. The core manipulating apparatus of claim 5, wherein the bridging truss assembly suspends the core at a height sufficient to pass the core over at least one of the plurality of stations in the tire curing line as the bridging truss assembly traverses between the plurality of stations.

7. The core manipulating apparatus of claim 1, wherein the tire building core and tire central axis in the first axial orientation is substantially vertical.

8. The core manipulating apparatus of claim 7, wherein the support frame traverses between the plurality of stations and comprises at least one bridging truss assembly operatively suspending the tire building core at a height sufficient to pass the core over at least one of the plurality of stations in the tire curing line.

9. The core manipulating apparatus of claim 8, wherein the latching mechanism mounts to the bridging truss assembly.

10. The core manipulating apparatus of claim 9, wherein the latching mechanism includes a vertical adjustment mechanism to operatively raise and lower the tire building core.

11. The core manipulating apparatus of claim 10, wherein further comprising a core segment disassembly mechanism mounted to the support frame.

12. The core manipulating apparatus of claim 11, wherein the support frame operatively positions the core segment disassembly mechanism over at least one of the plurality of stations.

13. The core manipulating apparatus of claim 1, wherein the core mating mechanism comprises core segment locking means for maintaining the core segments in a radially outward assembled orientation.

14. The core manipulating apparatus of claim 13, wherein the core latching mechanism axially removes the core mating mechanism from the core central opening to disengage the core segment locking means from the core segments.

15. The core manipulating apparatus of claim 14, wherein the core mating mechanism comprises a spindle body.

\* \* \* \* \*